United States Patent
Padmanabhan et al.

(10) Patent No.: US 11,971,874 B2
(45) Date of Patent: Apr. 30, 2024

(54) SYSTEMS, METHODS, AND APPARATUSES FOR IMPLEMENTING EFFICIENT STORAGE AND VALIDATION OF DATA AND METADATA WITHIN A BLOCKCHAIN USING DISTRIBUTED LEDGER TECHNOLOGY (DLT)

(71) Applicant: Salesforce, Inc., San Francisco, CA (US)

(72) Inventors: Prithvi Krishnan Padmanabhan, San Ramon, CA (US); Bertha Ching Wai Lam, San Francisco, CA (US); Sri Naga Deepthi Velisetti, Dublin, CA (US)

(73) Assignee: Salesforce, Inc., San Francisco, CA (US)

( * ) Notice: Subject to any disclaimer, the term of this patent is extended or adjusted under 35 U.S.C. 154(b) by 722 days.

(21) Appl. No.: 16/264,645

(22) Filed: Jan. 31, 2019

(65) Prior Publication Data

US 2020/0250174 A1 Aug. 6, 2020

(51) Int. Cl.
*G06F 16/23* (2019.01)
*G06F 7/14* (2006.01)
(Continued)

(52) U.S. Cl.
CPC ............ *G06F 16/2379* (2019.01); *G06F 7/14* (2013.01); *G06F 16/2365* (2019.01); *H04L 9/0637* (2013.01); *H04L 9/50* (2022.05)

(58) Field of Classification Search
CPC .... G06F 16/2379; G06F 7/14; G06F 16/2365; H04L 9/0637; H04L 9/50
(Continued)

(56) References Cited

U.S. PATENT DOCUMENTS 5,634,053 A 5/1997 Noble et al.
6,333,929 B1 12/2001 Drottar et al.
(Continued)

FOREIGN PATENT DOCUMENTS

CN 108021986 A 5/2018
CN 109173261 A 1/2019
(Continued)

OTHER PUBLICATIONS

U.S. Appl. No. 17/153,872, filed Jan. 20, 2021, Prithvi Krishnan Padmanabhan.
(Continued)

*Primary Examiner* — Phuong Thao Cao
(74) *Attorney, Agent, or Firm* — Polygon IP, LLP

(57) ABSTRACT

Exemplary systems, methods, and apparatuses implement efficient storage and validation of data and metadata within a blockchain using Distributed Ledger Technology (DLT) in conjunction with a cloud based computing environment. Such a system, having at least a processor and a memory therein and executing within a host organization, in which such a system includes: means for operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new (Continued)

block on the blockchain pursuant to successful validation of the updated data values by the smart contract.

30 Claims, 23 Drawing Sheets

(51) Int. Cl.
*H04L 9/06* (2006.01)
*H04L 9/00* (2022.01)
(58) Field of Classification Search
USPC .......................................................... 707/703
See application file for complete search history.

(56) References Cited

U.S. PATENT DOCUMENTS

| | | | |
|---|---|---|---|
| 7,587,348 | B2 | 9/2009 | Liao et al. |
| 8,095,463 | B1 | 1/2012 | Hartmaier |
| 9,027,094 | B1 | 5/2015 | Balazs et al. |
| 9,569,700 | B1 | 2/2017 | Santos et al. |
| 9,690,822 | B2 | 6/2017 | Roy-Faderman |
| 9,978,067 | B1 | 5/2018 | Sadaghiani et al. |
| 10,042,636 | B1 | 8/2018 | Srivastava et al. |
| 10,102,265 | B1* | 10/2018 | Madisetti ................. G06F 16/27 |
| 10,311,230 | B2 | 6/2019 | Jagadeesan et al. |
| 10,373,129 | B1 | 8/2019 | James et al. |
| 10,425,399 | B2 | 9/2019 | Kravitz et al. |
| 10,482,466 | B1 | 11/2019 | Walters et al. |
| 10,505,726 | B1 | 12/2019 | Andon et al. |
| 10,521,196 | B1 | 12/2019 | Wang et al. |
| 10,521,780 | B1 | 12/2019 | Hopkins, III et al. |
| 10,541,821 | B2 | 1/2020 | Toll et al. |
| 10,637,644 | B1* | 4/2020 | Walters ................. H04L 9/0833 |
| 10,701,054 | B2 | 6/2020 | Padmanabhan et al. |
| 10,728,283 | B1 | 7/2020 | Dobrek et al. |
| 10,762,506 | B2 | 9/2020 | Cash et al. |
| 10,885,567 | B2 | 1/2021 | Bhattacherjee et al. |
| 10,929,866 | B1 | 2/2021 | Qi et al. |
| 11,038,771 | B2 | 6/2021 | Padmanabhan |
| 11,184,394 | B1 | 11/2021 | Dobrek et al. |
| 11,244,313 | B2 | 2/2022 | Padmanabhan et al. |
| 2005/0102159 | A1 | 5/2005 | Mondshine |
| 2006/0118611 | A1 | 6/2006 | Michelsen et al. |
| 2006/0259361 | A1 | 11/2006 | Barhydt et al. |
| 2008/0066165 | A1 | 3/2008 | Rosenoer |
| 2009/0037949 | A1 | 2/2009 | Birch |
| 2011/0289140 | A1 | 11/2011 | Pletter et al. |
| 2013/0041934 | A1 | 2/2013 | Annamalaisami et al. |
| 2013/0226682 | A1 | 8/2013 | Grossman |
| 2013/0346173 | A1 | 12/2013 | Chandoor |
| 2014/0039990 | A1 | 2/2014 | Georgi |
| 2014/0278894 | A1 | 9/2014 | Toumayan et al. |
| 2015/0026061 | A1 | 1/2015 | Siegel et al. |
| 2016/0027229 | A1 | 1/2016 | Spanos et al. |
| 2016/0042383 | A1 | 2/2016 | Joshi et al. |
| 2016/0092872 | A1 | 3/2016 | Prakash et al. |
| 2016/0148251 | A1 | 5/2016 | Thomas et al. |
| 2016/0350860 | A1 | 12/2016 | Dintenfass et al. |
| 2016/0358267 | A1 | 12/2016 | Arjomand et al. |
| 2016/0364743 | A1 | 12/2016 | St. Lawrence et al. |
| 2017/0005804 | A1 | 1/2017 | Zinder |
| 2017/0046698 | A1 | 2/2017 | Haldenby et al. |
| 2017/0085545 | A1 | 3/2017 | Lohe et al. |
| 2017/0103167 | A1 | 4/2017 | Shah |
| 2017/0103472 | A1* | 4/2017 | Shah ........................ H04L 9/32 |
| 2017/0132625 | A1 | 5/2017 | Kennedy |
| 2017/0132630 | A1* | 5/2017 | Castinado ............ G06Q 20/382 |
| 2017/0140145 | A1 | 5/2017 | Shah |
| 2017/0200157 | A1 | 7/2017 | Bergeon et al. |
| 2017/0206603 | A1 | 7/2017 | Al-Masoud |
| 2017/0236215 | A1 | 8/2017 | Eisen et al. |
| 2017/0289111 | A1* | 10/2017 | Voell ..................... H04L 9/3236 |
| 2017/0295021 | A1 | 10/2017 | Gutiérrez et al. |
| 2017/0295023 | A1 | 10/2017 | Madhavan et al. |
| 2017/0300627 | A1* | 10/2017 | Giordano ............ G06F 21/6245 |
| 2017/0300872 | A1 | 10/2017 | Brown et al. |
| 2017/0300876 | A1 | 10/2017 | Musiala, Jr. et al. |
| 2017/0337534 | A1 | 11/2017 | Goeringer et al. |
| 2017/0344988 | A1 | 11/2017 | Cusden et al. |
| 2017/0353309 | A1 | 12/2017 | Gray |
| 2017/0364549 | A1 | 12/2017 | Abalos |
| 2017/0364699 | A1* | 12/2017 | Goldfarb ............. G06F 16/2282 |
| 2017/0372300 | A1* | 12/2017 | Dunlevy ................. G16Z 99/00 |
| 2018/0005186 | A1 | 1/2018 | Hunn |
| 2018/0006831 | A1 | 1/2018 | Toll et al. |
| 2018/0019879 | A1 | 1/2018 | Kravitz et al. |
| 2018/0026505 | A1 | 1/2018 | Galmiche et al. |
| 2018/0041345 | A1 | 2/2018 | Maim |
| 2018/0082256 | A1 | 3/2018 | Tummuru et al. |
| 2018/0088928 | A1 | 3/2018 | Smith et al. |
| 2018/0123779 | A1 | 5/2018 | Zhang |
| 2018/0139186 | A1 | 5/2018 | Castagna |
| 2018/0144042 | A1 | 5/2018 | Sheng et al. |
| 2018/0158162 | A1 | 6/2018 | Ramasamy |
| 2018/0165416 | A1 | 6/2018 | Saxena et al. |
| 2018/0189100 | A1 | 7/2018 | Nemoto et al. |
| 2018/0191503 | A1 | 7/2018 | Alwar et al. |
| 2018/0204213 | A1 | 7/2018 | Zappier et al. |
| 2018/0218176 | A1 | 8/2018 | Voorhees et al. |
| 2018/0225611 | A1 | 8/2018 | Daniel et al. |
| 2018/0232644 | A1 | 8/2018 | Acharya et al. |
| 2018/0232659 | A1 | 8/2018 | Ranatunga et al. |
| 2018/0239897 | A1 | 8/2018 | Ventura |
| 2018/0247191 | A1 | 8/2018 | Katz et al. |
| 2018/0253661 | A1 | 9/2018 | Strauss |
| 2018/0260212 | A1* | 9/2018 | Wisnovsky ........... G06F 16/113 |
| 2018/0262505 | A1 | 9/2018 | Ligatti |
| 2018/0268401 | A1 | 9/2018 | Ortiz et al. |
| 2018/0268506 | A1 | 9/2018 | Wodetzki et al. |
| 2018/0276553 | A1 | 9/2018 | Redkar et al. |
| 2018/0276626 | A1 | 9/2018 | Laiben |
| 2018/0300382 | A1* | 10/2018 | Madisetti .............. H04L 9/3234 |
| 2018/0307990 | A1 | 10/2018 | Chawla et al. |
| 2018/0365686 | A1 | 12/2018 | Kondo |
| 2018/0367528 | A1 | 12/2018 | Schwarz et al. |
| 2018/0373776 | A1* | 12/2018 | Madisetti .............. H04L 9/3239 |
| 2019/0012249 | A1 | 1/2019 | Mercuri et al. |
| 2019/0012595 | A1 | 1/2019 | Beser et al. |
| 2019/0019090 | A1 | 1/2019 | Chacko et al. |
| 2019/0028276 | A1 | 1/2019 | Pierce et al. |
| 2019/0034404 | A1 | 1/2019 | Anderson et al. |
| 2019/0035018 | A1 | 1/2019 | Nolan et al. |
| 2019/0050855 | A1 | 2/2019 | Martino et al. |
| 2019/0052454 | A1 | 2/2019 | Wright et al. |
| 2019/0058709 | A1 | 2/2019 | Kempf et al. |
| 2019/0081796 | A1 | 3/2019 | Chow et al. |
| 2019/0086988 | A1 | 3/2019 | He et al. |
| 2019/0087598 | A1 | 3/2019 | Adkins et al. |
| 2019/0087892 | A1 | 3/2019 | Pinski et al. |
| 2019/0102409 | A1 | 4/2019 | Shi et al. |
| 2019/0102423 | A1 | 4/2019 | Little et al. |
| 2019/0108543 | A1 | 4/2019 | Chan et al. |
| 2019/0109702 | A1 | 4/2019 | Maggu et al. |
| 2019/0109713 | A1 | 4/2019 | Clark et al. |
| 2019/0122186 | A1 | 4/2019 | Kano et al. |
| 2019/0147532 | A1 | 5/2019 | Singh et al. |
| 2019/0149325 | A1 | 5/2019 | Garagiola et al. |
| 2019/0149334 | A1 | 5/2019 | Velden |
| 2019/0158270 | A1 | 5/2019 | Berti |
| 2019/0164156 | A1 | 5/2019 | Lindemann |
| 2019/0164220 | A1 | 5/2019 | Raj et al. |
| 2019/0172282 | A1 | 6/2019 | Patel |
| 2019/0182047 | A1 | 6/2019 | Andreina et al. |
| 2019/0188411 | A1* | 6/2019 | Kroutik ................. H04L 9/3297 |
| 2019/0188706 | A1 | 6/2019 | McCurtis |
| 2019/0206536 | A1* | 7/2019 | Hausman .............. H04L 9/3297 |
| 2019/0215149 | A1 | 7/2019 | Ramasamy et al. |
| 2019/0228006 | A1 | 7/2019 | Tormasov et al. |
| 2019/0236559 | A1 | 8/2019 | Padmanabhan |
| 2019/0236562 | A1 | 8/2019 | Padmanabhan |
| 2019/0236598 | A1 | 8/2019 | Padmanabhan |
| 2019/0236606 | A1 | 8/2019 | Padmanabhan et al. |
| 2019/0238316 | A1 | 8/2019 | Padmanabhan |

(56) References Cited

U.S. PATENT DOCUMENTS

| | | |
|---|---|---|
| 2019/0238525 A1 | 8/2019 | Padmanabhan et al. |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0306235 A1 | 10/2019 | Veale et al. |
| 2019/0334716 A1 | 10/2019 | Kocsis et al. |
| 2019/0370634 A1 | 12/2019 | Moreno et al. |
| 2019/0370866 A1 | 12/2019 | Lawbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019616 A1* | 1/2020 | Sukhija .............. G06F 16/2365 |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0042939 A1 | 2/2020 | Padmanabhan |
| 2020/0050613 A1* | 2/2020 | Gauvreau, Jr. ....... H04L 9/0637 |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089672 A1 | 3/2020 | Velisetti et al. |
| 2020/0089895 A1 | 3/2020 | Gollogly |
| 2020/0104636 A1 | 4/2020 | Halevi et al. |
| 2020/0110812 A1* | 4/2020 | Kamijoh .............. H04L 9/3239 |
| 2020/0112440 A1* | 4/2020 | Nakamura ............ H04L 9/3247 |
| 2020/0118011 A1 | 4/2020 | Kaiser et al. |
| 2020/0119906 A1* | 4/2020 | Das ....................... H04L 9/0894 |
| 2020/0133955 A1 | 4/2020 | Padmanabhan et al. |
| 2020/0134656 A1 | 4/2020 | Padmanabhan |
| 2020/0143267 A1 | 5/2020 | Gidney |
| 2020/0169546 A1 | 5/2020 | Padmanabhan |
| 2020/0186338 A1 | 6/2020 | Andon et al. |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250683 A1 | 8/2020 | Padmanabhan et al. |
| 2020/0250747 A1 | 8/2020 | Padmanabhan |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0336475 A1 | 10/2020 | Padmanabhan et al. |
| 2020/0344132 A1 | 10/2020 | Padmanabhan |
| 2020/0357084 A1 | 11/2020 | Hunn et al. |
| 2021/0081404 A1* | 3/2021 | Kempf .................. H04L 9/0637 |
| 2021/0152535 A1 | 5/2021 | Padmanabhan et al. |
| 2021/0152536 A1 | 5/2021 | Padmanabhan et al. |
| 2021/0174609 A1* | 6/2021 | Bryant .................... G06F 16/27 |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2022/0006705 A1 | 1/2022 | Padmanabhan |
| 2023/0205929 A1* | 6/2023 | Nation ................ G06F 16/1805 726/27 |

FOREIGN PATENT DOCUMENTS

| | | |
|---|---|---|
| CN | 2019800219289 | 9/2020 |
| EP | 197071681 | 8/2020 |
| JP | 2020541893 | 7/2020 |
| WO | 2016/0292672 A1 | 10/2016 |
| WO | 2018007827 A1 | 1/2018 |
| WO | 2018007828 A2 | 1/2018 |
| WO | 2018194707 A1 | 10/2018 |
| WO | 2018230581 A1 | 12/2018 |
| WO | 2019152750 A1 | 8/2019 |
| WO | WO-2020056597 A1 * | 3/2020 |

OTHER PUBLICATIONS

U.S. Appl. No. 17/163,547, filed Jan. 31, 2021, Prithvi Krishnan Padmanabhan.
U.S. Appl. No. 17/348,286, filed Jun. 15, 2021, Prithvi Krishnan Padmanabhan.
Bendor-Samuel, P. (2017) Blockchain-enabled "smart-contracts" solve problems in administering IT ecosystem services, CIO, 3 pages.
Final Office Action for U.S. Appl. No. 15/932,099 dated Jun. 1, 2020, 27 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-final Office Action for U.S. Appl. No. 16/177,305 dated Jul. 23, 2020, 52 pages.
Normans Media Ltd., Smart Contracts: Blockchain-based contracts that don't require lawyers. 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.
Office Action for U.S. Appl. No. 15/885,803, dated Apr. 14, 2021, 31 pages.
Office Action for U.S. Appl. No. 15/932,092 dated Mar. 17, 2021, 23 pages.
Office Action for U.S. Appl. No. 16/177,300 dated Jun. 16, 2021, 80 pages.
Office Action for U.S. Appl. No. 16/683,945, dated Sep. 14, 2020, 18 pages.
Shukla, A., et al., "Smart Contracts for Multiagent Plan Execution in Untrusted Cyber-physical Systems," 2018 IEEE 25th International Conference on High Performance Computing Workshops (HiPCW), 10 pages.
"BigchainDB 2.0 The Blockchain Database," Berlin Germany dated May 2018, 14 pages.
Azaria, A., et al "MedRec: Using Blockchain for Medical Data Access and Permission Management," 2016 2nd Int'l Conference on Open and Big Data, IEEE, (Aug. 22, 2016), pp. 25-30.
Genestier, P., et al, "Blockchain for Consent Management in the eHealth Environment: A Nugget for Privacy and Security Challenges," Journal of the Int'l Society for Telemedicine and eHealth, (Jan. 1, 2017), 4 pages.
International Search Report and Written Opinion for Application No. PCT/US2019/036103, dated Aug. 1, 2019, 12 pages.
International Search Report and Written Opinion for International Patent Application No. PCT/US2019/016199, dated Apr. 2, 2019, 12 pages.
McConaghy et al., "BigchainDB: A Scalable Blockchain Database (DRAFT)" dated Jun. 8, 2016.
Notice of Allowance for U.S. Appl. No. 15/932,100 dated Feb. 20, 2020, 5 pages.
Notice of Allowance for U.S. Appl. No. 15/940,646, dated Oct. 31, 2019, 8 pages.
Office Action for U.S. Appl. No. 15/885,803 dated Jan. 8, 2020, 47 pages.
Office Action for U.S. Appl. No. 15/885,811 dated Jan. 17, 2020, 40 pages.
Office Action for U.S. Appl. No. 15/932,092 dated Jan. 22, 2020, 36 pages.
Office Action for U.S. Appl. No. 15/932,100, dated Nov. 8, 2019, 9 pages.
Office Action for U.S. Appl. No. 15/940,646, dated Apr. 29, 2019, 7 pages.
Office Action for U.S. Appl. No. 15/932,099, dated Oct. 3, 2019, 26 pages.
Ojha, "Chaincode for Go Developers, Part 1: Writing Blockchain Chaincode in Go for Hyperledger Fabric v0.6," 2017, 15 pages.
Peterson, K., et al, "A Blockchain-Based Approach to Health Information Exchange Networks," (Aug. 8, 2016), Retrieved from the Internet: URL: http://kddlab.zjgsu.edu.cn:7200/research/blockchain/

(56) References Cited

OTHER PUBLICATIONS huyiyang-reference/A%20Blockchain-Based%20Approach%20to%20Health%20Information%20Exchange.pdf, Retrieved on Mar. 21, 2019), 10 pages.
Salesforce, "Force.com Apex Code Developer's Guide," version 34.0, 2015, 1000 pages.
Sandgaard, J., et al, "MedChain White Paper V1.1," (Oct. 1, 2017), Retrieved from the Internet: URL:https://www.medchain.global/doc/Medchain%20Whitepaper%20v1.1.pdf, Retrieved on Mar. 21, 2019, 54 pages.
Using Sawtooth with Docker: Configuring the List of Transaction Families, Apr. 6, 2018, 13 pages.
Wikipedia, "Federate database system," Jun. 8, 2016, https://en.wikipedia.org/w/index.php/?title=Federated%20database%20system&oldid=808166410, 6 pages.
Wikipedia, "Solidity," Feb. 2, 2017, https://web.archive.org/web/2017020202304/https://en.wikipeida.org/wiki/Solidity (Year: 2017), 3 pages.
Zyskind, G., et al, "Decentralizing Privacy: Using Blockchain to Protect Personal Data," 2015 IEEE Security and Privacy Workshops (May 1, 2015), 5 pages.
"Deloitte IoT Powered by Blockchain", dated May 2017, 20 pages.
"How Creating Digital Twins in Blockchain Will Protect Brands?", dated Nov. 15, 2018, 4 pages.
"How Smart Certificates of Authenticity Improve Asset Management", Jan. 17, 2019, 4 pages.
"Nasdaq, Using Blockchain Track Assets Proof Ownership", dated Nov. 30, 2016, 30 pages.
Final Office Action for U.S. Appl. No. 15/885,803, dated Jul. 20, 2020, 29 pages.
Final Office Action for U.S. Appl. No. 15/885,811, dated Aug. 5, 2020, 45 pages.
Final Office Action for U.S. Appl. No. 15/932,092 dated Jun. 22, 2020, 42 pages.
Final Office Action for U.S. Appl. No. 15/932,099 dated Jun. 1, 2020, 26 pages.
International Search Report and Written Opinion for Application No. PCT/US2020/01561B dated May 11, 2020, 13 pages.
Notice of allowance for U.S. Appl. No. 16/264,653 dated Nov. 23, 2020, 16 pages.
Office Action for U.S. Appl. No. 16/177,305 dated Jul. 23, 2020, 41 pages.
Office Action for U.S. Appl. No. 16/264,657, dated Sep. 18, 2020, 33 pages.
Office Action for U.S. Appl. No. 16/683,945 dated Sep. 14, 2020, 26 Pages.
Office Action for EP Application No. 19707168.1 dated Sep. 24, 2020, 3 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Mandal, S., "A Framework for Modular Norm Extraction, Modeling, and Reasoning," [Doctoral dissertation, University of Nebraska], 2017, 151 pages, ProQuest Dissertations Publishing.
Non-final Office Action for U.S. Appl. No. 16/399,920, dated Feb. 17, 2022, 66 pages.
Non-final Office Action for U.S. Appl. No. 16/777,409 dated Oct. 4, 2021, 42 pages.
Non-final Office Action for U.S. Appl. No. 16/917,506, dated Oct. 4, 2021, 44 pages.
Norta, A et al., "Self-Aware Agent Supported Contract Management on Blockchains for Legal Accountability," 2017, 37 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 15/885,811 dated Aug. 4, 2021, 26 pages.
Office Action for U.S. Appl. No. 16/177,305 dated Sep. 16, 2021, 42 pages.
Office Action for U.S. Appl. No. 16/399,913, dated Dec. 24, 2021, 51 pages.

\* cited by examiner

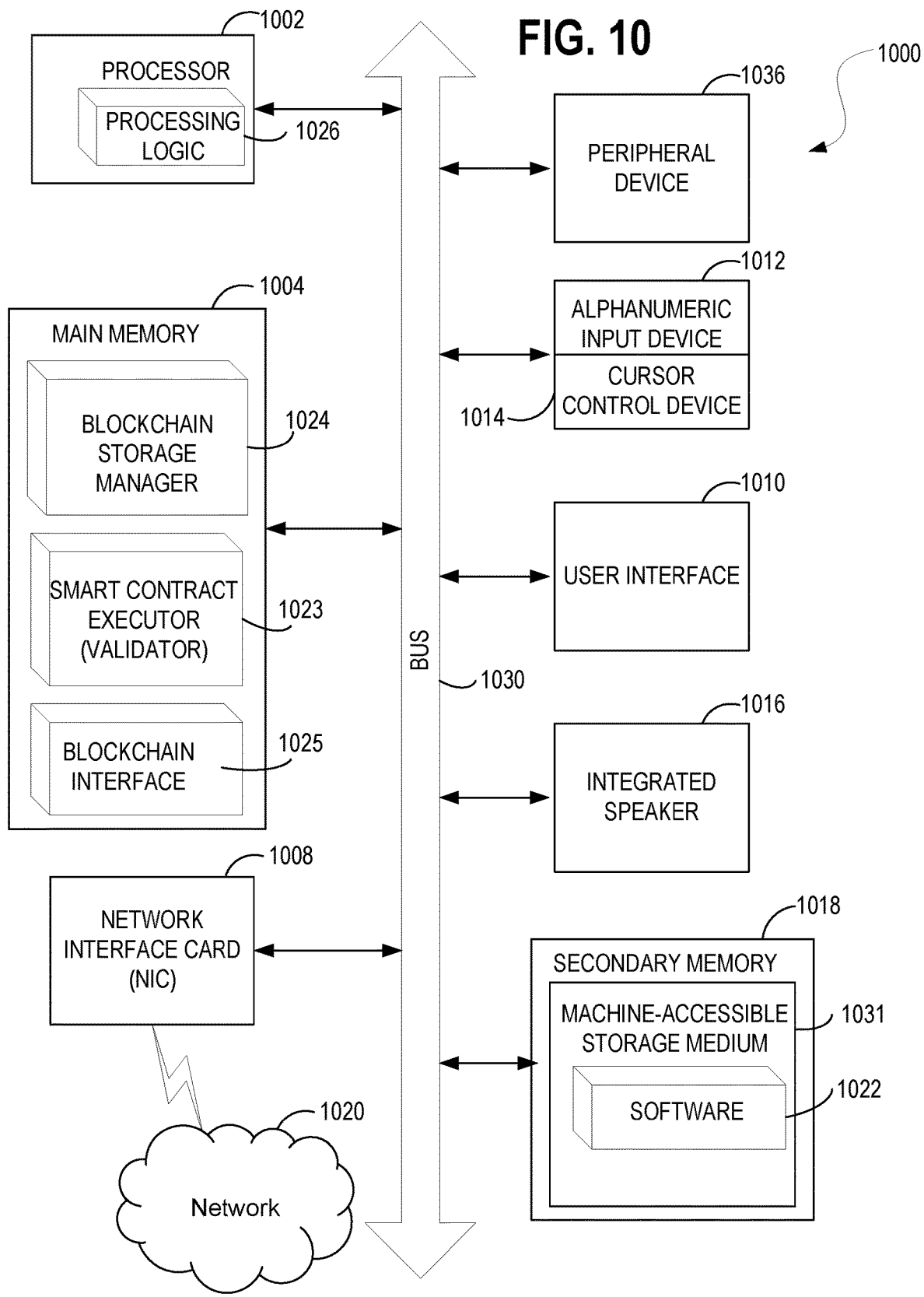

SYSTEMS, METHODS, AND APPARATUSES FOR IMPLEMENTING EFFICIENT STORAGE AND VALIDATION OF DATA AND METADATA WITHIN A BLOCKCHAIN USING DISTRIBUTED LEDGER TECHNOLOGY (DLT)

CLAIM OF PRIORITY

None.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of distributed ledger technology and blockchain platforms. More particularly, disclosed embodiments relate to systems, methods, and apparatuses for implementing efficient storage and validation of data and metadata within a blockchain using Distributed Ledger Technology (DLT) in conjunction with a cloud based computing environment.

BACKGROUND

The subject matter discussed in the background section should not be considered prior art merely because of its mention in the background section. Similarly, a problem mentioned in the background section or associated with the subject matter of the background section should not be considered to have been previously recognized in the prior art. The subject matter in the background section merely represents different approaches, which in and of themselves, may also correspond to claimed embodiments.

In modern financial systems, assets such as currencies, or securities, are typically held and traded electronically. Transferring assets often requires point-to-point interaction between multiple intermediaries, and reconciliation of duplicated ledgers. This system has some disadvantages, such as the time required for settlement of asset transfers or payments, which often takes days. Moreover, transfers often involve fee payments to multiple intermediaries, and reconciliation involves expensive overhead. Further still, it may be difficult to determine the status of a pending transfer or the current owner of an asset. Other potential problems include transfers that fail to complete, leading to uncertainty within such a system. Still further, such systems are very often restricted insomuch that it is difficult or infeasible to make one transfer conditional on another. Lastly the complexity of such systems makes it difficult to prevent fraud or theft, and, whether transactions are reversible depends on the transfer mechanism, rather than the business requirements of the transacting party.

Many of these problems are fixable if asset ownership were to be recorded on a single shared ledger. However, a combination of practical and technological constraints have made such ledgers difficult to adopt. Such a shared ledger tends to require trust in a single party. That party needs to have the computational capacity and bandwidth to process every transaction in real time. Additionally, to address the disadvantages discussed above, the ledger needs to support more sophisticated logic than simple ownership changes. In 2009, a person or group of persons operating under the pseudonym Satoshi Nakamoto introduced Bitcoin, the first implementation of a protocol that enables issuance of a digital bearer instrument without a trusted third party, using an electronic ledger replication system known as a blockchain. Bitcoin solves the problem of implementing decentralized digital cash, but its security model limits its efficiency and throughput, its design only supports a single asset, and the platform provides only limited support for custom programs that determine asset movement, sometimes called smart contracts, without any mechanism by which to customize the underlying functions or the associated smart contracts.

Distributed Ledger Technology (DLT) helps to address and overcome many of these types of shortcomings of conventional financial systems, however, the technology may nevertheless be expanded to introduce even further benefits to those utilizing such DLT and related blockchain platforms.

Ethereum, introduced in 2015, generalizes the concept of a blockchain to a fully programmable state replication mechanism. While it includes a much more powerful programming language, the Ethereum platform nevertheless presents its own unique challenges for scalability and efficiency, such as the inability to handle high-frequency updates and data streams (such as those generated by Internet of Things devices (IoT devices) or the ability to index location information for assets and stored records persistently stored to the blockchain platform.

Unfortunately, presently available Distributed Ledger Technology (DLT) and blockchains utilizing such DLT technologies store data in a fixed, immutable, and static manner. Thus, once you write the data into the blockchain, it is fixed there, wholly absent of context, metadata, or any other information which describes the stored data, describes the shape of the data, describes the type of the data, etc. Consequently, it may prove extremely difficult to transform data retrieved from the blockchain back into a format which is acceptable for the business objectives due to the lack of context of other metadata describing that stored data.

Further still, presently available Distributed Ledger Technology (DLT) and blockchains utilizing such DLT technologies require any record on the blockchain which is updated or modified to be re-written to the blockchain in its entirety, resulting in an explosion of total volume of stored data on the blockchain, which is unsustainable. Other conceived approaches write only the modified portion of a record to the blockchain, which results in inefficient data retrieval as the complete record is now split amongst multiple blocks on the blockchain and thus necessitates any retrieval of a modified record to search for, inspect, and retrieve data from multiple blocks on the blockchain.

The present state of the art may therefore benefit from the systems, methods, and apparatuses for improving upon, modifying, and expanding upon blockchain and related distributed ledger technologies by providing means for implementing efficient storage and validation of data and metadata within a blockchain using Distributed Ledger Technology (DLT) in conjunction with a cloud based computing environment as is described herein.

BRIEF DESCRIPTION OF THE DRAWINGS

Embodiments are illustrated by way of example, and not by way of limitation, and will be more fully understood with reference to the following detailed description when considered in connection with the figures in which:

FIG. 10 illustrates a diagrammatic representation of a machine in the exemplary form of a computer system, in accordance with one embodiment.

DETAILED DESCRIPTION

Figure 1A:
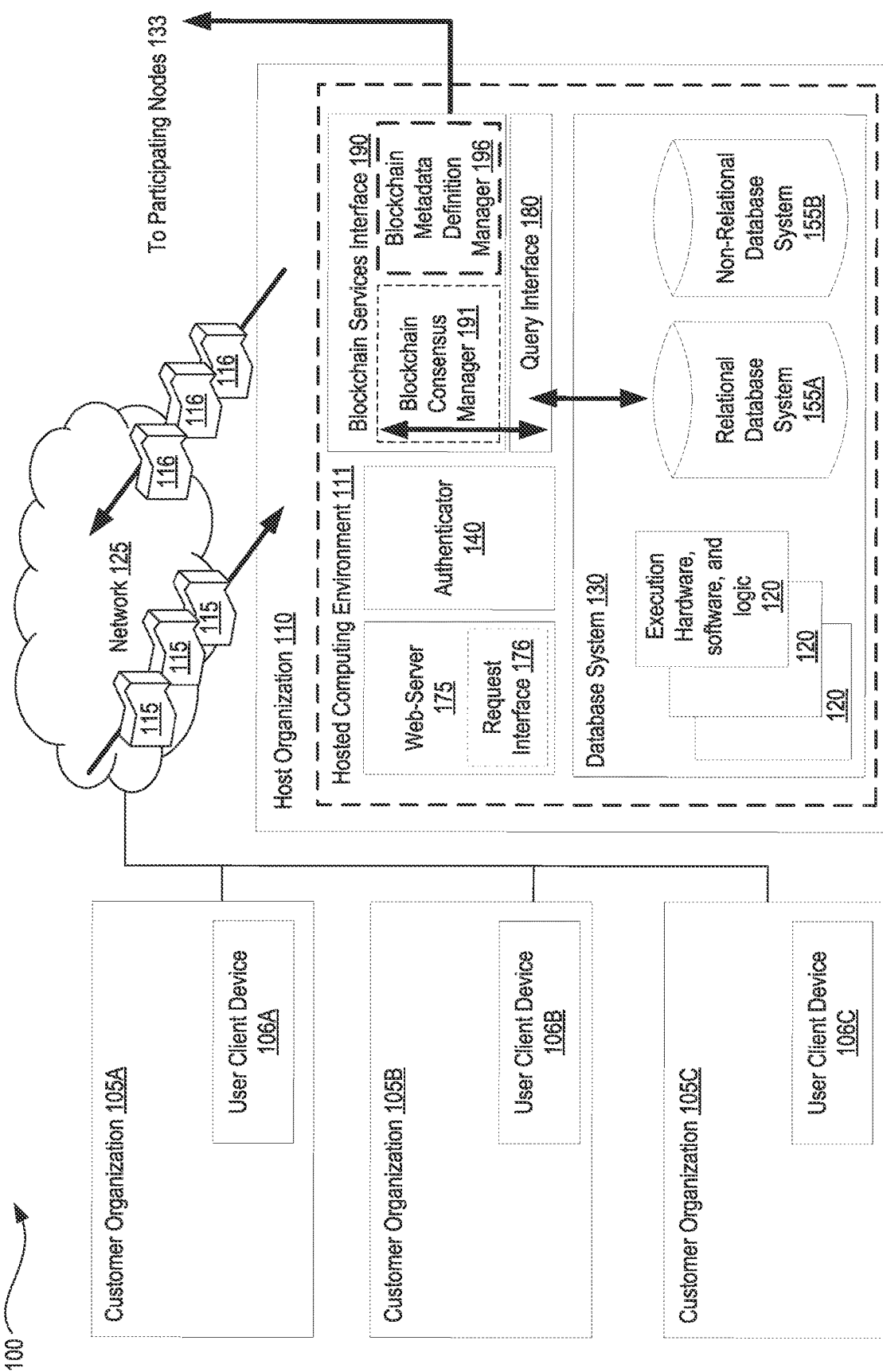
FIG. 1A depicts an exemplary architecture in accordance with described embodiments.

Described herein are systems, methods, and apparatuses for implementing efficient storage and validation of data and metadata within a blockchain using Distributed Ledger Technology (DLT) in conjunction with a cloud based computing environment.

For instance, according to a particular embodiment, there is a system having at least a processor and a memory therein, wherein the system includes means for operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new block on the blockchain pursuant to successful validation of the updated data values by the smart contract.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods have not been described in detail in order to avoid unnecessarily obscuring the disclosed embodiments.

In addition to various hardware components depicted in the figures and described herein, embodiments further include various operations described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated or reconfigured by a computer program stored in the computer. Such a computer program may be stored in a computer-readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1A depicts an exemplary architecture 100 in accordance with described embodiments.

In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records comprising user data on behalf of customer organizations 105A-C (e.g., users of such a database system 130 or tenants of a multi-tenant database type database system or the affiliated users of such a database system). Such databases include various database system types including, for example, a relational database system 155A and a non-relational database system 155B according to certain embodiments.

In certain embodiments, a client-server computing architecture may be utilized to supplement features, functionality, or computing resources for the database system 130 or alternatively, a computing grid, or a pool of work servers, or some combination of hosted computing architectures may provide some or all of computational workload and processing demanded of the host organization 110 in conjunction with the database system 130.

The database system 130 depicted in the embodiment shown includes a plurality of underlying hardware, software, and logic elements 150 that implement database functionality and a code execution environment within the host organization 110.

In accordance with one embodiment, database system 130 utilizes the underlying database system implementations 155A and 155B to service database queries and other data interactions with the database system 130 that communicate with the database system 130 via the query interface. The hardware, software, and logic elements 150 of the database system 130 are separate and distinct from the customer organizations (105A, 105B, and 105C) which utilize web services and other service offerings as provided by the host organization 110 by communicably interfacing to the host organization 110 via network 155. In such a way, host organization 110 may implement on-demand services, on-demand database services or cloud computing services to subscribing customer organizations 105A-C.

In one embodiment, each customer organization 105A-C is an entity selected from the group consisting of: a separate and distinct remote organization, an organizational group within the host organization 110, a business partner of the host organization 110, or a customer organization 105A-C that subscribes to cloud computing services provided by the host organization 110.

Further depicted is the host organization 110 receiving input and other requests 115 from customer organizations 105A-C via network 155 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155 or the query interface 180, pursuant to which results 116 are then returned to an originator or requestor, such as a user of one of a user client device 106A-C at a customer organization 105A-C.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 155 on behalf of the query interface 180 and for providing a web-based interface or other graphical displays to an end-user user client device 106A-C or machine originating such data requests 115.

Certain requests 115 received at the host organization may be directed toward a blockchain for which the blockchain services interface 190 of the host organization 110 operates as an intermediary.

The query interface 180 is capable of receiving and executing requested queries against the databases and storage components of the database system 130 and returning a result set, response, or other requested data in furtherance of the methodologies described. The query interface 180 additionally provides functionality to pass queries from web-server 175 into the database system 130 for execution against the databases 155 for processing search queries, or into the other available data stores of the host organization's computing environment 111. In one embodiment, the query interface 180 implements an Application Programming Interface (API) through which queries may be executed against the databases 155 or the other data stores.

In certain embodiments, the Application Programming Interface (API) of the query interface 180 provides an API model through which programmers, developers, and administrators may interact with the blockchain services interface 190 or the database system 130, or both, as the needs and particular requirements of the API caller dictate.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Further depicted within host organization 110 is the blockchain services interface 190 having included therein both a blockchain consensus manager 191 which facilitates consensus management for private and public blockchains upon which tenants, customer organizations, or the host organization itself 110 operate as a participating node on a supported blockchain. Additionally depicted is the blockchain storage manager 194 which enables the blockchain services interface 190 to efficiently store data and metadata to a blockchain which is interfaced via the blockchain services interface. For instance, via the blockchain storage manager 194, it is possible to store records more efficiently, for those records transacted onto the blockchain utilizing the cloud computing platform provided by the host organization.

As shown here, the blockchain services interface 190 communicatively interfaces the host organization 110 with other participating nodes 133 (e.g., via the network 155) so as to enable the host organization 110 to participate in available blockchain protocols by acting as a blockchain protocol compliant node so as to permit the host organization 110 to access information within such a blockchain as well as enabling the host organization 110 to provide blockchain services to other participating nodes 133 for any number of blockchain protocols supported by, and offered to customers and subscribers by the host organization 110. In certain embodiments, the host organization 110 both provides the blockchain protocol upon which the host organization then also operates as participating node. In other embodiments, the host organization merely operates as a participating node so as to enable the host organization 110 to interact with the blockchain protocol(s) provided by others.

According to certain embodiments, the blockchain storage manager 194 additionally permits direct retrieval of stored records from the blockchain via the use of an index. In certain embodiments, the index itself is stored on the blockchain while in other embodiments, the index may be stored within the host organization's database system 130, which is then referenced by the host organization (e.g., via the query interface 180) and then index information is then utilized to directly retrieve a record from the blockchain utilizing an address or index retrieved from the database system 130. Without such an indexing scheme, it is necessary to traverse the entirety of the blockchain from the end of the chain until the desired record is found.

A blockchain is a continuously growing list of records, grouped in blocks, which are linked together and secured using cryptography. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger, or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

Blockchain systems use a peer-to-peer (P2P) network of nodes, and consensus algorithms ensure replication of digital data across nodes. A blockchain system may be either public or private. Not all distributed ledgers necessarily employ a chain of blocks to successfully provide secure and valid achievement of distributed consensus: a blockchain is only one type of data structure considered to be a distributed ledger.

P2P computing or networking is a distributed application architecture that partitions tasks or workloads between peers. Peers are equally privileged, equally capable participants in an application that forms a peer-to-peer network of nodes. Peers make a portion of their resources, such as processing power, disk storage or network bandwidth, directly available to other network participants, without the need for central coordination by servers or hosts. Peers are both suppliers and consumers of resources, in contrast to the traditional client-server model in which the consumption and supply of resources is divided. A peer-to-peer network is thus designed around the notion of equal peer nodes simultaneously functioning as both clients and servers to the other nodes on the network.

For use as a distributed ledger, a blockchain is typically managed by a peer-to-peer network collectively adhering to a protocol for validating new blocks. Once recorded, the data in any given block cannot be altered retroactively without the alteration of all subsequent blocks, which requires collusion of the network majority. In this manner, blockchains are secure by design and are an example of a distributed computing system with high Byzantine fault tolerance. Decentralized consensus has therefore been achieved with a blockchain. This makes blockchains potentially suitable for the recording of events, medical records, insurance records, and other records management activities, such as identity management, transaction processing, documenting provenance, or voting.

A blockchain database is managed autonomously using a peer-to-peer network and a distributed timestamping server. Records, in the form of blocks, are authenticated in the blockchain by collaboration among the nodes, motivated by collective self-interests. As a result, participants' uncertainty regarding data security is minimized. The use of a blockchain removes the characteristic of reproducibility of a digital asset. It confirms that each unit of value, e.g., an asset, was transferred only once, solving the problem of double spending.

Blocks in a blockchain each hold batches ("blocks") of valid transactions that are hashed and encoded into a Merkle tree. Each block includes the hash of the prior block in the blockchain, linking the two. The linked blocks form a chain.

This iterative process confirms the integrity of the previous block, all the way back to the first block in the chain, sometimes called a genesis block or a root block.

By storing data across its network, the blockchain eliminates the risks that come with data being held centrally and controlled by a single authority. Although the host organization 110 provides a wide array of data processing and storage services, including the capability of providing vast amounts of data with a single responsible agent, such as the host organization 110, blockchain services differ insomuch that the host organization 110 is not a single authority for such services, but rather, via the blockchain services interface 190, is merely one of many nodes for an available blockchain protocol or operates as blockchain protocol manager and provider, while other participating nodes 133 communicating with the host organization 110 via blockchain services interface 190 collectively operate as the repository for the information stored within a blockchain by implementing compliant distributed ledger technology (DLT) in accordance with the available blockchain protocol offered by the host organization 110.

The decentralized blockchain may use ad-hoc message passing and distributed networking. The blockchain network lacks centralized points of vulnerability that computer hackers may exploit. Likewise, it has no central point of failure. Blockchain security methods include the use of public-key cryptography. A public key is an address on the blockchain. Value tokens sent across the network are recorded as belonging to that address. A private key is like a password that gives its owner access to their digital assets or the means to otherwise interact with the various capabilities that blockchains support. Data stored on the blockchain is generally considered incorruptible. This is where blockchain has its advantage. While centralized data is more controllable, information and data manipulation are common. By decentralizing such data, blockchain makes data transparent to everyone involved.

Every participating node 133 for a particular blockchain protocol within a decentralized system has a copy of the blockchain for that specific blockchain protocol. Data quality is maintained by massive database replication and computational trust. No centralized official copy of the database exists and, by default, no user and none of the participating nodes 133 are trusted more than any other, although this default may be altered via certain specialized blockchain protocols as will be described in greater detail below. Blockchain transactions are broadcast to the network using software, via which any participating node 133, including the host organization 110 when operating as a node, receives such transaction broadcasts. Broadcast messages are delivered on a best effort basis. Nodes validate transactions, add them to the block they are building, and then broadcast the completed block to other nodes. Blockchains use various time-stamping schemes, such as proof-of-work, to serialize changes. Alternate consensus may be utilized in conjunction with the various blockchain protocols offered by and supported by the host organization, with such consensus mechanisms including, for example proof-of-stake, proof-of-authority and proof-of-burn, to name a few.

Open blockchains are more user friendly than conventional traditional ownership records, which, while open to the public, still require physical access to view. Because most of the early blockchains were permissionless, there is some debate about the specific accepted definition of a so called "blockchain," such as, whether a private system with verifiers tasked and authorized (permissioned) by a central authority is considered a blockchain. Proponents of permissioned or private chains argue that the term blockchain may be applied to any data structure that groups data into time-stamped blocks. These blockchains serve as a distributed version of multiversion concurrency control (MVCC) in databases. Just as MVCC prevents two transactions from concurrently modifying a single object in a database, blockchains prevent two transactions from spending the same single output in a blockchain. Regardless of the semantics or specific terminology applied to the varying types of blockchain technologies, the methodologies described herein with respect to a "blockchain" expand upon conventional blockchain protocol implementations to provide additional flexibility, open up new services and use cases for the described blockchain implementations, and depending upon the particular blockchain protocol offered or supported by the blockchain services interface 190 of the host organization 110, both private and public mechanisms are described herein and utilized as needed for different implementations supported by the host organization 110.

An advantage to an open, permissionless, or public, blockchain network is that guarding against bad actors is not required and no access control is needed. This means that applications may be added to the network without the approval or trust of others, using the blockchain as a transport layer. Conversely, permissioned (e.g., private) blockchains use an access control layer to govern who has access to the network. In contrast to public blockchain networks, validators on private blockchain networks are vetted, for example, by the network owner, or one or more members of a consortium. They rely on known nodes to validate transactions. Permissioned blockchains also go by the name of "consortium" or "hybrid" blockchains. Today, many corporations are using blockchain networks with private blockchains, or blockchain-based distributed ledgers, independent of a public blockchain system.

Figure 1B:
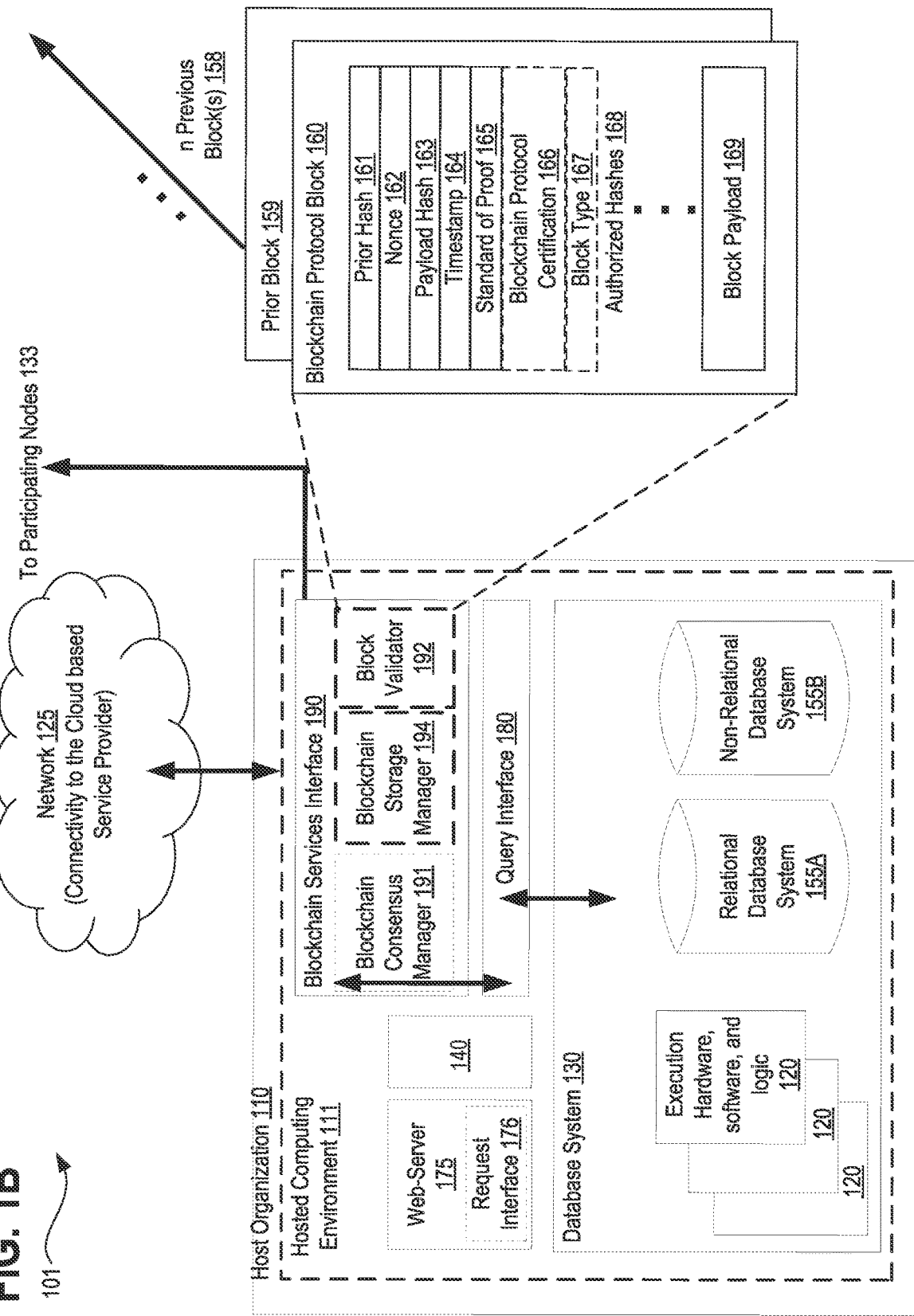
FIG. 1B depicts another exemplary architecture, with additional detail of a blockchain protocol block operating in conjunction with a block validator, in accordance with described embodiments.

FIG. 1B depicts another exemplary architecture 101, with additional detail of a blockchain protocol block 160 operating in conjunction with a block validator 192, in accordance with described embodiments.

In particular, a blockchain protocol block 160 is depicted here to be validated by the block validator 192 of the host organization 110, with the blockchain protocol block including addition detail of its various sub-components, and certain optional elements which may be utilized in conjunction with the blockchain protocol block 160 depending on the particular blockchain protocol being utilized via the blockchain services interface 190.

In accordance with a particular embodiment, the blockchain protocol block 160 depicted here defines a particular structure for how the fundamental blocks of any given blockchain protocol supported by the host organization 110 is organized.

According to certain embodiments, the blockchain storage manager 194 as shown here may utilize a specific blockchain implementation for use in conjunction with a specialized indexing scheme for stored records written to the blockchain so as to enable more efficient data location and retrieval of the stored records persistently stored via the blockchain. In other embodiments, the host organization 110 may operate as a participating node within a public or a private or a permissioned blockchain which is then made accessible to the tenants of the host organization via the cloud computing platform including for use with the declared smart actions configured by such tenants.

It may be necessary in accordance with certain embodiments that a customized blockchain protocol implementation be provided by the host organization to support use of the indexing scheme, however, in embodiments where the index is stored within the host organization 110, any blockchain utilized to persist the stored records will be unaffected as the blockchain is agnostic as to the use of the indexing scheme implemented by the host organization. Where the host organization implements a customized blockchain protocol implementation, the host organization may be enabled to provide an overall greater suite of functionality to tenants of the host organization 110 and users of any applications provided by such tenants.

With respect to the blockchain protocol 160 (regardless of whether it is an existing and already available blockchain protocol or a custom implemented blockchain protocol), the prior hash 161 is the result of a non-reversible mathematical computation using data from the prior block 159 as the input. The prior block 159 in turn utilized data from the n previous block(s) 158 to form the non-reversible mathematical computation forming the prior hash for those respective blocks. For instance, according to one embodiment, the non-reversible mathematical computation utilized is a SHA256 hash function, although other hash functions may be utilized. According to such an embodiment, the hash function results in any change to data in the prior block 159 or any of the n previous blocks 158 in the chain, causing an unpredictable change in the hash of those prior blocks, and consequently, invalidating the present or current blockchain protocol block 160. Prior hash 161 creates the link between blocks, chaining them together to form the current blockchain protocol block 160.

When the block validator 192 calculates the prior hash 161 for the prior block 159, the hash must meet certain criteria defined by data stored as the standard of proof 165. For instance, in one embodiment, this standard of proof 165 is a number that the calculated hash must be less than. Because the output of the hashing function is unpredictable, it cannot be known before the hash is calculated what input will result in an output that is less than the standard of proof 165. The nonce 162 is used to vary the data content of the block, allowing for a large number of different outputs to be produced by the hash function in pursuit of an output that meets the standard of proof 165, thus making it exceedingly computationally expensive (and therefore statistically improbable) of producing a valid block with a nonce 162 that results in a hash value meeting the criteria of the standard of proof 165.

Payload hash 162 provides a hash of the data stored within the block payload 169 portion of the blockchain protocol block 160 and need not meet any specific standard of proof 165. However, the payload hash is included as part of the input when the hash is calculated for the purpose of storing as the prior hash 161 for the next or subsequent block. Timestamp 164 indicates what time the blockchain protocol block 160 was created within a certain range of error. According to certain blockchain protocol implementations provided via the blockchain services interface 190, the distributed network of users (e.g., blockchain protocol nodes) checks the timestamp 164 against their own known time and will reject any block having a time stamp 164 which exceeds an error threshold, however, such functionality is optional and may be required by certain blockchain protocols and not utilized by others.

The blockchain protocol certification 166 defines the required size and/or data structure of the block payload 169 as well as certifying compliance with a particular blockchain protocol implementation, and thus, certifies the blockchain protocol block subscribes to, implements, and honors the particular requirements and configuration options for the indicated blockchain protocol. The blockchain protocol certification 166 may also indicate a version of a given blockchain protocol and the blockchain protocol may permit limited backward and forward compatibility for blocks before nodes will begin to reject new blockchain protocol blocks for non-compliance.

Block type 167 is optional depending on the particular blockchain protocol utilized. Where required for a specific blockchain protocol exposed via the blockchain services interface 190, a block type 167 must be indicated as being one of an enumerated list of permissible block types 167 as will be described in greater detail below. Certain blockchain protocols use multiple different block types 167, all of which may have varying payloads, but have a structure which is known a priori according to the blockchain protocol utilized, the declared block type 167, and the blockchain protocol certification 166 certifying compliance with such requirements. Non-compliance or an invalid block type or an unexpected structure or payload for a given declared block type 167 will result in the rejection of that block by network nodes.

Where a variable sized block payload 169 is utilized, the block type 167 may indicate permissibility of such a variable sized block payload 169 as well as indicate the index of the first byte in the block payload 169 and the total size of the block payload 169. The block type 167 may be utilized store other information relevant to the reading, accessing, and correct processing and interpretation of the block payload 169.

Block payload 169 data stored within the block may relate to any number of a wide array of transactional data depending on the particular implementation and blockchain protocol utilized, including payload information related to, for example, financial transactions, ownership information, data access records, document versioning, medical records, voting records, compliance and certification, educational transcripts, purchase receipts, digital rights management records, or literally any kind of data that is storable via a payload of a blockchain protocol block 160, which is essentially any data capable of being digitized. Depending on the particular blockchain protocol chosen, the payload size may be a fixed size or a variable size, which in either case, will be utilized as at least part of the input for the hash that produces the payload hash 163.

Various standard of proofs 165 may utilized pursuant to the particular blockchain protocol chosen, such as proof of work, hash value requirements, proof of stake, a key, or some other indicator such as a consensus, or proof of consensus. Where consensus-based techniques are utilized, the blockchain consensus manager 191 provides consensus management on behalf of the host organization 110, however, the host organization 110 may be operating only as one of many nodes for a given blockchain protocol which is accessed by the host organization 110 via the blockchain services interface 190 or alternatively, the host organization 110 may define and provide a particular blockchain protocol as a cloud based service to customers and subscribers (and potentially to non-authenticated public node participants), via the blockchain services interface 190. Such a standard of proof 165 may be applied as a rule that requires a hash value to be less than the proof standard, more than the proof standard, or may require a specific bit sequence (such as 10 zeros, or a defined binary sequence) or a required number of leading or trailing zeroes (e.g., such as a hash of an input which results in 20 leading or trailing zeros, which is computationally infeasible to provide without a known valid input).

The hash algorithms used for the prior hash 161, the payload hash 163, or the authorized hashes 168 may be all of the same type or of different types, depending on the particular blockchain protocol implementation. For instance, permissible hash functions include MD5, SHA-1, SHA-224, SHA-256, SHA-384, SHA-515, SHA-515/224, SHA-515/256, SHA-3 or any suitable hash function resistant to pre-image attacks. There is also no requirement that a hash is computed only once. The results of a hash function may be reused as inputs into another or the same hash function again multiple times in order to produce a final result.

Figure 2A:
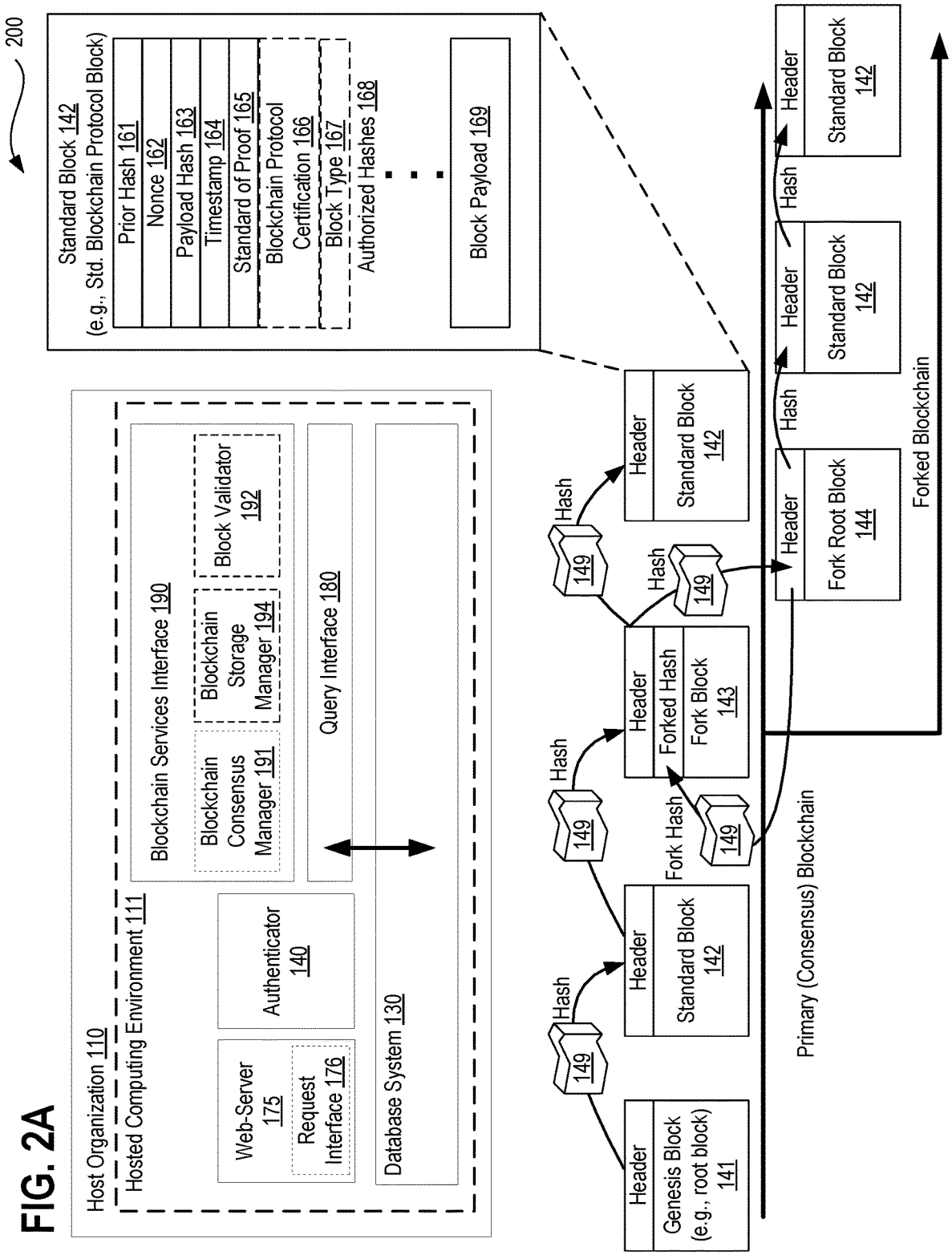
FIG. 2A depicts another exemplary architecture, with additional detail of a blockchain and a forked blockchain, in accordance with described embodiments.

FIG. 2A depicts another exemplary architecture 200, with additional detail of a blockchain and a forked blockchain, in accordance with described embodiments.

More particularly, there is now depicted a primary blockchain (e.g., a consensus blockchain) which begins with a genesis block 141 (sometimes called a root block) followed by a series of standard blocks 142, each having a header which is formed based at least in part from a hash of the header of the block which precedes it. There is additionally depicted a forked blockchain formed with an initial fork root block 144, followed by then a series of standard blocks 142. Because each block in the blockchain contains a hash of the immediately preceding block stored in the previous hash, a link going back through the chain from each block is effectively created via the blockchain and is a key component to making it prohibitively difficult or computationally infeasible to maliciously modify the chain.

As depicted, the primary blockchain includes a single fork which is originating from the fork block 143. As shown here, the genesis block 141 is a special block that begins the primary blockchain and is different from the other blocks because it is the first block in the primary blockchain and therefore, cannot by definition, include a hash of any previous block. The genesis block 141 marks the beginning of the primary blockchain for the particular blockchain protocol being utilized. The blockchain protocol governs the manner by which the primary blockchain grows, what data may be stored within, and forked blockchains are created, as well as the validity of any block and any chain may be verified via the block validator 192 of the host organization or any other participating network node of the blockchain pursuant to the rules and requirements set forth by the blockchain protocol certification 166 which is embedded within the genesis block 141 and then must be certified to and complied with by every subsequent block in the primary blockchain or any forked blockchain.

The blockchain protocol certification 166 inside each block in the genesis chain defines the default set of rules and configuration parameters that allows for the creation of forks and the modification of rules and configuration parameters in those forks, if any. Some blockchain protocol implementations permit no variation or non-compliance with the default set of rules as established via the blockchain protocol certification 166 and therefore, any fork will be the result of pending consensus for multiple competing and potentially valid primary blockchains. Once consensus is reached (typically after one or two cycles of new block formations) then the branch having consensus will be adopted and the fork truncated, thus returning to a single primary consensus blockchain. Conversely, in other implementations, a forked blockchain may permissibly be created and continue to exist indefinitely alongside the primary blockchain, so long as the forked blockchain complies with the blockchain protocol certification 166 and permissible variation of rules and configuration parameters for a forked blockchain within that blockchain protocol.

Fork block 143 anchors the forked blockchain to the primary blockchain such that both the primary blockchain and the forked chain are considered valid and permissible chains where allowed pursuant to the blockchain protocol certification 166. Normally, in a blockchain, all non-consensus forks are eventually ignored or truncated and thus considered invalid except for the one chain representing the longest chain having consensus. Nevertheless, the fork block 143 expands beyond the conventional norms of prior blockchain protocols by operating as and appearing as though it is a standard block 142, while additionally including a reference to a fork hash 149 identifying the first block of the permissible forked blockchain, represented here as the fork root block 144 for the valid forked blockchain. The fork root block 144 of the forked blockchain is then followed by standard blocks, each having a header based on a prior valid block's hash, and will continue indefinitely.

According to a particular embodiment, the forked blockchain utilizes some variation from the rules and configuration parameters utilized by default within the primary consensus blockchain, resulting in the need for a valid forked blockchain. Therefore, the variation of the rules and configuration parameters are encoded within a new blockchain protocol certification 166 for the fork root block 144 which, as noted above, must remain compliant with the original rules and valid range of configuration parameters as set forth by the blockchain protocol certification 166 of the original genesis block 141 for the primary blockchain. Because the fork root block 144 must continue to carry the original blockchain protocol certification 166, a forked blockchain protocol certification may be stored within a block payload 169 segment of the fork root block 144 thus establishing the rules and permissible configuration parameters of subsequent standard blocks 142 in the forked blockchain.

For instance, a forked blockchain may be utilized to support declarative smart actions as enabled by the host organization where a forked blockchain of a public or private blockchain is customized via a new blockchain protocol certification 166 to support both the declarative establishment of smart actions and their required information capture provisions as defined by an administrator as well as the ability to map the data captured with a transaction utilizing such a declared smart action back to the cloud platform entity as provided by the host organization.

When a new blockchain protocol certification 166 is applied for a valid fork, its rules and configuration is applied to all subsequent standard blocks for the fork and all subsequent sub-forks, where additional forks are permitted, and enforced by the participating nodes as though the forked blockchain were an original primary blockchain. Such forks may be desirable for certain customers seeking to apply a specialized set of rules or configurations for a particular group, such as a working group, a certain sub-type of transactions, or some other variation from the primary blockchain where an entirely separate "sidechain" is not required or desirable. A forked blockchain is distinguishable from a sidechain as it remains part of the same blockchain protocol and is permanently connected with the primary blockchain at the fork block 143 with a returned fork hash 149 being returned to and immutably written into the primary consensus blockchain where it will remain via the chain hashing scheme for all subsequent standard blocks of the primary blockchain. Stated very simply, the forked blockchain is explicitly tied to the primary blockchain via the fork block 143. Conversely, a sidechain may be an entirely distinct blockchain protocol for which an agreed rate of exchange or conversion factor is applied to all information or value passed between the primary blockchain and any sidechain without any explicit reference or fork hash 149 embedded within the primary blockchain.

Sidechaining therefore is a mechanism by which declared smart actions for assets, tokens, value, or payload entries from one blockchain may be securely used within a completely separate blockchain via a pre-defined exchange or conversion scheme, and yet, be permissibly moved back to the original chain, if necessary. By convention, the original blockchain is referred to as the main chain or the primary blockchain, whereas any additional blockchains which allow users to transact within them utilizing the tokens, values, or payload of the main chain are referred to as sidechains. For instance, there may be a private blockchain with a defined linkage to a public blockchain, thus allowing tokens, value, or payload data to be securely moved between the public blockchain and the private blockchain.

Consider for instance the host organization's use of a previously existing blockchain for the implementation of the services provided by the blockchain storage manager 194. It may be advantageous to utilize an existing blockchain, but then creating a specialized sidechain or a forked blockchain specifically for the services provided by the blockchain storage manager 194 yet remain in compliance with the blockchain protocol certification 166 required by the primary (consensus) blockchain.

According to described embodiments, the blockchain protocol certification 166 defining the protocol rules for a forked chain may be developed in any relevant programming or scripting language, such as, Python, Ruby, Perl, JavaScript, PHP, Scheme, VBScript, Java, Microsoft .Net, C++, C#, C, or a custom-created language for defining the protocol rules.

Under normal operating conditions, even conventional blockchains naturally fork from time to time, however, with previously known blockchains, ultimately only a single branch may form the primary consensus chain and all other forks must be ignored or truncated with only the primary consensus blockchain being considered as valid. Consensus on which chain is valid may be achieved by choosing the longest chain, which thus represents the blockchain having the most work put into completing it. Therefore, it is necessary to utilize the fork block 143 as described herein to permit permissibly forked chains to be created and certified as authorized forks via the fork hash 149 so as to prevent participating nodes to ignore or truncate the fork. Because each node may independently validate the forked blockchain, it will not be ignored, just as a validated primary blockchain will not be ignored upon having consensus.

Figure 2B:
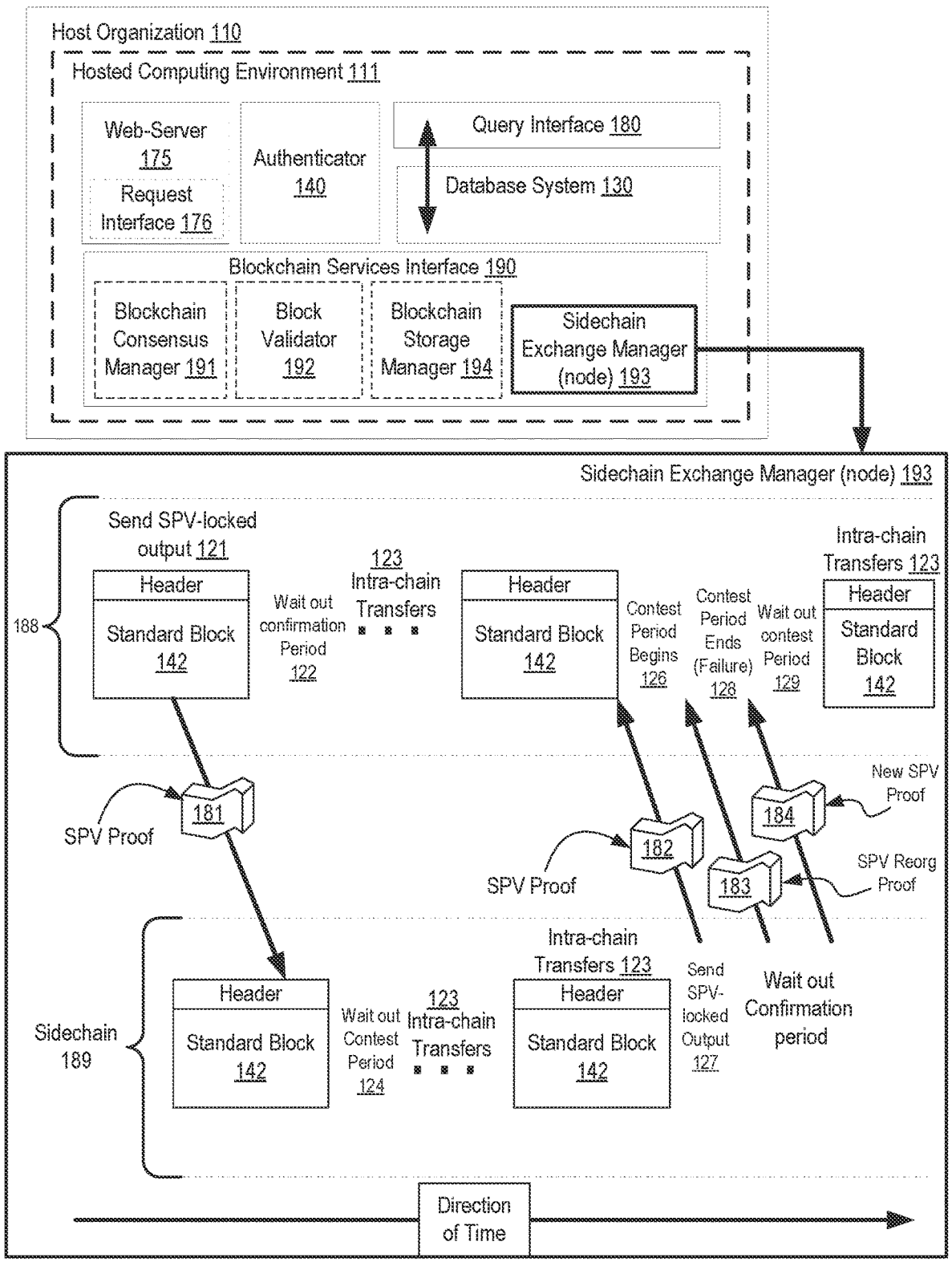
FIG. 2B depicts another exemplary architecture with additional detail for sidechains, in accordance with described embodiments.

FIG. 2B depicts another exemplary architecture 201 with additional detail for sidechains, in accordance with described embodiments.

More particularly, there is depicted here mechanism by which to perform a symmetric two-way pegged transfer from a parent blockchain 188 (e.g., e.g., a primary chain) to a sidechain 189, which may be a different blockchain protocol supported by and provided by the host organization 110 or the sidechain may be a foreign blockchain, public or private, for which the sidechain exchange manager 193 of the host organization 110 participates as a node, so as to permit access and transactional capabilities with the sidechain.

Regardless, it is in accordance with described embodiments that inter-chain transfers between the parent blockchain 188 and the sidechain 189 may permissibly performed in compliance with the rules and conditions of each respective blockchain. Notably, as described here, the perspective of each blockchain is interchangeable insomuch that the sidechain 189 depicted here may consider itself as a primary or parent blockchain and consider the depicted parent blockchain 188 as the child blockchain or a sidechain. Regardless, each blockchain operates independently, yet has a defined exchange mechanism by which to exchange assets, coins, tokens, value, or other payload information between them which have been created by a transaction utilizing a declared smart action.

As shown here, the sidechain exchange manager 193 of the host organization may send a parent chain asset as an output of the parent blockchain 188 at operation 151.

A Simplified Payment Verification (SPV) proof 181 associated with the parent blockchain 188 asset is generated as the output and communicated to the sidechain 189. The SPV proof may include a threshold level of work, and the generating may take place over a predetermined period of time, which may also be referred to as a confirmation period 152. The confirmation period of a transfer between chains may be a duration for which a coin, token, or other exchanged value is locked on the parent blockchain 188 before may successfully be transferred to the sidechain 189. This confirmation period may allow for sufficient work to be created such that a denial of service attack in the next waiting period becomes more computationally difficult.

Consider for instance an exemplary confirmation period which may be on the order of 1-2 days. The confirmation period may be implemented, in such an example, as a per-sidechain security parameter, which trades off cross-chain transfer speeds in exchange for greater security. Other confirmation periods which are much shorter may be utilized where sufficiently difficult proof of work conditions are effectuated so as to ensure adequate security so as to protect the integrity of both blockchains and negate the potential for fraudulent transactions.

The output created on the parent blockchain 188 may specify via rules and configuration parameters (e.g., stored within the blockchain protocol certification portion of each block of the parent blockchain 188) a requirement that any spending, transfer, or consumption of an asset received by the output in the future are burdened with additional conditions, in addition to the rules governing transfer within the parent chain. For example, any release of assets received by the output may require additional conditions for verifying a proof from the destination chain, such as validating that the rules for the destination chain proof show that the destination chain has released the asset and show to where the asset has been released. After creating the output on the parent blockchain 188, the user waits out the confirmation period, meanwhile, intra-chain transfers 153 continue to occur. Subsequent to waiting out the confirmation period, a transaction is then created on the sidechain 189 referencing the output from the parent blockchain 188.

The sidechain, using a sidechain validator service, such as the block validator 192 of the host organization, is then provided with an SPV proof that shows the parent chain asset was created and encumbered by sufficient work within the parent chain. A sidechain validator service (e.g., block validator 192 if performed by the host organization's available services) will then validate that the SPV proof associated with the parent blockchain 188 asset meets the required threshold level of work indicated by the SPV proof at operation 154 and a sidechain 189 asset corresponding to the parent blockchain 188 asset is then generated.

The generated sidechain 189 asset also may be held for a predetermined contest period at operation 154, during which time the transfer will be invalidated if a reorganization proof 183 associated with the parent blockchain 188 asset is detected in the parent blockchain.

The contest period at operation 154 may be a duration during which a newly-transferred token, coin, value, or payload data may not be spent, accessed, or consumed on the sidechain 189. The predetermined contest period is implemented to prevent any possibility for double-spending in the parent blockchain 188 by transferring previously-locked coins, tokens, value, or payload data during a reorganization. If at any point during this delay, a new SPV proof 184 (known as a "reorganization proof") is published containing a chain with more aggregate work which does not include the block in which the lock output was created, the conversion is retroactively invalidated. If no reorganization proof is detected, the sidechain asset may be released. All participating nodes on the sidechain have an incentive to produce reorganization proofs if possible, as the consequence of a bad proof being admitted degrades the value of all sidechain tokens, coins, value, or trust in the authenticity of payload data stored by the sidechain 189.

Similar to the above, an exemplary contest period at operation 156 may also be on the order of 1-2 days. To avoid these delays, users may instead employ use atomic swaps for fungible transfers, so long as a liquid market is available. Where the exchanged asset is a unique or less common token, value, or payload data, atomic swaps will not be feasible and a sidechain transfer must instead occur, despite the necessity of a potentially lengthy 1-2 day waiting period.

Upon eventual release of the sidechain asset, the side chain asset corresponding to the parent chain asset may then be transferred or consumed within the sidechain one or more times the intra-chain transfers 153 of the sidechain 189. While locked on the parent blockchain 188, the asset is freely transferable within the sidechain and without requiring any further interaction with the parent blockchain 188, thus permitting the sidechain 189 to again operate wholly independently. Notwithstanding the above, the sidechain asset retains its identity as a parent chain token, coin, value, or payload data and may therefore, if the need arises, be transferred back to the originating parent blockchain 188 from which the sidechain asset originated. In certain embodiments, transfers are relegated to only a single hop, such that an asset cannot be transferred to a sidechain 189 and then transferred again to another sidechain, where it is necessary to prevent obfuscation of the source. Such restrictions are dependent upon the particular blockchain protocol chosen and the define exchange agreement (e.g., pegging conditions) established between a parent blockchain 188 and a sidechain 189.

Where it becomes necessary to redeem a sidechain asset in the parent blockchain 188, the sidechain asset may be sent to an output of the sidechain as depicted at operation 157. An SPV proof 182 associated with the sidechain asset is thus generated and communicated to the parent blockchain 188. A parent chain validator service, such as the block validator 192 of the host organization 110, may validate the SPV proof 182 associated with the sidechain asset at operation 156. The validated the SPV proof 182 associated with the sidechain 189 asset may include, for example, validation that the SPV proof 182 associated with the sidechain asset meets the threshold level of work indicated by the SPV proof 182 associated with the sidechain asset.

As before, the parent chain asset associated with the sidechain asset may be held for a second predetermined contest period at step 156, during which a release of the parent chain asset is denied at operation 128 if a reorganization proof 183 associated with the sidechain asset is detected in the sidechain. The parent chain asset may be released if no reorganization proof 183 associated with the sidechain asset is detected.

If validation failure occurs with respect to the second SPV proof 184, after the reorganization proof 183 is received, then a second SPV proof 184 associated with the sidechain asset may be received and validated by the parent blockchain 188 during a third predetermined contest period at operation 159. The parent blockchain 188 asset may be released if no reorganization proof associated with the sidechain asset is detected during the third predetermined contest period, after which the parent chain asset is free to be transferred within the parent chain via the depicted intra-chain transfers 153 shown at the rightmost side of the parent blockchain 188 flow.

Because pegged sidechains may carry assets from many different blockchains, it may be problematic to make assumptions about the security of the other foreign blockchains. It is therefore required in accordance with certain embodiments that different assets are not interchangeable (except by an explicit trade) within the sidechain. Otherwise, a malicious user may potentially execute a fraudulent transaction by creating a worthless chain with a worthless asset, and then proceed to move the worthless asset from their worthless chain into the primary blockchain 188 or into a sidechain 189 with which the primary blockchain 188 interacts and conducts exchanges. This presumes that the worthless chain secures a pegged exchange agreement with the sidechain. However, because the rules, configuration options, and security scheme of the sidechain 189 is not controlled by the parent blockchain 188 (assuming the sidechain is a foreign sidechain and not another blockchain protocol provided by the host organization 110), it simply cannot be known with certainty that the sidechain 189 being interacted with does not contain such vulnerabilities. To negate this potential security vulnerability, the sidechain 189 may be required, as per the pegged exchange agreement, to treat assets from separate parent blockchains as wholly as separate asset types, as denoted by the block type portion of a blockchain protocol block as depicted at FIG. 1B, element 167.

With a symmetric two-way pegged sidechain transfer, both the parent blockchain 188 and sidechains 189 may perform SPV validation services of data on each other, especially where the parent blockchain 188 is provided the host organization and where the sidechain is a foreign sidechain for which the host organization is merely a participating node via the sidechain exchange manager node 193. Because the parent blockchain 188 clients (e.g., participating nodes) do not observe every sidechain, users import proofs of work from the sidechain into the parent chain in order to prove possession. In a symmetric two-way peg, the reverse is also true. For example, to use Bitcoin as a parent blockchain 188, an extension script to recognize and validate such SPV proofs may be utilized. To facilitate such transactions, the SPV proofs are sufficiently small in size so as to fit within a Bitcoin transaction payload. However, such a change may alternatively be implemented as a forking transaction, as described previously, without affecting transactions not involved in pegged sidechain transactions. Stated differently, using symmetric two-way pegged sidechains as described above, no further restrictions need to be placed upon any transaction deemed valid within Bitcoin.

Through the use of such pegged sidechains transactions, independent blockchains are made to be flexible enough to support many assets, including assets that did not exist when the chain was first created. Each of these assets may be labeled with the blockchain from which it was transferred so as to ensure that transfers may be unwound (e.g., transferred back) correctly.

According to certain embodiments, the duration of the contest period is made as a function of the relative hashpower of the parent chain and the sidechain, such that the receiving sidechain (or the parent blockchain with an incoming transfer) may only unlock tokens, coins, value, or data payloads, given an SPV proof of one day's worth of its own proof-of-work, which may, for example, correspond to several days of the sending blockchain's proof-of-work. Security parameters of the particular sidechain's blockchain protocol implementation may thus be tuned to each particular sidechain's implementation.

According to described embodiments, the blockchain validator 192 may require, utilize, or apply various types of consensus management to the blocks requiring validation.

When a block containing a particular asset or transaction is to be added to the blockchain, the transaction type database is queried using the type of the particular asset or transaction that is to be added to the blockchain to determine the corresponding consensus protocol type that is to be used to commit the particular asset or transaction, or block containing the particular asset or transaction, to the blockchain. For example, in the database, a transaction type of "loan" may be associated with a consensus protocol type of "proof of stake" (PoS), an asset type of "document" may be associated with a consensus protocol type of "Byzantine Fault Tolerant" (BFT), an asset or transaction type of "currency" may be associated with a consensus protocol type of "proof of work" (PoW), and a default transaction type to be used in the case of an otherwise unenumerated transaction type in the database may be associated with a default consensus protocol type, say, PoS. Another transaction type may correspond to an asset type having metadata stored therein, possibly typed as "metadata," while a closely related transaction type stores a "related entity" as metadata within the blockchain having a transaction type of either "metadata" if it shares the same type as normal metadata or having a transaction type of "related entity" if separate. Still further, a "stored record" transaction type may be utilized to store a record having multiple distinct data elements embedded therein, typically which will be defined by metadata specified by an application developer.

For instance, when a block or transaction within a block having a particular transaction type corresponding to transactions utilizing a declared smart action is to be added to the blockchain, the consensus protocol type to be used to commit the block or transaction therein to the blockchain is PoS, when a block or transaction therein with a particular asset having the type "document" is to be added to the blockchain, the consensus protocol type to be used to commit the block or transaction therein to the blockchain is BFT, and when a block or transaction therein with a particular transaction having a transaction type that is not specified in the database is to be added to the blockchain, then the default consensus protocol type of PoS is to be used to commit the block or transaction therein to the blockchain.

This selected consensus protocol type may be communicated to the nodes in the consortium for use in for validating the request to add the new block or transaction therein to the blockchain. According to certain embodiments, the host organization 110 receives validation of the request to add the new block or transaction therein to the blockchain when the nodes in the consortium reach consensus according to the selected consensus protocol to add the block or transaction therein to the blockchain and communicate such to the host.

Any relevant factors may be used in determining which nodes participate in the consensus protocol, including, for example, the selected consensus protocol itself, a particular node's computing resources, the stake a particular node has in the consortium or the selected consensus protocol, relevant (domain) knowledge a particular node has, whether that knowledge is inside (on-chain) or outside (off-chain) with regard to the blockchain or consortium, a particular node's previous or historical performance, whether in terms of speed or accuracy, or lack thereof, in participating in the selected consensus protocol, the block number of the new block being added to the blockchain, the number of transactions in the new block, the size of the block, and the fiduciary or nonfiduciary nature of the assets or transactions in the block being added to the blockchain.

According to a particular embodiment, the host organization 110 receives from each of one or more of the nodes in a peer-to-peer network a weighted vote to validate or to add a new block or transaction therein to the blockchain, in response to the request, or in response to a request for a vote issued by the blockchain platform host. These nodes learn of the request either through a blockchain protocol packet broadcast by the node generating the request, or by communication with other nodes in the consortium or the blockchain platform host providing notice of the request in conjunction or combination with the request for a vote transmitted by the blockchain platform host. The host organization then responsively validates, or receives validation of, the request to add the new block or transaction therein to the blockchain when a sum of the received weighted votes exceeds a threshold.

According to another embodiment, a consortium of nodes participate in a private, or permissioned, blockchain within which each node is assigned a weight that its vote will be given, for example, based on domain (general) knowledge about the transactions, or types of transactions, the nodes may add to a new block in the blockchain. Certain nodes may be given a zero weight within such a permissioned blockchain, whereas other nodes may be given such a significant weight that their vote is near controlling or even controlling when combined with a limited number of other highly weighted nodes, depending upon the particular implementation.

Before a node adds a transaction to a new block of the blockchain, or before the new block including the transaction may be added to the blockchain, other nodes in the consortium vote on adding the transaction to the new block for the blockchain and/or adding the new block to the blockchain. When a majority of nodes agree the transaction and/or new block is valid and may thus be accepted as a valid block on the primary blockchain, the transaction and/or new block is added and accepted to that primary blockchain, sometimes called the main chain or the consensus chain. For instance, while an invalid block may be added to the blockchain, such an invalid block in effect creates a side chain which fails to attain consensus, and thus, is never accepted as an added valid block within the main or primary blockchain. Nodes are weighted such that a "majority" may be obtained or denied based on the votes of one or more of the nodes participating in the private blockchain, that is, a majority may be obtained from less than all of the nodes participating in the blockchain.

According to this embodiment, the parties in the consortium agree upon the weight, w, to assign each node in the consortium, for example, based on a party's domain knowledge, and/or other criteria, including, for example, a party's participation in another blockchain or sidechain. The total weight, W, of the nodes in the consortium is equal to the sum of the individual node weights, $w_1+w_2+ \ldots w_n$, where n is the number of nodes in the consortium. The weight, w, of any one member, or the ratio of w/W may or may not exceed a certain threshold, in one embodiment. Each node's weight is attributed to the respective node's vote. If the sum of the weights for the nodes that voted exceed a certain threshold, the transaction/new block is validated and added to the blockchain. In particular, the transaction/new block is added if the total weight, W, attributed to the votes meets or exceeds a threshold (e.g., a plurality, majority, supermajority, in terms of percentage of w/W, or absolute value for w, whatever is agreed upon by the consortium) to reach consensus for the blockchain. In this embodiment, the nodes in the blockchain do not need to come to unanimous agreement about adding the transaction and/or new block to the blockchain, and indeed, after the threshold is met, a node need not begin, or continue, to participate in the voting process.

In one embodiment, at least a minimum number of nodes, k, vote on adding a transaction to the new block in the blockchain, or adding the new block that includes the transaction to the blockchain, to mitigate the risk of fraud or double-spending, or to prevent one node with a large weight, w, or a small group of nodes with a collectively large weight, from controlling the outcome of the vote. In one embodiment, the number of nodes that participate in voting, k, or the ratio of k/n must meet a minimum threshold.

Figure 3A:
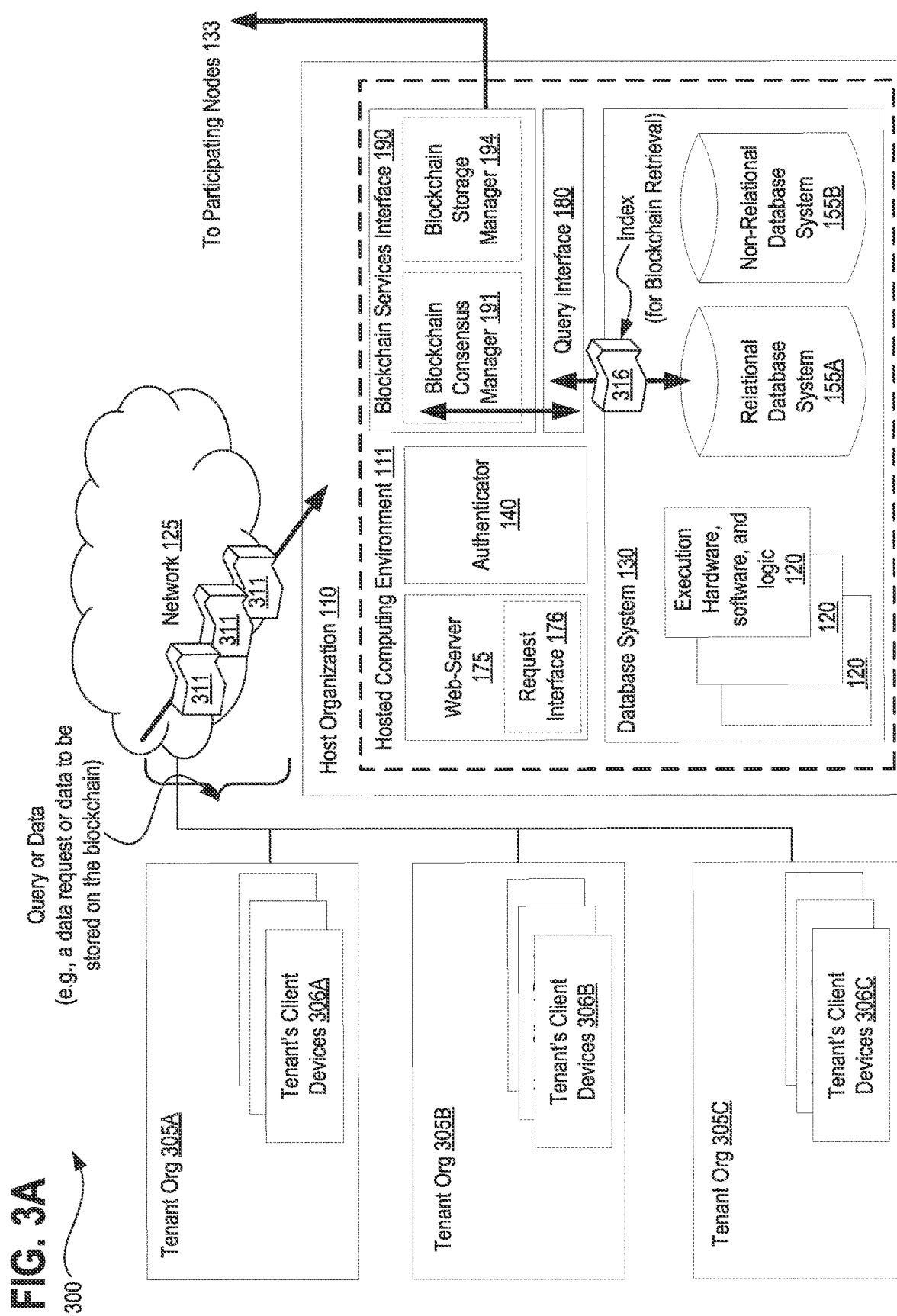
FIG. 3A depicts an exemplary architecture in accordance with described embodiments.

FIG. 3A depicts an exemplary architecture 300 in accordance with described embodiments.

As depicted here, there is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and the blockchain storage manager 194. There is additionally depicted an index 316 which provides addressing capabilities for data, metadata, and records which are written to, or transacted onto the blockchain.

Additionally depicted are the multiple tenant orgs 305A, 305B, and 305C (also referred to sometimes as customer orgs) each of which have tenant client devices 306A, 306B, and 306C via which the tenants and the tenants' users may interact with the host organization 110 and its services. For example, the tenant orgs may submit queries or data 311 to the host organization to request data retrieval from the blockchain or to store data to the blockchain, either of which may utilize the depicted index 316.

According to certain embodiments, the index 316 implements a Merkle Tree Index. In cryptography and computer science, a hash tree or Merkle tree is a tree in which every leaf node is labeled with the hash of a data block, and every non-leaf node is labeled with the cryptographic hash of the labels of its child nodes. Such trees allow for efficient and secure verification of the contents of large data structures and thus provide significant efficiencies for data retrieval from large data structures. According to such an embodiment, implementing the index 316 via a Merkle tree is recursively defines the index as a binary tree of hash lists where the parent node is the hash of its children, and the leaf nodes are hashes of the original data blocks.

Implementing the index 316 via a Merkle trees provides a means to prove the integrity and validity of data stored within the index, requires relatively little memory or disk space as the proofs are computationally easy and fast, and additionally, the proofs and management for the Merkle tree index requires only very small or tiny amounts of information to be transmitted across networks, thus being more operationally efficient in terms of network resource consumption. While many blockchains heavily rely upon the use of Merkle trees for the purposes of block verification, the index 316 implemented utilizing a Merkle tree, is unrelated to the block verification functions of the blockchain and is used here as a robust and efficient means by which to store the index 316 information.

Figure 3B:
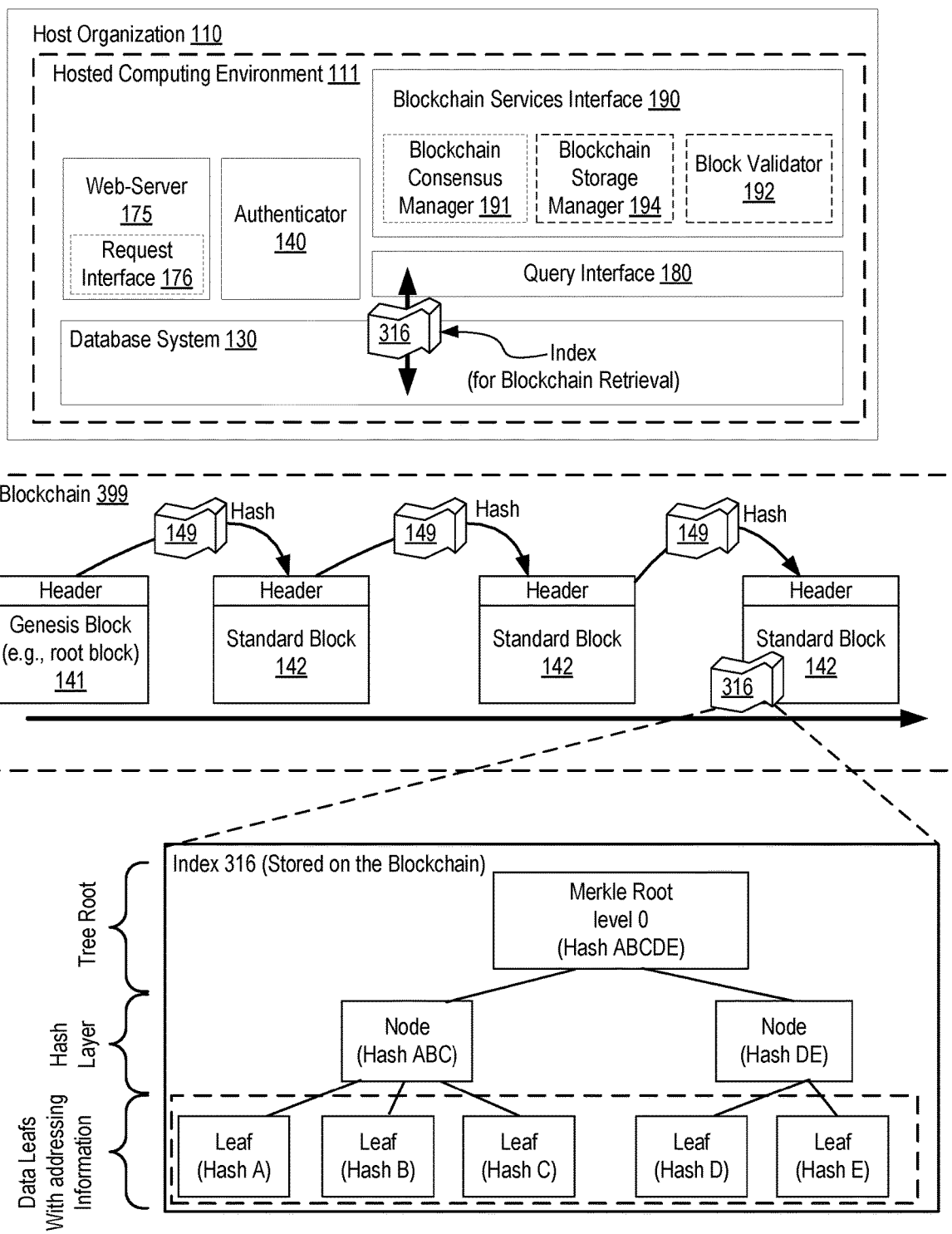
FIG. 3B depicts another exemplary architecture in accordance with described embodiments.

FIG. 3B depicts another exemplary architecture 301 in accordance with described embodiments.

There is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and the blockchain storage 194. There is additionally depicted an index 316 which provides addressing capabilities for data, metadata, and records which are written to, or transacted onto the blockchain 399.

As shown, the index 316 is stored within the database system 130 of the host organization, however, the Merkle tree index 316 may alternatively be written to and stored on the blockchain itself, thus enabling participating nodes with the blockchain which lack access to the query interface 180 of the host organization to nevertheless be able to retrieve the Merkle tree index 316 (when stored on the blockchain) and then use an address retrieved from the Merkle tree index 316 to directly reference an addressable block on the blockchain to retrieve the desired record, data, or metadata, without having to traverse the entire blockchain or search the blockchain for the needed record.

As depicted, there is another index 316 depicted as being shown within the last standard block 142 of the blockchain 399. Only one index 316 is required, but the index 316 may permissibly be stored in either location.

The Merkle tree index 316 depicted in greater detail at the bottom shows a level 0 Merkle root having a hash of ABCDE, followed by a hash layer with two hash nodes, a first with hash ABC and a second with a hash DE, followed by the data blocks within the data leafs identified by hash A, B, C, D, and E, each containing the addressing information for the addressable blocks on the blockchain.

Storing data and metadata on the blockchain 399 via the blockchain storage manager 194 in conjunction with the use of a Merkle tree index 316 is much more efficient than previously known data storage schemes as it is not necessary to search through multiple blocks 141 and 142 of the blockchain to retrieve a data record. Rather, the index 316 is first searched to retrieve an address for the desired block, which is very fast and efficient, and then using the retrieved address from the index 316, the record is retrieved directly from the addressable block on the blockchain 399.

As data is stored within a blockchain using conventional techniques, the amount of data in the blockchain explodes in terms of total volume of stored data creating scalability problems and resulting in problematic inefficiencies. The total volume of data stored to a blockchain tends to explode or grow unsustainably over time because every time a stored record is updated or modified, it is necessary to re-write the entirety of the modified record back to the blockchain which then becomes the most recent and up-to-date record, however, all prior versions and copies are retained within the blockchain, thus resulting in significant duplicative data entries being stored. The benefit to such an approach is that an entire record may be retrieved from a single block on the blockchain, without having to refer back to prior blocks on the blockchain for the same record. But, such a storage scheme is highly inefficient in terms of storage.

Alternatively, only a modification to a record stored within the blockchain may be stored, in accordance with conventional approaches, thus resulting in the modified data being written into a new block on the blockchain, with the non-modifiable data being retrievable from a prior block of the blockchain. This approach reduces the total amount of data stored by the blockchain. Unfortunately, any data retrieval of a modified record requires the inspecting and retrieval from multiple blocks on the blockchain, thus mitigating the data redundancy and unsustainable growth problem, but trading that problem for an undesirable data retrieval inefficiency problem.

In such a way, data management for records and information stored within the blockchain 399 is improved. Moreover, metadata may additionally be stored within the blockchain to provide additional information and context regarding stored records, with each of the data records and the metadata describing such data records being more easily retrievable through the use of the index 399. Such metadata permits a business or other entity to transform the data record retrieved from the blockchain back into a useable format much easier than with conventional approaches which lose such context and metadata for any record written to the blockchain.

Figure 3C:
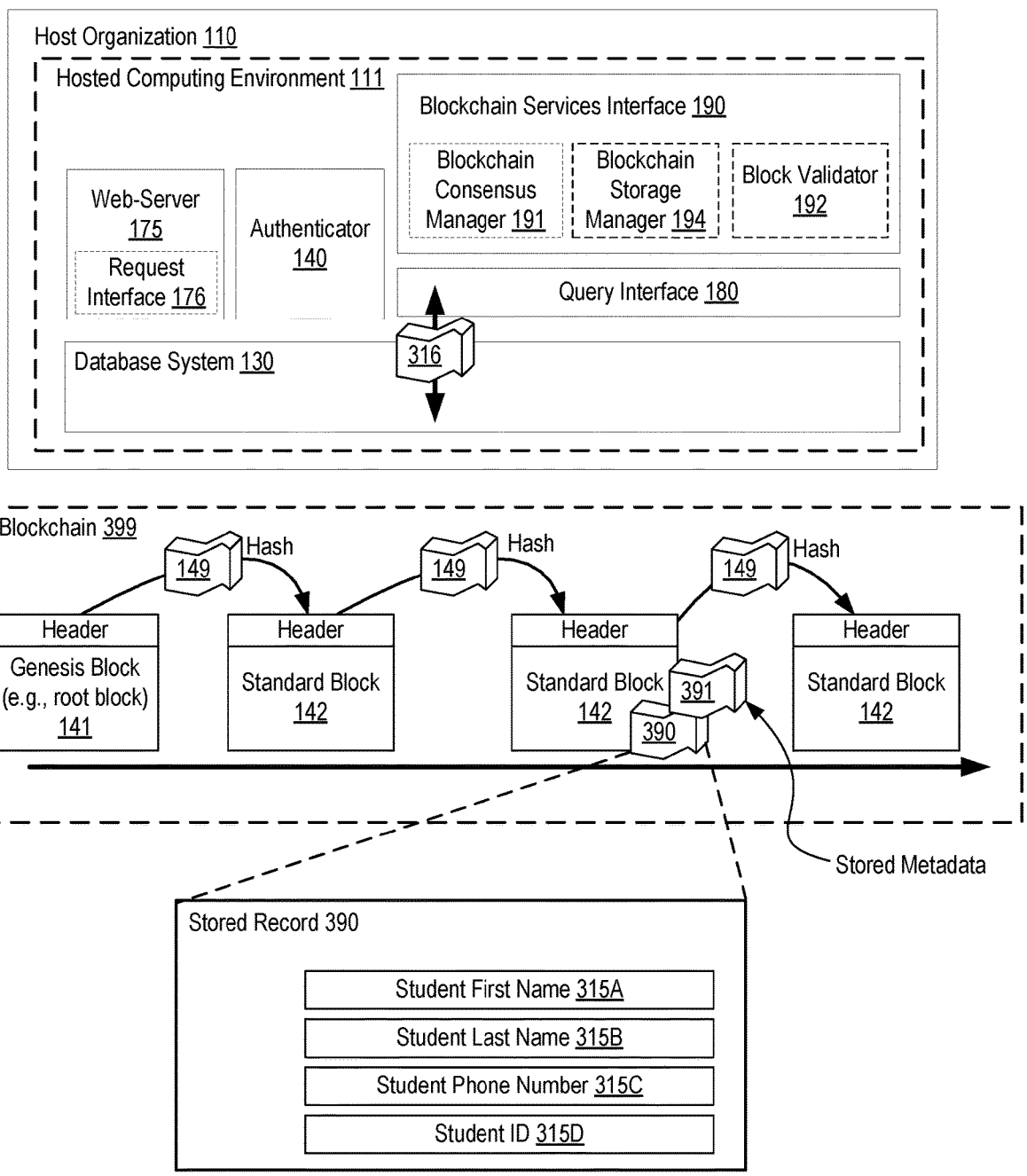
FIG. 3C depicts another exemplary architecture in accordance with described embodiments.

FIG. 3C depicts another exemplary architecture 302 in accordance with described embodiments.

There is again the host organization 110 which includes the hosted computing environment 111 having a processors and memory (e.g., within the execution hardware, software, and logic 120 of the database system 130) which serve to operate the blockchain services interface 190 including the blockchain consensus manager 191 and the blockchain storage manager 194 which utilizes an index 316 by which to identify an addressable block of the blockchain 399 via which a desired record is stored. There is additionally depicted an exemplary stored record 390 at the second to last block of the blockchain 399.

Here the stored record 390 stores student information including a student first name 315A, a student last name 315B, a student phone number 315C, and a student ID 315D.

Once the stored record 390 is transacted onto the blockchain, for instance, by adding an asset to the blockchain within which the stored record 390 is embodied, student data is persistently stored by the blockchain and accessible to participating nodes with access to the blockchain 399, however, when such data is retrieved, the stored record does not in of itself describe how to use such data, any particular format for such data, or how to validate such data. Therefore, it is further permissible to store metadata within the blockchain which may then be used to define the format, validation means, and use for such data, but storage of the metadata only exacerbates the problem of searching for and retrieving data from the blockchain as there is now a stored record 390 and also stored metadata 391 which is associated with that record. An organization methodology is thus provided by the indexing scheme as implemented by the blockchain storage manager 194 in conjunction with use of the index 316 which provides for more efficient storage, retrieval, and validation of data stored on the blockchain.

According to one embodiment, the stored record 390 is therefore converted to a more efficient format for storage within the blockchain. Consider the stored record 390 for which student information is stored. Initially, the stored record 390 may include only student first name 315A and student last name 315B, and is then stored. Subsequently, the student record is updated to include student phone number 315C, and thus, either the stored record 390 is updated and re-written to the blockchain in its entirety thus creating a second copy, albeit updated, of the stored record 390 or alternatively, only the new portion, the student phone number 315C is written to the blockchain with a reference back to the prior record, in which case total storage volume is reduced, but retrieval of the entire record requires searching for and finding multiple blocks on the blockchain from which to reconstruct the entire stored record 390. Worse yet, if the student ID 315D is subsequently assigned, then the stored record 390 needs to be updated again, thus writing yet another entire stored record 390 to the blockchain resulting in now three different versions and copies on the blockchain, or as before, writing only the new portion of the stored record to the blockchain 399, in which case the stored record 390 is fragmented across at least three blocks of the blockchain.

This fragmentation is problematic because if you are looking for student information, it may result that a first block contains the student's first name and last name, a second block contains a change to the student's last name due to an update, a third block contains only the student's phone number, and so forth. Consequently, it is necessary to travel the blocks of the blockchain to pick up all the fragmented pieces so as to reconstruct the entire stored record 390 before it may be used for whatever application requires the data.

According to one embodiment, the blockchain storage manager 194 writes data or metadata onto a blockchain by transacting an asset to the blockchain or adding an asset to the blockchain via a new transaction with the blockchain. According to a particular embodiment, the transaction has a specific transaction type, for instance, defined as a blockchain storage transaction type, which triggers execution of a smart contract to perform validation of the transaction and specifically to perform validation of the data or metadata within the asset being added to or transacted onto the blockchain.

Figure 3D:
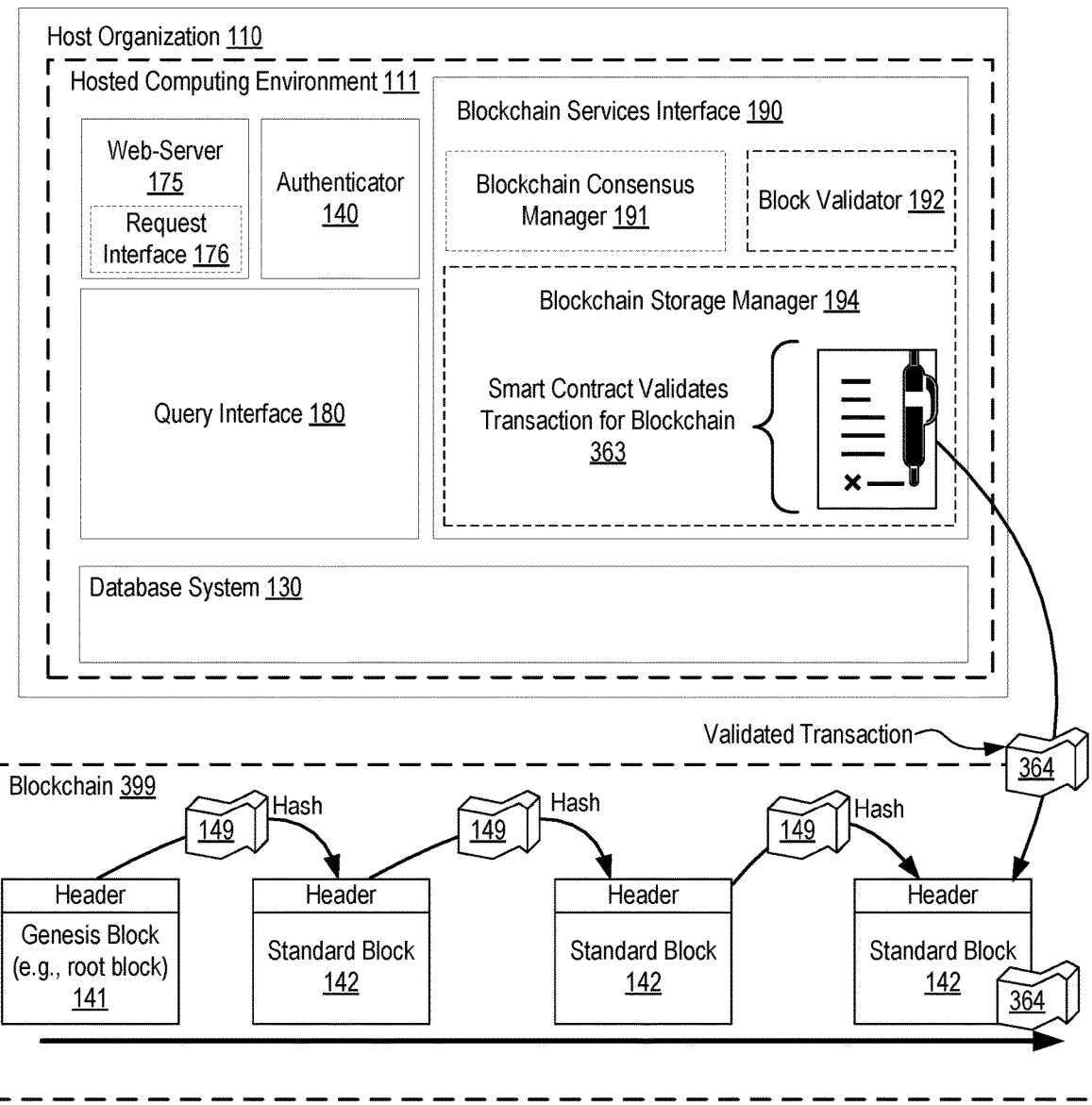
FIG. 3D depicts another exemplary architecture in accordance with described embodiments.

FIG. 3D depicts another exemplary architecture 302 in accordance with described embodiments.

For example, such a smart contract may execute via the host organization's blockchain services interface 190 which performs the validation and then transacts the new asset onto the blockchain pursuant to successful validation of the data or metadata within the asset being stored on the blockchain. As shown here at element 363, a smart contract executes and validates the transaction for the blockchain. Subsequently, a validated transaction 364 is then added to or transacted onto the blockchain 399.

Figure 4A:
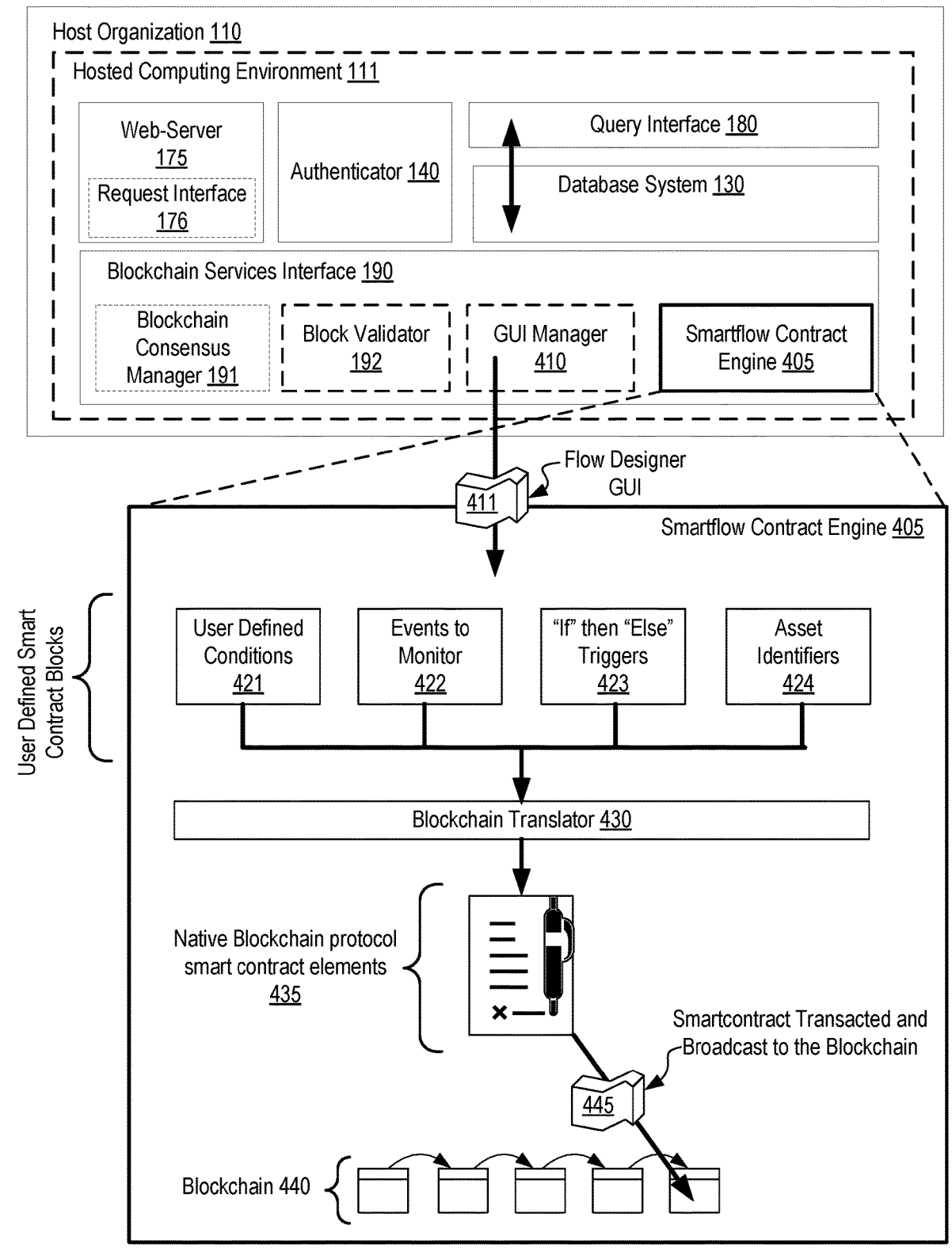
FIG. 4A depicts another exemplary architecture, with additional detail of a blockchain implemented smart contract created utilizing a smartflow contract engine, in accordance with described embodiments.

FIG. 4A depicts another exemplary architecture 400, with additional detail of a blockchain implemented smart contract created utilizing a smartflow contract engine 405, in accordance with described embodiments.

In particular, there is depicted here within the host organization the blockchain services interface 190 which now includes the smartflow contract engine 405 and additionally includes the GUI manager 410.

Because blockchain utilizes a distributed ledger, creation and execution of smart contracts may be technically complex, especially for novice users. Consequently, a smart flow visual designer allow implementation of smart contracts with greater ease. The resulting smart flow contract has mathematically verifiable auto-generated code, as created by the blockchain translator 430 freeing customers and users from having to worry about the programming language used in any given blockchain protocol. Moreover, the smart flow contract engine implements visual designers that coordinate with the blockchain translator 430 to generate the requisite native code capable of executing on each of the participating nodes of the blockchain, thus further allowing easy processing and verification of the smart contract. According to certain embodiments, each smart flow contract utilizes a mathematical code based verifiable encryption scheme.

Flow designers provide users with a simple, intuitive, web-based interface for designing applications and customized process flows through a GUI based guided flow design experience. The flow designer enables even novice users to create otherwise complex functionality, without necessarily having coding expertise or familiarity with the blockchain.

The GUI manager 410 presents a flow designer GUI 411 interface to a user device via which users may interact with the host organization. The smartflow contract engine 405 in coordination with the GUI manager interprets the various rules, conditions, and operations provided by the user, to generate a smartflow contract which is then translated or written into the target blockchain protocol.

Through the flow designer GUI 411, a user may completely define utilizing visual flow elements how a particular process, event, agreement, contract, purchase, or some other transaction needs to occur, including dependencies, checks, required process inputs and outputs, triggers, etc.

Using the flow designer GUI 411, the user simply drags and drops operational blocks and defines various conditions and "if then else" events, such as if this event occurs, then take this action. As depicted here, there are a variety of user defined smart contract blocks including user defined conditions 451, events to monitor 452, "if" then "else" triggers 453, and asset identifiers 454.

Once the user has completed defining the flow including all of its operational blocks, conditions, triggers and events, the smartflow contract engine takes each of the individual blocks and translates them into a native target blockchain protocol via the blockchain translator 430, and then generates a transaction to write the translated smartflow contract 445 into the blockchain 440 via the blockchain services interface 190.

Once transacted to the blockchain, every participating node with the blockchain will have a copy of the smart contract, and therefore, if any given event occurs, the corresponding trigger or rule or condition will be viewable to all participating nodes, some of which may then take an action based on the event as defined by the smart contract.

The blockchain services interface 190 of the host organization provides customers, users, and subscribers access to different blockchains, some of which are managed by the host organization 110, such as private blockchains, others being public blockchains which are accessible through the host organization 110 which participates as a node on such public blockchains. Regardless, each blockchain utilizes a different blockchain protocol and has varying rules, configurations, and possibly different languages via which interfaces must use to communicate with the respective blockchains. Consequently, the blockchain translator 430 depicted here translates the user defined smart contract blocks into the native or required language and structure of the targeted blockchain 440 onto which the resulting smart contract is to be written or transacted.

Once the smart contract is transacted and broadcast to the blockchain 445 it is executed within the blockchain and its provisions, as set forth by the user defined smart contract blocks, are then carried out and enforced.

According to one embodiment, a salesforce.com visual flow designer is utilized to generate the user defined smart contract blocks which are then translated into a blockchain smart contract. According to other embodiments, different visual flow designers are utilized and the blockchain translator 430 translates the user defined smart contract blocks into a blockchain smart contract.

The resulting native blockchain protocol smart contract elements 435 may be embodied within a code, structure, or language as dictated by the blockchain 440 onto which the smart contract is to be written. For instance, if the smart contract is to be written to Ethereum then the blockchain translator 430 must translate the user defined smart contract blocks into the Ethereum compliant "Solidity" programming language. Solidity is a contract-oriented, high-level language for implementing smart contracts specifically on Ethereum. Influenced by C++, Python and JavaScript, the language is designed to target the Ethereum Virtual Machine (EVM). Smart contract elements include support for voting, crowd funding, blind auctions, multi-signature wallets, as well as many other functions.

Conversely, if the smart contract is to be written to Hyperledger, then the language is different, utilizing the Go programming language which permits use of a distributed ledger blockchain for and smart contracts, among other capabilities.

While smart contracts are beneficial and supported by many blockchain protocols they may be cumbersome to implement to the requirement that they be programmed in differing languages depending on the particular blockchain being targeted. Therefore, not only must users understand programming constructs, but also the particular syntactical nuances of the required programming language for the blockchain protocol in question.

By utilizing the smart flow contract engine 405, even novice users may create compliant smart contracts by generating the smart contract elements with the flow designer and then leveraging the blockchain translator 430 to actually render the native blockchain programming language code embodying the smart contract elements as defined by the user, subsequent to which the blockchain services interface 190 handles the transacting of the smart contract onto the blockchain.

Consider for example a vendor that sells to Home Depot and wants to execute a smart contract with Home Depot which uses Ethereum. The vendor logs in with the host organization, assuming he is an authenticated user and has access to the cloud subscription services, and then accesses the smartflow contract engine 405 through which the user may generate whatever flow he wishes. When done, the user, via the flow designer GUI 411, instructs the blockchain services interface 190 to execute the smart contract, thus causing the smartflow contract engine to translate the user's custom designed smartflow contract into Ethereum compliant "Solidity" code, subsequent to which the smart contract is then written into the blockchain for execution. The vendor need not know how to program or even understand the details of transacting with the blockchain. Rather, the cloud based services accessible through the host organization 110 remove the complexity from the process and present the user with a simple flow designer GUI 411 through which all the necessary operations may thus be carried out.

According to such embodiments, writing the smart contract to the blockchain requires storing metadata defining the smart contract in the blockchain as supported by the particular blockchain protocol. According to one embodiment, when a transaction occurs on the blockchain, having the metadata for the smart contract therein, the smart contract is executed and the various user defined smart contract events, conditions, and operations are then effectuated.

According to certain embodiments, the user defined smart contract, having been translated and transacted onto the blockchain, triggers events on the within the host organization.

For example, consider that Wal-Mart and Nestle have an agreement that a shipment must be transported within a climate controlled trailer within a range of 35 to 39 degrees Fahrenheit at all time. Moreover, if the temperature exceeds 39 degrees at anytime, then the payment is nullified.

Within the host organization, a Customer Relationship Management (CRM) platform defines and manages the various relationships and interactions between customers, vendors, potential customers. suppliers, etc. The term CRM is usually in reference to a CRM system, which is a tool that helps businesses with contact management, sales management, workflow processes, productivity and so forth.

In the above example with Wal-Mart and Nestle, the CRM system will possess the requirements for the shipment. Because the host organization through the CRM system monitors the shipment and subscribes to shipment events, such as temperature data, the CRM system will monitor for and become aware of a temperature related event for the particular shipment which may then be linked back to the smart contract automatically. More particularly, because the host organization operates as a participating node for the blockchain within which the smart contract is executing, the host organization has visibility to both the smart contract terms and conditions accessible via the blockchain and also the CRM requirements for the shipment, such as the required temperature range.

Therefore, upon the occurrence of a smart contract condition violation, the host organization will synchronize the violation with the CRM system (which is not part of the blockchain) to halt the payment associated with that particular shipment, pursuant to the terms of the executing smart contract.

According to one embodiment, the blockchain sends out an event which the CRM system of the host organization will listen to, and then conduct some substantive action based on the event according to what is specified by the user defined smart contract flow. With the above example, the substantive action being to halt payment for the shipment pursuant to the smart contract on the blockchain.

Each of the participating parties for an executing smart contract will likely have their respective CRM systems subscribed to events of the blockchain associated with the executing smart contract, and therefore, both parties are likely to be aware of the event.

According to one embodiment, logic is written into the CRM system to facilitate a specific action responsive to a blockchain event. Stated differently, non-blockchain actions may be carried out pursuant to an executing blockchain smart contract.

Figure 4B:
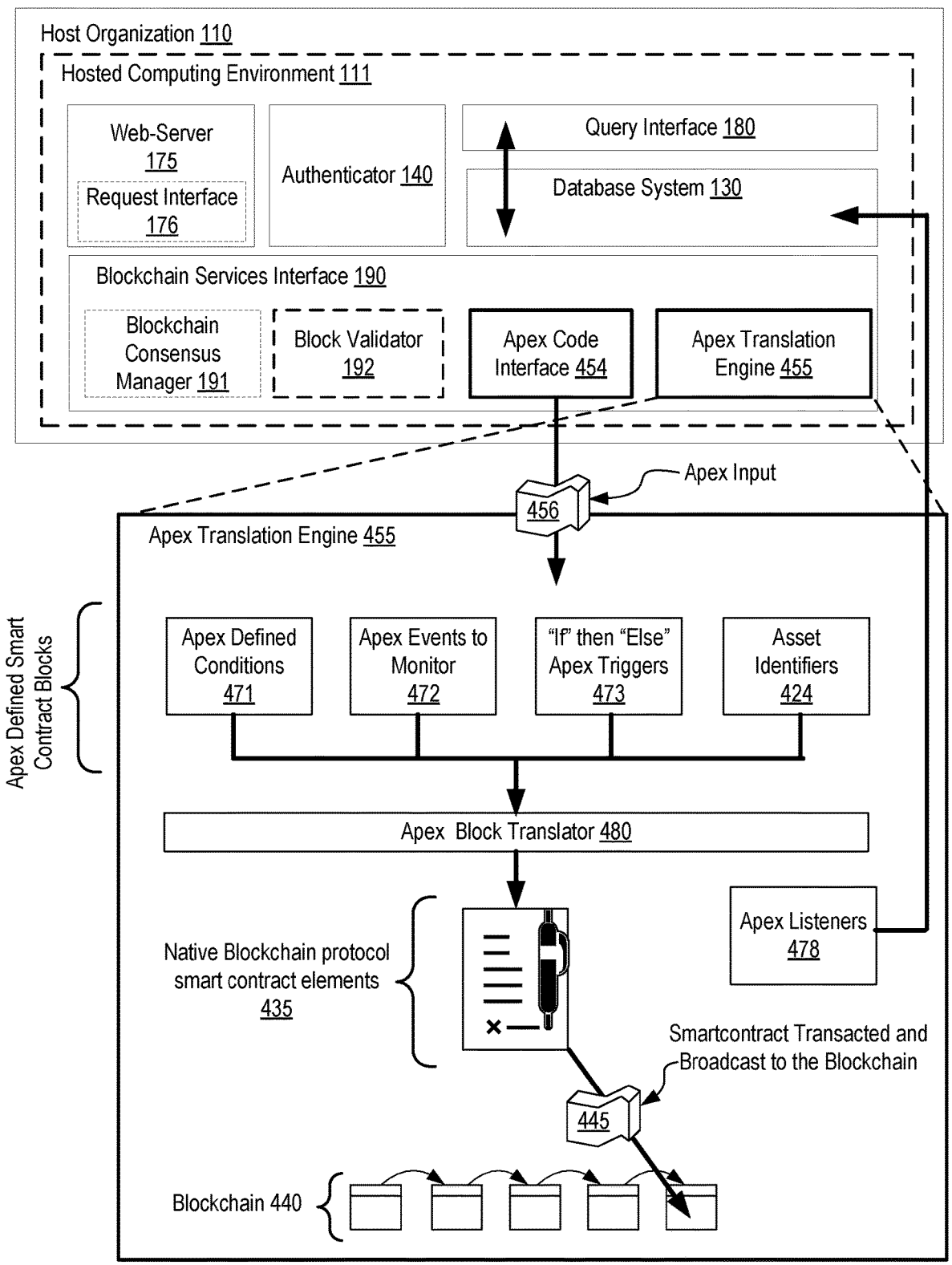
FIG. 4B depicts another exemplary architecture, with additional detail of a blockchain implemented smart contract created utilizing an Apex translation engine, in accordance with described embodiments.

FIG. 4B depicts another exemplary architecture 401, with additional detail of a blockchain implemented smart contract created utilizing an Apex translation engine 455, in accordance with described embodiments.

As depicted here, there is an Apex translation engine 455 within the blockchain services interface 190.

Apex is a programming language provided by the Force-.com platform for developers. Apex is similar to Java and C# as it is a strongly typed, object-oriented based language, utilizing a dot-notation and curly-brackets syntax. Apex may be used to execute programmed functions during most processes on the Force.com platform including custom buttons and links, event handlers on record insertion, update, or deletion, via scheduling, or via the custom controllers of Visualforce pages.

Developers of the salesforce.com host organization utilize Apex frequently to implement SQL programming, database interactions, custom events for GUI interfaces, report generation, and a multitude of other functions. Consequently, there is a large community of developers associated with the host organization 110 which are very familiar with Apex and prefer to program in the Apex language rather than having to utilize a less familiar programming language.

Problematically, smart contracts must be written in the native language of the blockchain protocol being targeted for execution of the smart contract on the respective blockchain.

For instance, as noted above, if the smart contract is to be written to Ethereum then the smart contract must be written with the Ethereum compliant "Solidity" programming language.

Like the smart contracts, Apex is a kind of a metadata. Therefore, the Apex translation engine 455 permits developers familiar with Apex to program their smart contracts for blockchains utilizing the Apex programming language rather than utilizing the native smart contract protocol programming language.

As depicted here, developers write their smart contracts utilizing the Apex programming language and then provide the Apex input 456 to the Apex translation engine 455 via the depicted Apex code interface, for example, by uploading a text file having the developer's Apex code embedded therein.

The Apex translation engine 455 parses the Apex input 456 to identify the Apex defined smart contract blocks and breaks them out in preparation for translation. As despite here, there are Apex defined conditions 471, Apex events to monitor 472, "if" then "else" Apex triggers 473, and as before, asset identifiers 454 which are not Apex specific.

The Apex defined smart contract blocks are then provided to the Apex block translator 480 which converts them into the native blockchain protocol smart contract elements 435 for the targeted blockchain protocol. Once translated, the process is as described above, in which the translated smart contract is transacted and broadcast 445 to the blockchain 440 for execution 445.

Unlike the visual flow GUI, because Apex is programmatic, users writing Apex code may write programs to execute on a smart contract and are not limited by the available functions within the visual flow GUI.

According to a particular embodiment, the Apex input 456 is first translated into JavaScript and then subsequently translated into a specific blockchain API appropriate for the targeted blockchain protocol upon which the smart contract is to be executed.

According to another embodiment, listening events may be written using the Apex language and provided in the Apex input 456, however, such listening events are to be executed by the host organization. Therefore, the Apex block translator 480 separates out any identified Apex listeners 478 and returns those to the host organization 110 where they may be implemented within the appropriate CRM system or other event monitoring system. In such a way, developers may write the Apex input 456 as a single program and not have to separately create the smart contract and also the related listening events in separate systems.

Figure 5A:
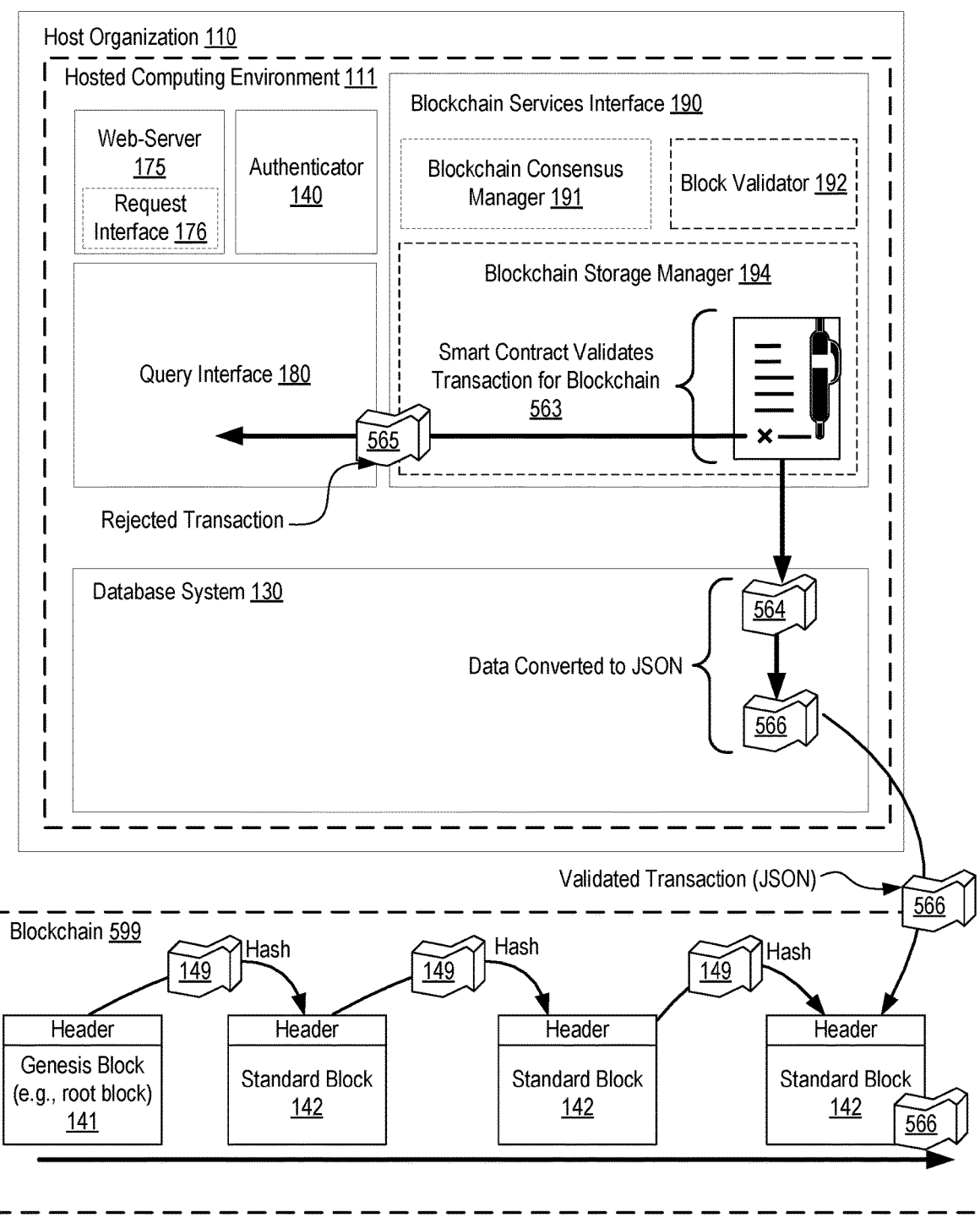
FIG. 5A depicts another exemplary architecture in accordance with described embodiments.

FIG. 5A depicts another exemplary architecture 501 in accordance with described embodiments.

Conventional solutions permit the storage of free-form text within an asset transacted onto the blockchain, for instance, storing such data within a payload portion of the asset, however, because such data is not validated, there is a risk that corrupted or incorrect data is written to the blockchain and later retrieved on the assumption that such data is valid.

By executing a smart contract to perform transaction validation of the entity or asset being transacted onto the blockchain, it is therefore possible to enforce various masks, data structures, data types, data format, or other requirements prior to such data being written to the blockchain 599.

According to such embodiments, the blockchain storage manager 194 executes smart contract validation 563, and if the data to be written to the blockchain is not compliant with the requirements set forth by the executed smart contract, then the transaction is rejected 565, for instance, sending the transaction back to a query interface to inform the originator of the transaction. Otherwise, assuming the transaction is compliant pursuant to smart contract execution, then the transaction is validated 564 and written to the blockchain.

According to one embodiment, the smart contract applies a data mask to validate compliance of the data or metadata to be written to the blockchain. In other embodiments, the smart contract enforces rules which are applied to the data as part of the validation procedure.

According to one embodiment, the smart contract executes as part of a pre-defined smart contract system which executes with any blockchain which permits the use of smart contracts, and the smart contract performs the necessary data validation.

According to one embodiment, the data or metadata to be written to the blockchain 599 is converted to a JSON format to improve storage efficiency. JavaScript Object Notation (JSON) provides an open-standard file format that uses human-readable text to transmit data objects consisting of attribute-value pairs and array data types or any other serializable value. It is a very common data format used for asynchronous browser-server communication, including as a replacement for XML in some AJAX-style systems. Additionally, because JSON is a language-independent data format, it may be validated by the smart contract on a variety of different smart contract execution platforms and blockchain platforms, regardless of the underlying programming language utilized for such platforms.

Thus, as depicted here, data or metadata to be written to the blockchain may be converted into a JSON format 566 (e.g., within database system 130 of the host organziation 110) and the validated and converted JSON data is then transacted onto the blockchain.

Figure 5B:
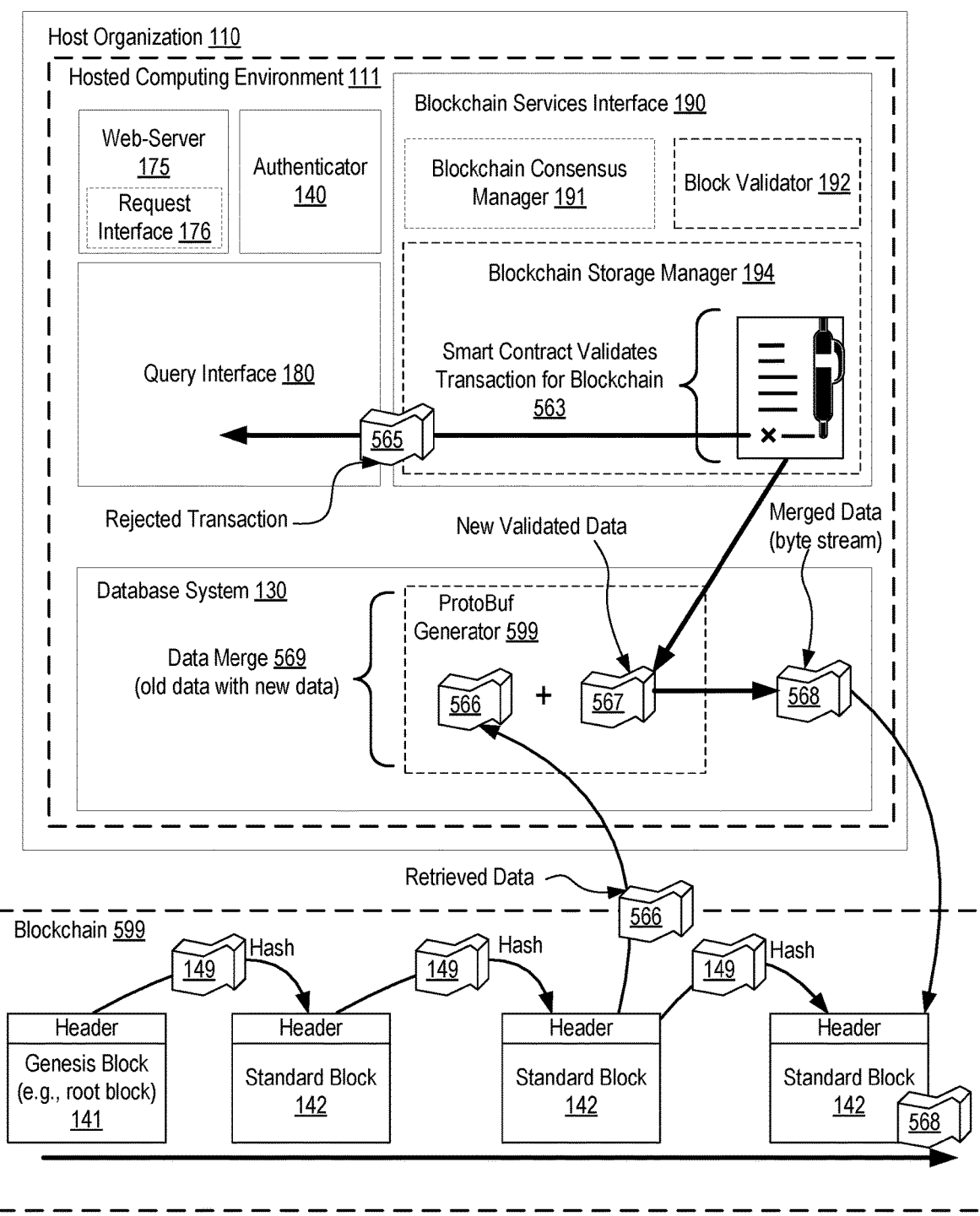
FIG. 5B depicts another exemplary architecture for performing dynamic metadata validation of stored data in accordance with described embodiments.

FIG. 5B depicts another exemplary architecture 502 for performing dynamic metadata validation of stored data in accordance with described embodiments.

According to certain embodiments, it is desirable to improve the efficiency of data stored on the blockchain 599, and therefore, all new transactions having data to be written to the blockchain perform a data merge 569 process prior to writing the new data to the blockchain. This is performed by first retrieving old data, such as a previously written stored record from the blockchain, for instance, pulling retrieved data 566 into the database system 130 of the host organization, and then merging the retrieved data 566 with the new validated data 567 having been checked by the executed smart contract, resulting in merged data 568. The merged data 568 is then written to the blockchain, for instance, by embedding the merged data 568 within a new asset which is added to the blockchain or by updating an existing asset and replacing a payload portion of the existing asset with the merged data 568, thus having an entire updated and validated record stored on one block of the blockchain for more efficient retrieval.

According to one embodiment, the data merge 569 process is performed by a protobuf generator 599 which reduces the total size of the data in addition to merging the retrieved data 566 with the new validated data 567. For example, via performance of a dynamic protobuf generation for the retrieved data 566 with the new validated data 567, the data is made to be extremely small and efficient.

Protocol Buffers (referred to as a protobuf or protobuff) provide a means for serializing structured data, thus converting the retrieved data 566 and the new validated data 567 into a merged serialized byte stream at the protobuf generator 599. This has the added benefit of permitting encryption of the merged data and providing such data in a byte stream format which is easily usable by any other application later retrieving the stored data. The protobuf generator 599 utilizes an interface description language that describes the structure of the data to be stored with a program that generates source code from that description for generating or parsing a stream of bytes that represents the structured data represented by the retrieved data 566 and the new validated data 567.

Such an approach enables the storing and interchanging all kinds of structured information. For instance, a software developer may define the data structures (such as the retrieved data 566 and the new validated data 567) and the protobuf generator 599 then serializes the data into a binary format which is compact, forward- and backward-compatible, but not self-describing (that is say, there is no way to tell the names, meaning, or full datatypes of fields without an external specification), thus providing a layer of encryption and data security for the stored data.

In such a way, the protobuf generator 599 improves efficiency of network communication and improves interoperability with other languages or systems which may later refer to such data.

Thus, consider the previously described example of the student's stored record with the student's first name, last name, phone number, and student ID.

According to a particular embodiment, processing begins with generating a protobuf of the metadata describing the student record as provided by and defined by the application seeking to store data on the blockchain, thus resulting in protobuffed student record metadata or serialized (e.g., JSON) compliant student record metadata. Next, processing validates the student data within the stored record against the metadata to ensure compliance (e.g., by executing the smart contract) and then processing generates a protobuf of the student data within the stored record resulting in protobuffed student record data. Next, both the protobuffed or serialized metadata describing the student record and the protobuffed or serialized data of the student record is then written to the blockchain. Thus, storing the protobuffed or serialized version of the data results in more efficient storage of such data on the blockchain. According to such embodiments, metadata defined by an application which is used for validation purposes is also stored in its protobuffed or serialized version, thus resulting in efficient storage of protobuffed or serialized metadata on the blockchain.

According to such embodiments, the data merge 569 process includes adding new fields and new data to the stored record which is then re-written to the blockchain 599 with subsequent to dynamically validating the new fields using the metadata.

For instance, according to such embodiments, processing includes taking the retrieved data 566, adding in the new fields, such as adding in a student's newly assigned universal ID (e.g., such as a universally unique identifier (UUID) or a globally unique identifier (GUID) as a 128-bit number used to identify information within the host organization) to the previously stored student's first name, last name, and phone number, so as to generate the merged data 568, subsequent to which processing dynamically validates merged data 568 based on the metadata by executing the smart contract. If the metadata has previously been written to the blockchain then there is no need to update or store the metadata again, which is likely the case for merged data 568 which will constitute an updated record. Thus, only the merged data 568 is written to the blockchain. If the data is new (e.g., not retrieved and not merged) then processing dynamically validates the new data using metadata provided by the application and then stores both the new data and the metadata onto the blockchain.

Metadata, as defined by the application seeking to store the data onto the blockchain, may specify, for example, a student record has three mandatory fields and one optional fields, such as mandatory first name, last name, and student ID, and optionally a student phone number, thus permitting validation of data to be written to the blockchain. The metadata may further define a format, data mask, or restrictions for the data fields, such as names must not have numbers, and the phone number must have a certain number of digits, etc.

Multiple different applications may store data onto the blockchain, with each of the multiple different applications defining different metadata for their respective stored records, and thus permitting the smart contract execution to perform validation of different kinds of data based on the variously defined metadata for the respective applications. For example, a student record with a student name, phone number, UUID will have different metadata requiring different data validation of a credit card record with a credit card number, expiration data, security code, etc. Regardless, the same processing is applied as the dynamically applied metadata validation process is agnostic of the underlying data, so long as such data is in compliance with the defined metadata for the data of the data record to be stored.

Figure 5C:
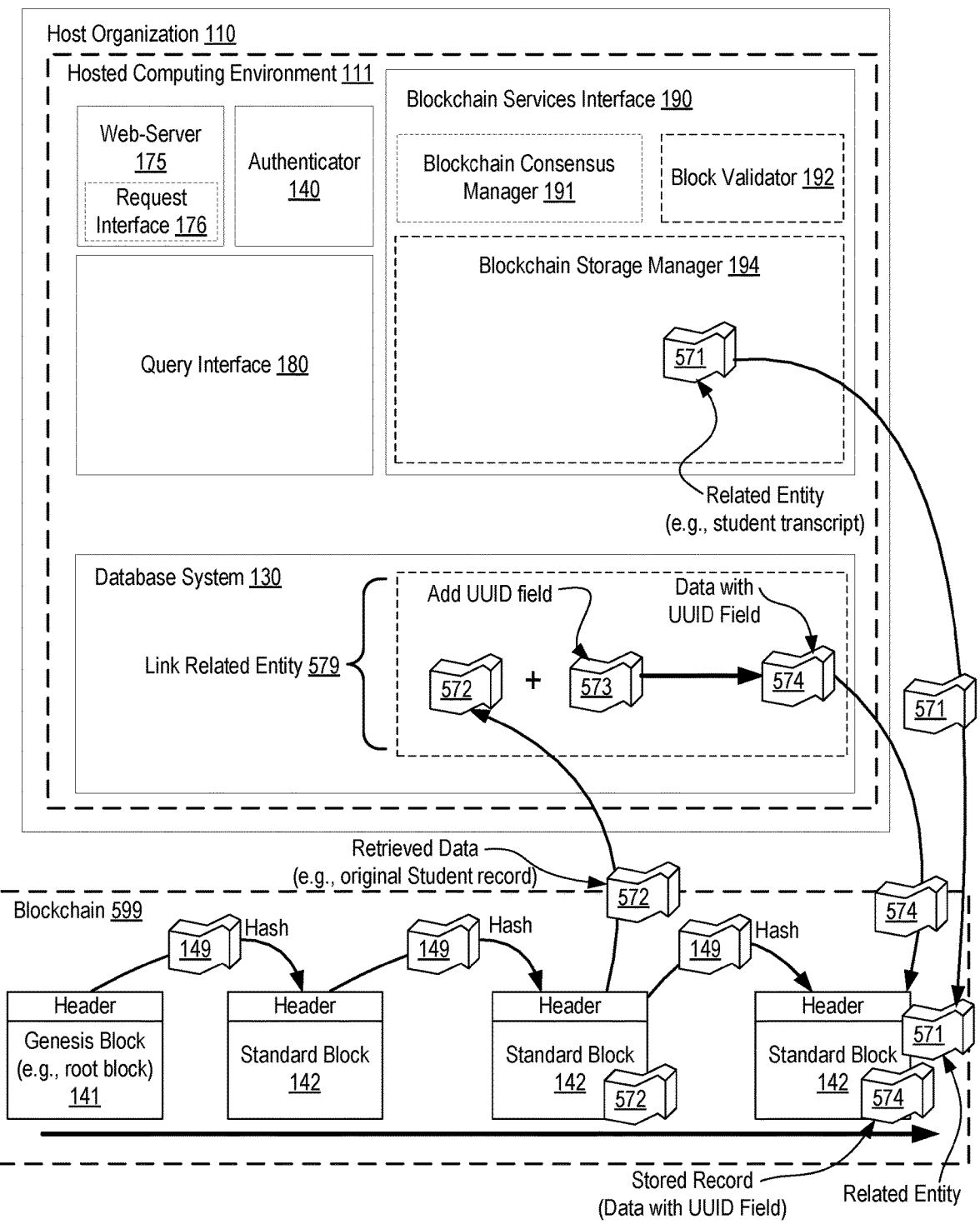
FIG. 5C depicts another exemplary architecture for storing related entities in accordance with described embodiments.

FIG. 5C depicts another exemplary architecture 503 for storing related entities in accordance with described embodiments.

In the example of the saved student record as described above, there was a student record saved to the blockchain having, for example, a student first name, student last name, student phone number, and a student ID. Also stored was metadata defined by an application seeking to store the student record, with such metadata being utilized for dynamic validation of the student record.

According to further embodiments, related entities are stored on the blockchain and linked with the previously stored record. Consider for example, a stored student record on the blockchain for which a new student transcript is provided.

As depicted here, a link related entity 579 process is performed in which retrieved data 572 is modified to add a UUID field 573 identifying the related entity, providing a link between the related entity 571 and the data record previously stored on the blockchain and retrieved 572 for modification. This results now in data with the UUID field 574, which has not yet been stored. Next, the data with the UUID field 574 linking and identifying the new related entity 571 is then written to and stored within the blockchain, resulting in the stored record now having the original data of the stored record, but also a UUID field 574 linking to and identifying the new related entity. Next, the related entity 571 is written to the blockchain as metadata with the same UUID data field, thus permitting subsequent retrieval of the related entity 571 from the blockchain by first referencing the UUID within the stored record and then retrieving the linked related entity 571 stored within the blockchain as metadata.

Thus, if a student record defines the student's name, phone number, and student ID, then a transcript for the student may be stored as metadata on the blockchain. A new UUID is automatically generated for the transcript to be stored and then within the student record, a related entity field within the student record is updated to store the new UUID generated for the transcript, thus linking the student record updated with the related entity field identifying the UUID for the transcript with the separately stored transcript which is written to the blockchain as stored metadata. In such a way, any number of related entities may be added to the blockchain, each being stored as metadata within the blockchain and linked to another stored record via the data field for the related entity. Multiple related entity fields may be added to any record, each using a different UUID to link to and identify the related entity in question. For instance, if the student has a transcript and also medical records, each are separately saved to the blockchain as metadata, each identified separately by a unique UUID, and each UUID being updated within the student's stored record as separate related entity fields. As before, the updated record with the related entity field identifying the UUID for the separately stored related entity may be stored in its protobuffed or serialized version.

Figure 6A:
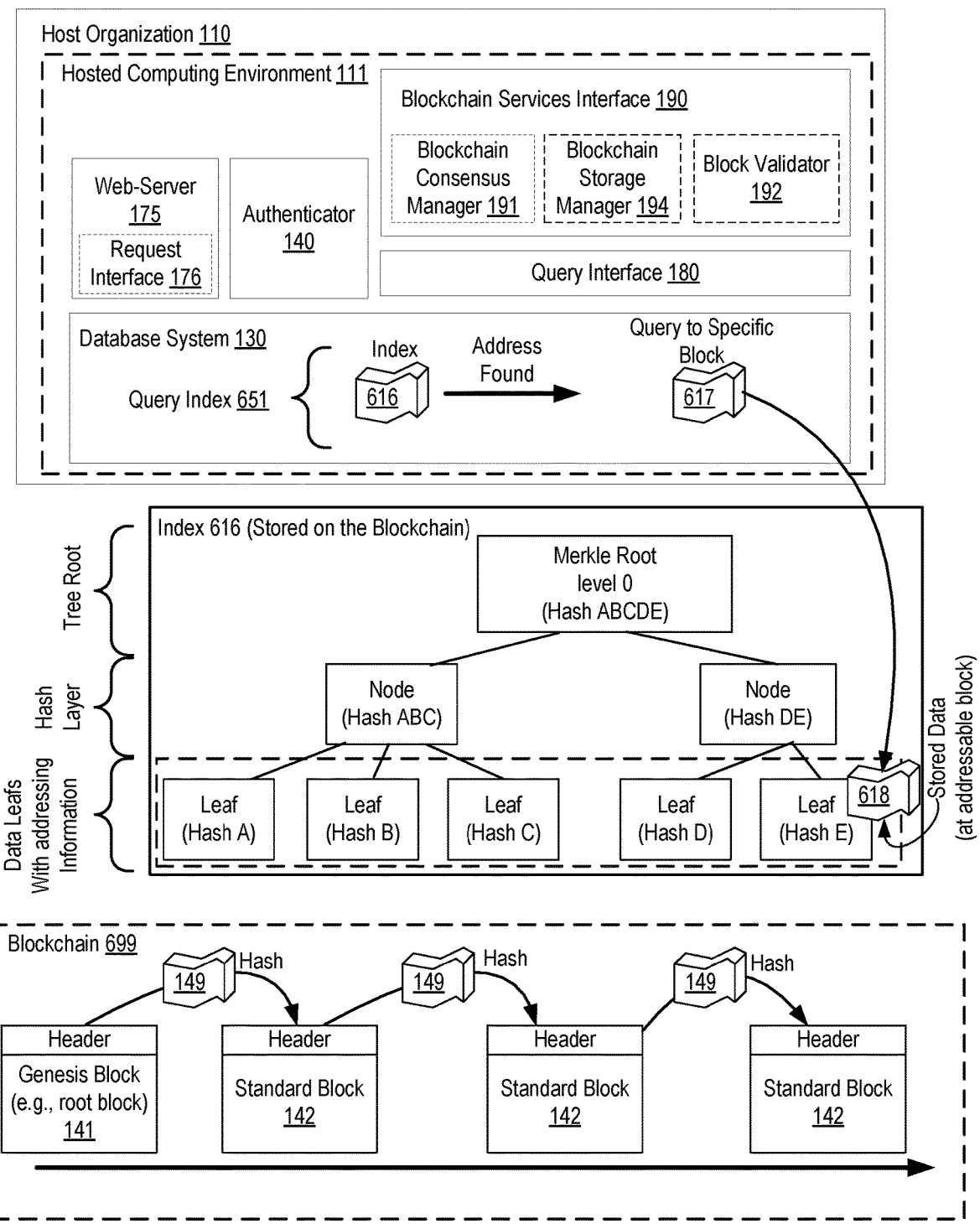
FIG. 6A depicts another exemplary architecture for retrieving stored records from addressable blocks using an indexing scheme, in accordance with described embodiments.

FIG. 6A depicts another exemplary architecture 601 for retrieving stored records from addressable blocks using an indexing scheme, in accordance with described embodiments.

Use of the Merkle tree index 616 permits retrieval of stored records from the blockchain by going to a particular block of the blockchain based on the Merkle tree index, thus permitting retrieval of a stored record in a more efficient manner. For instance, the Merkle tree index identifies an address for one of many addressable blocks on the blockchain, then retrieval of the stored record negates the need to traverse the blockchain looking for the stored record in question and instead permits the retrieval of the stored record directly from the block identified by the Merkle tree index.

Thus, as depicted here, processing performs a query 651 to the index 616 to identify an address for the desired data, subsequent to which a query to a specific block 617 is performed to retrieve the stored data at the addressable block based on the address without having to traverse the blockchain or traverse the tree to find the data.

According to certain embodiments, the index 616 is stored within the blockchain 699 as an entity, for instance, the index may be stored as an asset on the blockchain. Additionally, by storing the stored records within a Merkle tree index 616 which itself is stored onto the blockchain, it is possible to retrieve any data from the index 616 by going to a particular block with an index. Thus, if the index is known, it is not necessary to query 651 the index 616 for the address, but instead, go directly to a node for a known address within the index and receiving back anything at that node. If the address points to a leaf within the index 616 then the data stored within the leaf is returned based on a direct query to that address within the index 616. If the address points to a node having a sub-tree beneath it, such as additional nodes or simply multiple leafs, then the entire sub-tree is returned. For instance, if the address ABC is used, then the entire node having hash ABC is returned, including the three leafs beneath that node, including the leaf having hash A, the leaf having hash B, and the leaf having hash C.

If the index 616 stores addressing information for specific blocks within the blockchain, then based on the returned addressing information, the specific block of the blockchain may be checked to retrieve the stored record to be retrieved. Alternatively, if the addressing is stored within the index 616 along with the latest information of the stored record, then going to the index 616 using an address will return both the addressing information for a block on the blockchain where the stored record is located as well as returning the latest information of that stored record, thus negating the need to query the blockchain further.

Figure 6B:
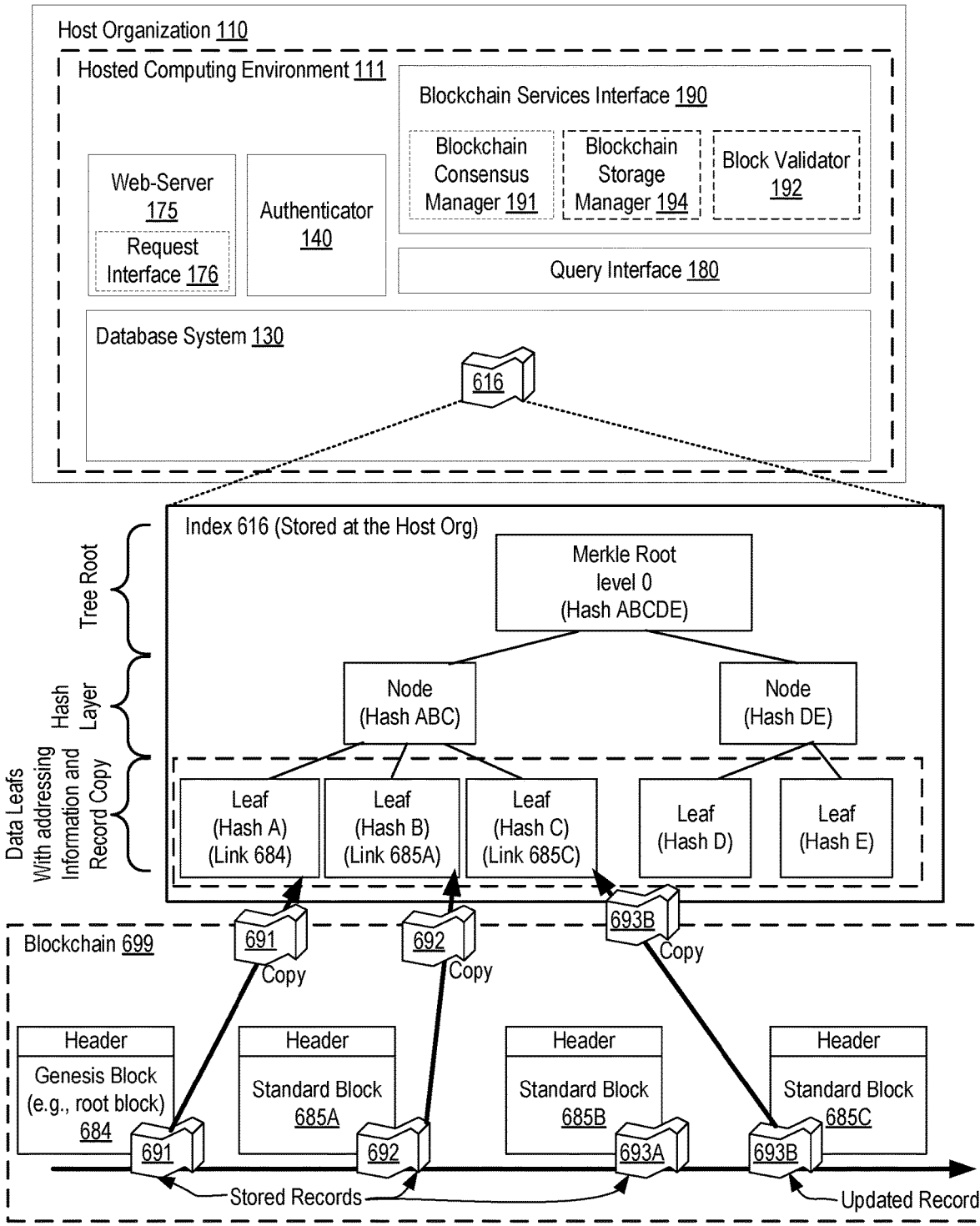
FIG. 6B depicts another exemplary architecture for building an index from records in the blockchain and maintaining the index, in accordance with described embodiments.

FIG. 6B depicts another exemplary architecture 602 for building an index from records in the blockchain and maintaining the index, in accordance with described embodiments.

According to a particular embodiment, it is desirable to enable extremely fast access to the data records stored within the blockchain through the use of the index 616. As noted above, the index 616 may store only an address of an addressable block on the blockchain within which the underlying stored record is kept, thus permitting retrieval of the record from the blockchain using the address retrieved from the index 616. Alternatively, both the latest information, that is to say, the up to date and current version of a particular record stored by the blockchain may be stored within the index along with the addressable block of the blockchain where the underlying stored record is kept by the blockchain. To be clear, this results in duplicative records being persisted. A latest and current version of a record is kept within the blockchain, considered as the authoritative record, however, for the sake of improving query speeds, a second copy of the same record is kept within the index 616 along with the address on the blockchain of where the authoritative version of that record is maintained.

According to such an embodiment, an index 616 may therefore be built or generated by the host organization by referring to the underlying stored records within the blockchain.

As shown here, within the blockchain 699 there are multiple stored records at different addressable blocks of the blockchain. Stored record 691 is located at the root block 684. Stored record 692 located at block 685A, stored record 693A located at 685B, and finally an updated record 693B is stored at block 685C, with the updated record depreciating previously store record 693A as no longer current.

Any of these stored records may be retrieved from the blockchain by walking or traversing the blockchain searching for the relevant record, locating the relevant record, and then retrieving the stored record from the located block.

Building the index 616 improves the retrieval efficiency of this process by providing at least the address for the block within the blockchain where the stored record is kept. As described above, an index 616 with such addressing information may be checked, returning the addressable block of the blockchain for the stored record, and then the stored record may be retrieved from the blockchain without having to traverse or walk multiple blocks of the blockchain. For example the index 616 may be checked for the location of updated record 693B, with the index returning the location of addressable blockchain block 685C, and then block 685C may be queried directly to retrieve the latest and most current version of the authoritative stored record which is updated record 693B at standard block 685C.

Alternatively, both the contents or the data of updated record 693B and the location of addressable blockchain block 685C identifying where the most current version of the authoritative stored record 693B is kept may be persisted within the index 616, thus wholly negating the need to retrieve anything from the blockchain. While this results in an additional copy of the updated record 693B being stored within the index 699, the speed with which the data of the updated record 693B may be retrieved is vastly improved. This is especially true where the index 699 itself is stored within the host organization rather than being written to the blockchain. In such an embodiment, the index 699 is checked within the host organization 110 and both the location of the stored record is returned as well as the contents or the data of the stored record, with such data corresponding to the copy of the data from the stored record in the blockchain being returned from the index 699 stored at the host organization. Thus, the application receiving such information is subsequently checked to validate the information stored within the blockchain by retrieving the stored record from the blockchain using the location for the stored record within the blockchain as returned by the index 699 or the application may simply utilize the copy of the data returned from the index 699 itself, depending on the data consistency requirements and concerns of that particular application.

Thus, as may be observed here, the data leafs of the index 699 now include not just addressing information providing the location of the block in question within the blockchain, but additionally persist a copy of the stored record within the blockchain, thus providing duplicative locations from which to retrieve such data. One copy of the stored records is retrievable from the blockchain itself, but a copy of the stored record in the blockchain is also retrievable from the index 616.

As depicted here, the leaf hash A now has a link to location 684, thus providing the location or addressing information for block 684 on the blockchain 699 where stored record 691 is persisted. However, leaf hash A additionally now has a copy of stored record 691 which is persisted within the index 699 itself, thus permitting retrieval of the data or contents from stored record 699 directly from the index 616 stored on the host organization without necessarily having to retrieve the stored record from the blockchain, despite the blockchain having the authoritative copy of the stored record 691. By identifying the records to be indexed (e.g., all student records for example) and then searching for and retrieving those records from the blockchain and recording the location of those records within the index 616 along with a copy of the stored records retrieved, such an index 616 may be built and utilized for very fast retrieval of the record contents. Further depicted is leaf hash B having a link to the blockchain block location 685A along with a copy of stored record 692 located within the index 616 and because stored records 693A was updated and thus deprecated by stored record 693B, the leaf hash C is built with a link to blockchain block location 685C along with a copy of the stored record 693B from the blockchain to be persisted within the index 616 stored at the host organization 110 (e.g., within the database system 130 of the host organization 110). In alternative embodiments where the index 616 is saved within the blockchain retrieval efficiency is still improved as only the index 616 needs to be retrieved, which will have within it the duplicative copies of the stored records as described above.

The index 616 may then be searched much more quickly than searching the blockchain or in the event the hash or address is known for a leaf or node within the index 616, then the address may be utilized to go directly to the leaf or node within the index 616 from which all contents may thus be retrieved. For instance, is the address or hash points to a leaf, then the location information for the addressable block within the blockchain will be returned along with the persisted duplicate copy of the stored record at that blockchain location. If the address or hash points to a node with sub-nodes or multiple leafs beneath it, then the entire sub-tree will be returned, thus providing the contents of multiple records within the respective leafs (end-points) of the sub-tree returned.

Figure 6C:
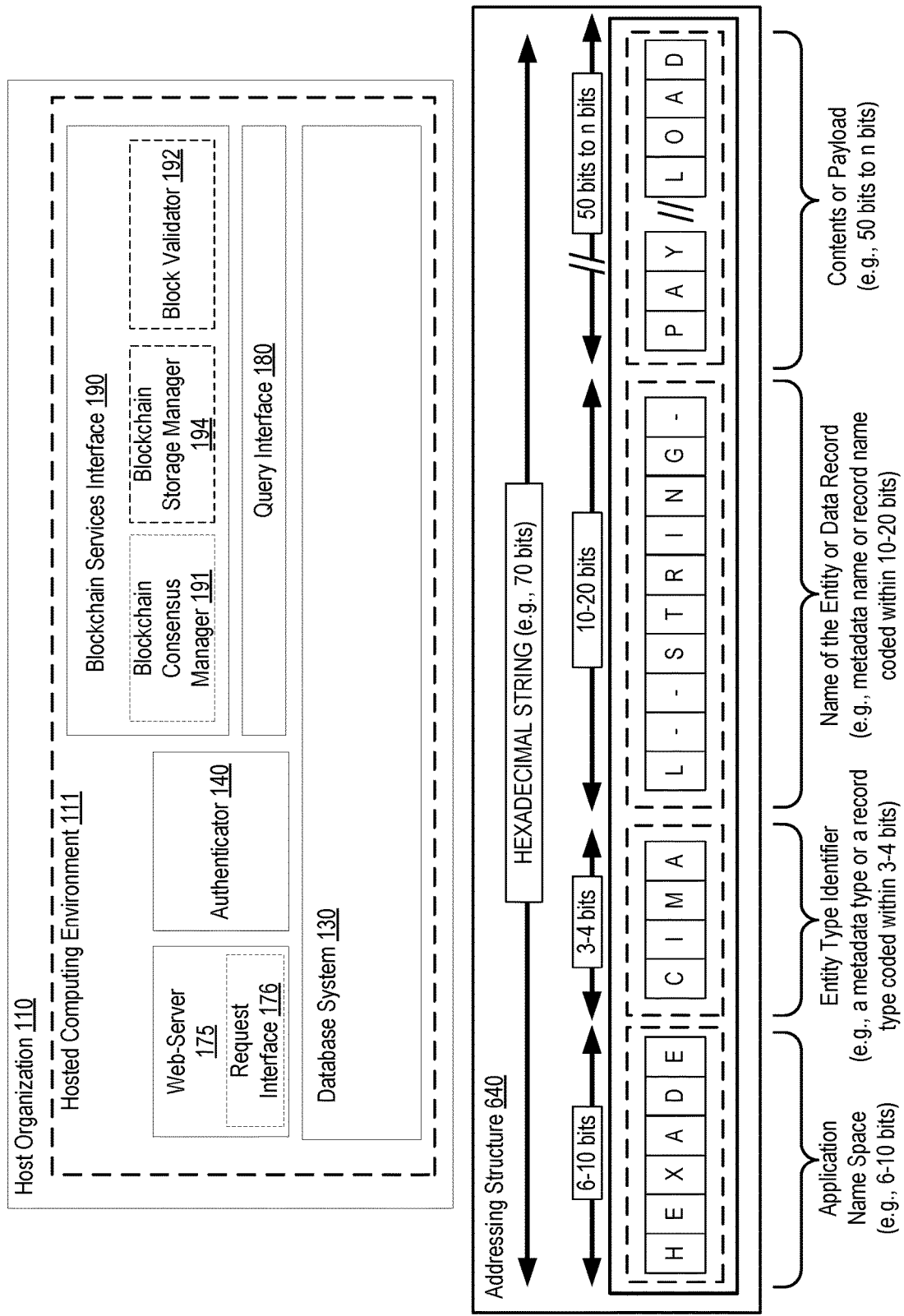
FIG. 6C depicts another exemplary architecture for utilizing an addressing structure to form an address for retrieving information from the index, in accordance with described embodiments.

FIG. 6C depicts another exemplary architecture 603 for utilizing an addressing structure to form an address for retrieving information from the index, in accordance with described embodiments.

Structuring of the addresses within the Merkle tree index permits very fast access to the specific node or leaf within which the location information for the stored records within the blocks on the blockchain is provided as well as, according to certain embodiments, a copy of the stored record. Without the structured address, it is necessary to begin at the root of the Merkle tree index 616 and then step through each level until the desired node or leaf is found. While this traversal of an index 616 is faster than walking or traversing the blocks of the blockchain, even faster access is realized by referring directly to a single leaf or a node (and thus it's sub-nodes or leafs) via a structured address as depicted via the addressing structure 640 shown here.

Specifically depicted here is an addressing data structure 640 for the indexing scheme utilizing the Merkle tree index 616 which is broken into four primary components which make up a hexadecimal string. The first portion provides an application namespace of an exemplary 6-10 bits (though the size may differ) in which a specific application may be coded. For instance, the student records discussed above may be defined by and utilized in conjunction with a student record look-up API or interface coded as "SLDB" (e.g., Student Lookup DataBase) which converts to hex "534c4442." This application namespace field is then followed by an entity type identifier of an exemplary 3-4 bits (though the size may differ) to identify the type or kind of information stored, such as a stored record or a metadata entity or a related entity stored as metadata, etc. For example, the information may be the contents of a student record which may be coded as SR which converts to hex "5352" or the information may be metadata defining a student record which may be coded as MD which converts to hex "4d44" or the information may be a related entity. Certain related entities are stored as metadata with the same type identifier (e.g., MD/4d44) or alternatively may be stored as metadata with a unique entity type identifier, such as being coded RE for related entity which converts to hex "5245."

Next, within the addressing structure 640 is the name of the entity or data record of an exemplary 10-20 bits (though the size may differ) to specifically what is being stored (not the contents, but the name of the stored information). Thus, metadata defining a student record may be coded as SRAMD (e.g., for Student Record Application MetaData) which converts to hex "5352414d4420" or the stored information may be the student record itself, thus being named STUDREC (e.g., for Student Record) which converts to hex "5354554452454320" or perhaps the stored information is a related entity within which there is stored a student's transcript named TRNSCRPT which converts to hex "54524e534352505420" or the stored information may be a stored a student's medical records named MEDREC which converts to hex "4d454452454320" information may be a related entity. Any extra space for the respective portions of the addressing structure may be padded with leading zeros depending on the application's use and means of parsing such data.

Lastly, there is a contents or payload portion of the addressing structure having therein the actual information to be stored, such as the contents of a stored record (e.g., the values making up a student's record), or metadata defining a record (e.g., the metadata by which to define, validate, structure, mask, or type the actual stored contents. Similarly, there may be stored within the payload or contents portion of the addressing structure 640, metadata identifying a related entity via a linked UUID which corresponds to a UUID field within a stored record (e.g. a student record may include a related entity field with a UUID for a student's transcript, thus linking the student's record with the student's separately stored transcript within a related entity metadata stored asset on the blockchain).

Within the payload or contents portion of the addressing structure 640, the application developer utilizing the indexing scheme has nearly unlimited flexibility of what may be stored, up to the size limits imposed, such as a 70 bit total limit for an extremely small, efficient, albeit restrictive addressing structure 640 up to n bits (e.g., hundreds or thousands depending on the use case) within which significantly more information may be stored.

Because the information is stored as a hexadecimal string, the information may easily be protobuffed, serialized, encrypted, and decrypted as well as every efficiently transmitted across networks and utilized by heterogeneous applications without regard to any specialized formats.

Figure 6D:
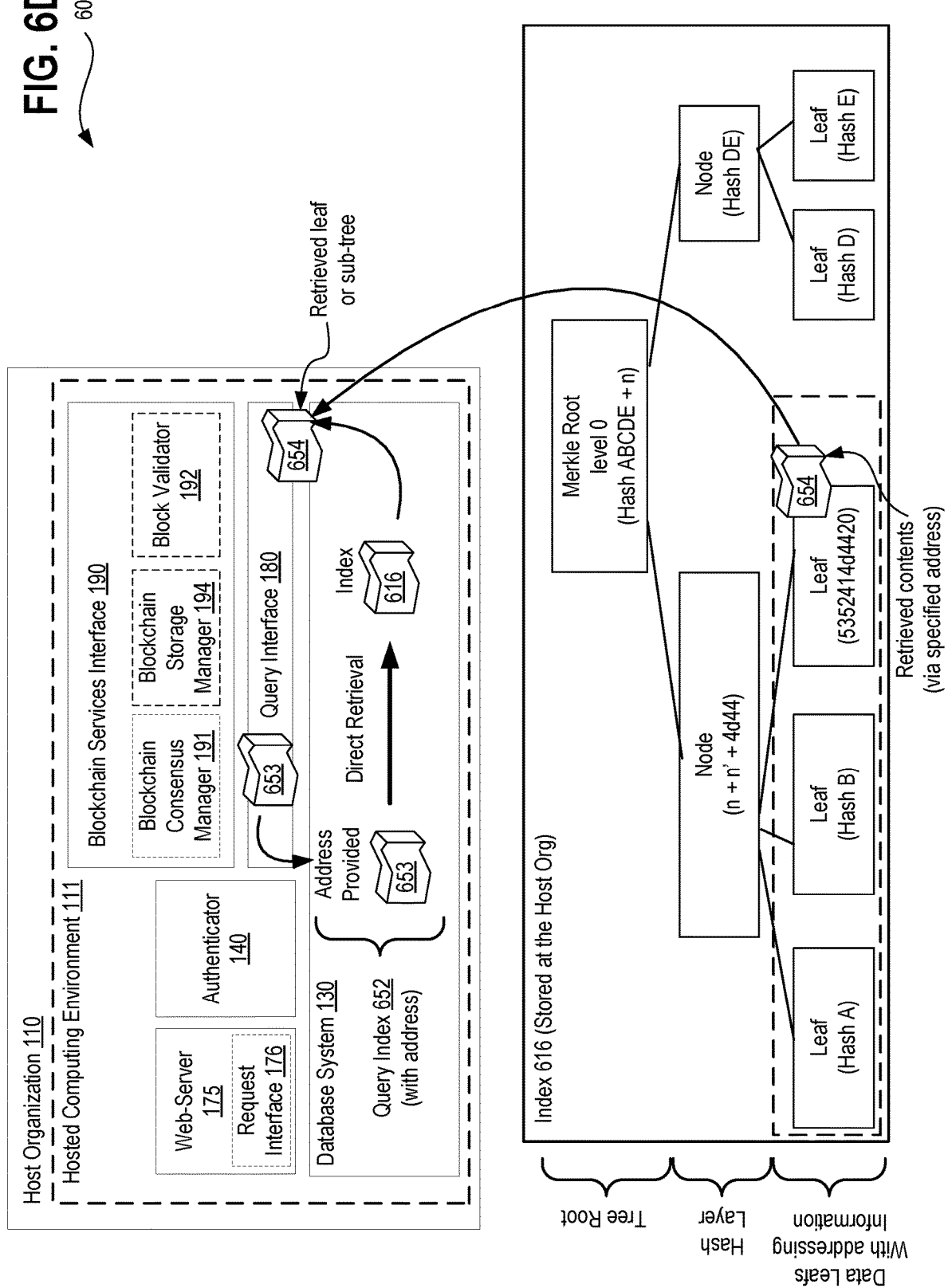
FIG. 6D depicts another exemplary architecture for utilizing an address to retrieve information from the index, in accordance with described embodiments.

FIG. 6D depicts another exemplary architecture 604 for utilizing an address to retrieve information from the index, in accordance with described embodiments.

As depicted here, the query interface 180 provides an address 653 via which to perform a query 652 against the index using the address, thus permitting direct retrieval from the index 616 of either a leaf or a sub-tree of the index 616 depending on what retrieved data is queried for via the address.

Consider a query 652 against the index 616 address using the indexing scheme and address structure from the example above.

For example, the application namespace for a student record look-up API or interface is coded as "SLDB" (e.g., Student Lookup DataBase) which converts to hex "534c4442" followed by the type or kind of information stored coded as MD (for metadata) which converts to hex "4d44" followed by metadata defining a student record coded as SRAMD which converts to hex "5352414d4420."

This results in an address of 534c4442+4d44+5352414d4420 or 534c44424d445352414d4420. It is not necessary to define the address for the contents or payload since this is the data being retrieved, however, such data may be written to the index using the above address concatenated with the hexadecimal representation of the contents or payload.

Nevertheless, querying against the index 616 using the address 534c4442+4d44+5352414d4420 provides a fully qualified address down to a leaf in the Merkle tree index having therein the payload or contents to be retrieved, which in this case is the metadata for an application called "SLDB"

(e.g., Student Lookup DataBase) which defines the coding of student records for that application.

Similarly, if a student record is to be retrieved, then querying the index 616 using the address 534c4442 (for the Student Lookup DataBase)+5352 (for SR or a Student Record)+5354554452454320 provides a fully qualified address down to a leaf in the Merkle tree index having therein the student record payload or contents to be retrieved, which in this case is the student record information for the application called "SLDB" (e.g., Student Lookup DataBase) which is defined by the metadata retrieved above. If the student's UUID or student ID is utilized as a leading portion of the stored student record payload, then the address may be further qualified to retrieve a specific record's contents only for that particular student.

Another benefit of such an indexing scheme is the ability to query for information using a non-fully-qualified address or a partial address. For example, continuing with the above example, the developer may trigger the index to return all the metadata for their specific application by submitting a partial address to the index 616 for direct retrieval by specifying their address and the entity type identifier for their metadata. Thus, such a partial address forms the hex string for the application namespace portion corresponding to the "SLDB" (e.g., Student Lookup DataBase) which converts to hex "534c4442" followed by the type or kind of information stored coded as MD (for metadata) which converts to hex "4d44," thus resulting in 534c4442+4d44 or simply 534c44424d44.

Querying the index 616 for direct retrieval using this partial address will cause the index to return all metadata for the "SLDB" (e.g., Student Lookup DataBase) application, regardless of what such metadata is named or how many leafs or sub-trees are consumed to store such data. More particularly, querying the index 616 using the partial address will return an entire sub-tree below the node of the Merkle tree index hashed with the hex string 534c4442+4d44. Similarly, all student records may be retrieved (via an entire sub-tree being returned) by specifying a partial address for direct retrieval, such as specifying to the query of the index 616 the address 534c4442 (for the Student Lookup DataBase)+5352 (for SR or a Student Record) without any specifically named student records.

In the event the contents or payload information in the index includes both the location information for the stored record within the blockchain as well as the contents of the stored record copied from the blockchain into the index 616, then it is not necessary to retrieve anything further from the blockchain. If only the location information of the contents within a specified block of the blockchain is provided (thus resulting in a much smaller storage volume and faster retrieval due to a smaller index) then the blockchain services interface 190 will subsequently utilize the location information to fetch the contents of the stored record directly from the specified block on the blockchain without having to traverse or walk multiple blocks of the blockchain in search of the specified stored record.

Figure 6E:
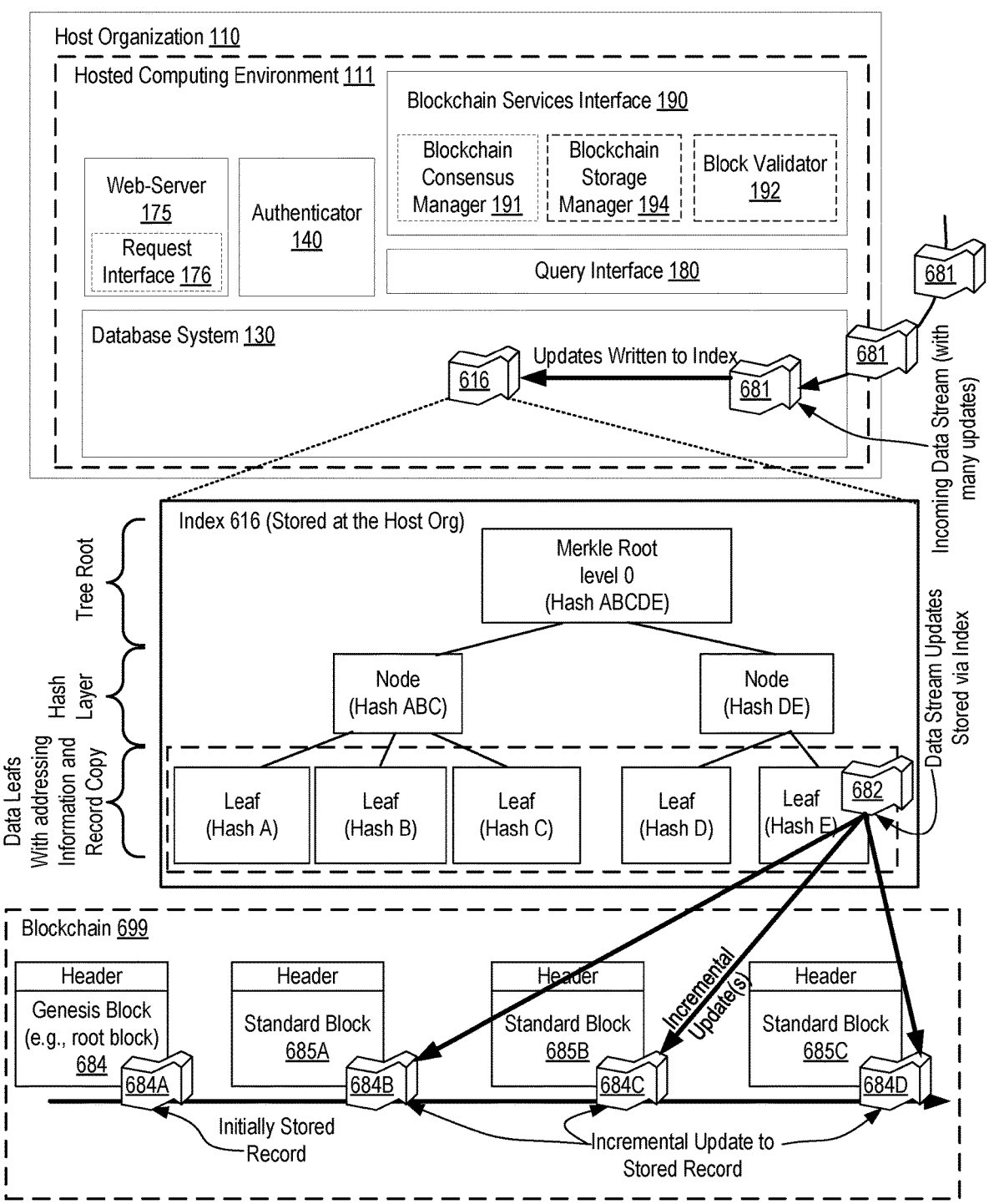
FIG. 6E depicts another exemplary architecture for incrementally updating a blockchain asset for stored records using an index to store current updates, in accordance with described embodiments.

FIG. 6E depicts another exemplary architecture 605 for incrementally updating a blockchain asset for stored records using an index to store current updates, in accordance with described embodiments.

In certain situations, it is desirable to store information within the blockchain, however, the volume and frequency of information updates for the stored records render use of the blockchain impractical given that blockchain storage is very poorly suited for information storage with many updates at a high frequency.

As shown here, an incoming data stream 681 with many updates is received at the host organization and the updates are written into the index 616 resulting in the data stream updates being stored via the index as shown at element 682. Periodically, incremental updates are then written into the blockchain by, for example, transacting with the blockchain to add a new asset having the stored record(s) with the incremental updates taken from the index 616 and pushed into the blockchain as stored records. For example, stored record 684A is initially stored on the blockchain 699 with an initial batch of data from the data stream. Next, more data stream updates are written first to the index 616 at the host organization and after a period of time, the incremental updates are then again written to the blockchain, resulting in repetitive incremental updates shown here as incremental update 684B, then incremental update 684C, and then incremental update 684D, and so on.

Consider for example the storage of an information stream from IoT devices (Internet of Things) devices which are reporting various telemetry data such as status, errors, location, events, configuration changes, etc. If the collection of such data scales to a large group of IoT devices in the hundreds the blockchain may be overwhelmed due to the frequency of data storage requests.

However, storing the information within the index 616, especially when the index is stored within the host organization, overcomes this problem as the database system 130 of the host organization easily accommodates a high frequency of database updates and interactions.

Therefore, in the event it is nevertheless desired to make such data available on the blockchain and to be stored upon the blockchain, then the frequency problem may be overcome by first writing the many updates (e.g., from the IoT devices or other such updates) directly into the index 616 within the host organization 110 and then periodically writing incremental updates to the blockchain for persistent storage of the data within the blockchain. For example, IoT device data streams may be collected by the host organization 110 into the index and then once every 24 hours (or some other period) the incremental update to the IoT device data stream (measured from the last update to the blockchain to the currently available data) is then pushed, flushed, added, or transacted onto the blockchain. Thus, the latest block of the blockchain then persistently stores the latest portion of the IoT device data stream and thus be accessible directly from the blockchain or alternatively available from the index 616 at the host organization.

In certain embodiments, the index purges or flushes the incremental data by storing the incremental update to the blockchain and then the index removes the stored contents or payload portion from the index 616 and retains only the block location information on the blockchain via which to locate the underlying stored records. Stated differently, once the incremental information is written to the blockchain, the index 616 may be cleaned up such that it retains where to locate the stored records having the incremental information on a specific block of the blockchain, but the index 616 itself no longer retains the contents of such stored records as they are available within the blockchain and because such data, which grows very quickly, may slow the index in an undesirable manner.

Pushing the whole change (e.g., all of the IoT data stream ever collected) to the blockchain in its entirety is problematic as all data prior to the incremental update is replicated over and over again within the blockchain. Thus, pushing only the incremental changes or updates to the blockchain provides efficient use of the blockchain for purposes of storage and efficient use of the index 616 by which to buffer the incoming data stream or incoming high frequency updates as well as via which the index 616 permits fast identification of location information indicating where the incremental information is stored (e.g., within which block) on the blockchain.

Figure 7:
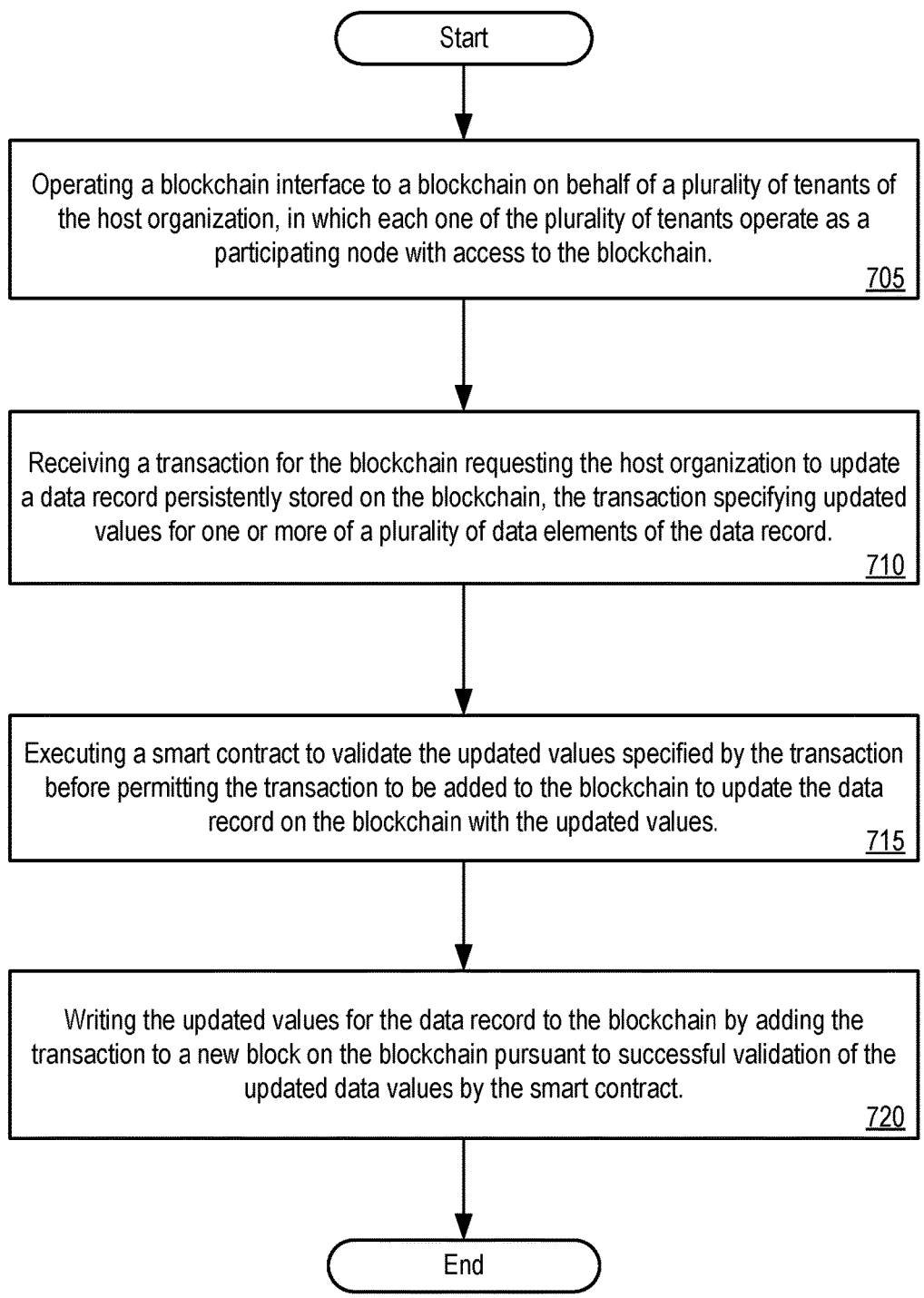
FIG. 7 depicts a flow diagram illustrating a method for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers, in accordance with described embodiments.

FIG. 7 depicts a flow diagram illustrating a method 700 for implementing efficient storage and validation of data and metadata within a blockchain using Distributed Ledger Technology (DLT) in conjunction with a cloud based computing environment such as a database system implementation supported by a processor and a memory to execute such functionality to provide cloud based on-demand functionality to users, customers, and subscribers.

Method 700 may be performed by processing logic that may include hardware (e.g., circuitry, dedicated logic, programmable logic, microcode, etc.), software (e.g., instructions run on a processing device) to perform various operations such as operating, defining, declaring, associating, writing, receiving, retrieving, adding, transacting, training, distributing, processing, transmitting, analyzing, triggering, pushing, recommending, parsing, persisting, exposing, loading, generating, storing, maintaining, creating, returning, presenting, interfacing, communicating, querying, providing, determining, displaying, updating, sending, etc., in pursuance of the systems and methods as described herein. For example, the hosted computing environment 111, the blockchain services interface 750, and its database system 130 as depicted at FIG. 1, et seq., and other systems and components as described herein may implement the described methodologies. Some of the blocks and/or operations listed below are optional in accordance with certain embodiments. The numbering of the blocks presented is for the sake of clarity and is not intended to prescribe an order of operations in which the various blocks must occur.

With reference to the method 700 depicted at FIG. 7, at block 705, processing logic operates a blockchain interface to a blockchain on behalf of a plurality of tenants of the host organization, in which each one of the plurality of tenants operate as a participating node with access to the blockchain.

At block 710, processing logic receives a transaction for the blockchain requesting the host organization to update a data record persistently stored on the blockchain, the transaction specifying updated values for one or more of a plurality of data elements of the data record.

At block 715, processing logic executes a smart contract to validate the updated values specified by the transaction before permitting the transaction to be added to the blockchain to update the data record on the blockchain with the updated values.

At block 720, processing logic writes the updated values for the data record to the blockchain by adding the transaction to a new block on the blockchain pursuant to successful validation of the updated data values by the smart contract.

According to another embodiment, method 700 further includes: performing a data merge operation for the data record persistently stored on the blockchain, in which the data merge operation includes: retrieving the data record in its entirety from the blockchain to retrieve all of the plurality of data elements of the data record; merging the validated updated values as specified by the transaction for the blockchain into the plurality of data elements of the data record to form a complete data record having the validated updated values embodied therein; in which writing the updated values for the data record to the blockchain by adding the transaction to a new block on the blockchain includes writing the complete data record having the validated updated values embodied therein to the new block of the blockchain; in which the complete data record deprecates all prior versions of the data record stored on the blockchain and does not reference any prior version of the data record stored on the blockchain.

For example, the data merge operation permits data of a data record to be retrieved from a single block of the blockchain, regardless of how many updates the data record has previously undergone. While some data is thus duplicated (e.g., the non-updated values will now be present in a prior block and also the new block to which the complete record having been merged is written). Notwithstanding the data-redundancy, data retrieval is made more efficient and faster.

According to another embodiment of method 700, writing the updated values for the data record to the blockchain by adding the transaction to a new block on the blockchain includes: writing the updated values into the new block on the blockchain with a reference to a prior block on the blockchain; in which retrieval of a complete and current version of the data record requires any data elements of the stored data record which are not modified by the updated values to be retrieved from the prior block on the blockchain based on the reference and retrieval of the updated values from the new block on the blockchain.

For example, rather than performing a data merge operation which improves retrieval but results in redundancy of stored data, the stored data record is instead represented by multiple blocks on the blockchain, with newer updated information being stored within a new block of the blockchain along with a reference pointer to a prior location on the blockchain from which the non-updated values of the stored data record may be retrieved.

According to another embodiment, method 700 further includes: performing a data merge operation and a data serialization for the data record persistently stored on the blockchain; in which the data merge operation includes (i) retrieving the data record in its entirety from the blockchain and (ii) merging the updated values into the retrieved data record form a complete data record having the updated values embodied therein; in which the data serialization operation includes converting the complete data record formed by the data merge operation and having the updated values embodied therein into a serialized byte stream; and in which writing the updated values for the data record to the blockchain by adding the transaction to the new block on the blockchain includes writing the serialized byte stream to the new block on the blockchain.

For example, the updated record resulting from the data merge operation may be serialized (e.g., via a protobuf generator or other serialization means) to form a smaller and more efficient record to be stored to the blockchain, and potentially providing a layer of data security through abstraction resulting from the serialization and optionally permitting further encryption of the serialized updated record where a high degree of data security is warranted.

According to another embodiment, method 700 further includes: executing a protobuf generator to convert the complete data record formed by the data merge operation and having the updated values embodied therein into the serialized byte stream.

According to another embodiment of method 700, the serialized byte stream forms at least one of: a binary format serialized byte stream; a JavaScript Object Notation (JSON) compatible format serialized byte stream; an plain text or American Standard Code for Information Interchange (ASCII) compatible format serialized byte stream; an encrypted serialized byte stream; a protobuffed serialized byte stream; and a hexadecimal format serialized byte stream.

For example, the data serialization operation may produce any of a variety of formats depending upon the needs of the application developer's needs with respect to security and ease of interoperability of the serialized data.

According to another embodiment, method 700 further includes: receiving a first transaction for the blockchain requesting the host organization to store the data record on the blockchain as a new stored data record, in which the new stored data record includes a plurality of data elements embedded therein as specified by the first transaction; and in which receiving the transaction for the blockchain requesting the host organization to update the data record persistently stored on the blockchain includes receiving a second transaction for the blockchain, in which the second transaction specifies the updated values for the new stored data record previously transacted onto the blockchain.

For example, an original and new record to be stored to the blockchain is still subjected to data validation, however, there is no need to update an original and new data record. Subsequently, updates to the original data record may be applied and stored on the blockchain subject to data validation.

According to another embodiment, method 700 further includes: receiving a first transaction for the blockchain requesting the host organization to store metadata on the blockchain, the metadata defining a valid format for the data record and the plurality of data elements stored by the data record; in which receiving the transaction for the blockchain requesting the host organization to update the data record persistently stored on the blockchain includes receiving a second transaction for the blockchain, in which the second transaction specifies the updated values for the stored data record as previously transacted onto the blockchain; and in which executing the smart contract to validate the updated values specified by the transaction includes retrieving the metadata from the blockchain stored pursuant to the first transaction and validating the updated values using the retrieved metadata.

For example, the metadata defining the appropriate format for the record may be permissibly stored onto the blockchain and then retrieved for use by the executed smart contract in performing the data validation. Additionally, it is further permissible to protobuf or serialize the metadata stored to the blockchain if desired.

According to another embodiment, method 700 further includes: rejecting the transaction and prohibiting the updated values from being written to the data record persistently stored to the blockchain upon a failed validation of the updated values specified by the transaction.

According to another embodiment, method 700 further includes: determining a transaction type based on the transaction received; identifying the smart contract to be executed based on the determined transaction type; and in which executing the smart contract to validate the updated values includes executing the smart contract identified based on the transaction type.

For example, transactions with the blockchain may be "typed" such that different transactions correspond to different transaction types. According to such an embodiment, based on the transaction type, a smart contract may be identified or looked up according to the determined transaction type. Subsequently, execution of the smart contract is based on the determined transaction type and smart contract identification. In certain embodiments, the transaction type is expressly specified with the transaction whereas in other embodiments the transaction type is derived based on the contents of the transaction.

According to another embodiment of method 700, in which executing the smart contract to validate the updated values specified by the transaction includes: retrieving metadata defining a valid format for the data record persistently stored on the blockchain; validating the updated values specified by the transaction using the metadata retrieved; and issuing a successful validation result or a failed validation result based on the validation, in which the transaction is prohibited from being added to the blockchain pursuant to the failed validation result and in which the transaction is permitted to be added to the blockchain pursuant to the successful validation result.

For example, execution of the smart contract acts as a quality control and may be utilized to ensure that corrupted, malicious, or malformed data is not transacted onto the blockchain.

According to another embodiment of method 700, the data record is stored on the blockchain within an asset's payload portion via a CREATE asset command term for the blockchain; and in which the data record is associated with a transaction type for stored data records which are to be stored in their entirety with any update within a new block of the blockchain deprecating any prior version of the data record.

According to another embodiment of method 700, the data record is stored on the blockchain within an asset's payload portion via a CREATE asset command term for the blockchain; and in which the data record is associated with a transaction type for stored data records which are to be stored incrementally; in which any update to the stored data record writes the updated values specified by the transaction to a new block on the blockchain with a reference to a prior block on the blockchain within which the stored data record was previously stored; and in which retrieval of the stored data record from the blockchain requires retrieval of the updated values from the new block on the blockchain and retrieval of any remaining values not modified by the updated values from the prior block on the blockchain.

For example, storing records on the blockchain may leverage the CREATE asset command term to transact new assets onto the blockchain, within which the stored data record is then encoded or embodied, for instance, within a payload portion of the new asset. Subsequent updates to the stored data record may then update the asset using the UPDATE asset command function or generate an entirely new asset for a complete record with updated information generated via the data merge operation discussed above, in which case either the UPDATE asset command function may be utilized in which case the new version is created in its entirety but with a reference to a prior deprecated version of the stored data record or the CREATE asset command term may be utilized to simply remove all reference to any prior version and write the complete updated record to the blockchain as a new asset, depending on the blockchain protocol and the considerations of the application developer.

According to another embodiment, method 700 further includes: receiving a second transaction for the blockchain requesting the host organization to store a related entity, the related entity to be persistently stored to the blockchain via a second asset separate and distinct from a first asset within which the stored data record is persistently stored on the blockchain; transacting with the blockchain via a CREATE asset transaction to add the second asset to the blockchain and storing the related entity within a payload portion of the second asset; and relating the related entity stored within the second asset to the stored data record within the first asset via a universally unique identifier (UUID) assigned to the related entity.

According to another embodiment, method 700 further includes: retrieving the stored data record from the blockchain; updating the stored data record to include the UUID assigned to the related entity; and writing the updated stored data record having the UUID included therein to the blockchain.

According to another embodiment of method 700, the stored data record includes a student record having embedded therein via the plurality of data elements at least a student first name, a student last name, and a student ID; in which the related entity includes a student transcript; relating the related entity stored within the second asset to the stored data record within the first asset via a universally unique identifier (UUID) assigned to the related entity includes linking the student transcript with the student record via the UUID assigned to the student transcript; in which updating the stored data record to include the UUID includes updating the student record to include the UUID linking the student record with the student transcript; and in which writing the updated stored data record having the UUID included therein to the blockchain includes writing the student record to the blockchain having embedded therein the student first name, the student last name, the student ID and the UUID assigned to the student transcript stored on the blockchain via a separate and distinct second asset.

For example, storage of other information which is not part of one of the data elements of the stored data record may nevertheless be stored onto the blockchain via the related entity functionality in which the related entity (such as a student transcript or a student medical record, etc.) is written to the blockchain as metadata stored within a separate asset from the stored data record and then linked with the stored data record by including a UUID assigned automatically to the related entity in the plurality of data elements of the stored data record, thus requiring an update to the stored data record to effectuate the link.

According to another embodiment of method 700, metadata defining a valid format for the data record is stored on the blockchain within an asset's payload portion via a CREATE asset command term for the blockchain; and in which the metadata is associated with a transaction type for stored metadata.

For example, storage of metadata may also leverage the CREATE asset command term, although it is different in terms of its transaction type and also stored contents.

According to another embodiment of method 700, the added transaction is subjected to a consensus protocol by the participating nodes of the blockchain prior to the added transaction being accepted as part of a primary chain of the blockchain by the participating nodes of the blockchain.

For example, transacting on the blockchain retains consensus schemes required for that blockchain so as to ensure transaction validity.

According to another embodiment of method 700, the metadata is accessible only to one of the plurality of tenants of the host organization having defined and transacted the metadata onto the blockchain; or in which alternatively the metadata is accessible all of the plurality of tenants operating as one of the participating nodes with access to the blockchain regardless of which one of the plurality of tenants defined and transacted the metadata onto the blockchain.

For example, it is possible to define and store metadata to the blockchain with the intention that it remain domain-specific to the particular tenant organization that created the metadata for their specific application. However, there may be instances in which an administrator for the host organization wishes to create non-domain-specific metadata which is then made accessible to any tenant organization operating as a participating node within the blockchain or in certain instances, a tenant organization may wish to create such metadata for a particular application which is then made accessible to other tenant organizations.

According to another embodiment of method 700, modification of the metadata transacted onto the blockchain is under the exclusive control of the one of the plurality of tenants having transacted the metadata onto the blockchain for persistent storage via the blockchain; in which a new consensus is required to write changes to the metadata onto the blockchain when the metadata is accessible to any of the plurality of tenants operating as one of the participating nodes with access to the blockchain; and in which no consensus is required to write changes to the metadata onto the blockchain when the metadata is accessible for exclusive use by only the one of the one of the plurality of tenants having originally transacted the metadata onto the blockchain.

For example, where the metadata is accessible to other tenant organizations, then modifications are subjected to consensus controls, however, if the metadata is domain specific and limited to the exclusive use by the tenant organization having created it and stored it on the blockchain originally, then it is not necessary to enforce consensus of such modifications, though optionally, the blockchain protocol may require the consensus operation regardless.

According to another embodiment of method 700, the blockchain protocol for the blockchain is defined by the host organization and further in which the host organization permits access to the blockchain for the plurality of tenants of the host organization operating as participating nodes on the blockchain; or alternatively in which the blockchain protocol for the blockchain is defined by a third party blockchain provider other than the host organization and further in which the host organization also operates as a participating node on the blockchain via which the host organization has access to the blockchain.

For example, certain blockchains are implemented by the host organization itself, in which the host organization defines the blockchain protocol and facilitates access to the blockchain on behalf of its tenant organizations who then operate as participating nodes on the host org provided blockchain, optionally with non-tenant orgs also permitted as participating nodes at the discretion of the host organization. However, there are also existing blockchain implementations which are not defined by or implemented by the host organization and thus, operate external from the host organization with such blockchain protocols having been defined by a third party or an outside consortium or standards body. In such an event, the host organization may nevertheless facilitate access to the blockchain by operating as a participating node itself on the blockchain, via which the host organization may then have access to the functions of the blockchain. In such an event, permissions and access rights may be granted by the tenant orgs to the host organization to act on their behalf as a proxy, or the host organization may implement virtual participating nodes on the blockchain within which each tenant org may operate as a participating node, thus providing a 1:1 correspondence between the tenant orgs and the virtual nodes implemented by the host organization or the host organization may execute the associated smart contract and perform validation of stored data record update transactions for the blockchain, but then permit the tenant organization's own participating node to self-authenticate with and then actually transact with the blockchain, for instance, via the host organization provided API. In such a way, tenant orgs may add transactions to the blockchain (subject to consensus) regardless of which the blockchain is implemented by the host organization or a third party.

According to another embodiment, method 700 further includes: maintaining an index for a plurality of data records persistently stored to the blockchain; in which the index defines at least a location for each of the plurality of data records persistently stored to the blockchain, the location defining one addressable block of the blockchain from which to retrieve a respective data record persistently stored to the blockchain.

According to another embodiment of method 700, the index includes a Merkle Tree compatible index; and in which the index is persistently stored at the host organization or persistently stored to the blockchain or persistently stored at both the host organization and the blockchain.

For example, such an index may be utilized to improve retrieval speeds, with the index being maintained within one or both of the host organization and the blockchain. While duplicative data is persistently stored, the retrieval time for fetching records indexed is greatly reduced due to the index defining a specific location of the data within the blockchain, such as at which block such data is stored.

According to another embodiment of method 700, the index defines for each of the plurality of data records persistently stored to the blockchain, both (i) the location for each of the plurality of records persistently stored to the blockchain and (ii) a copy of any contents of the plurality of record records persistently stored to the blockchain; and in which maintaining the index includes writing the updated values for the data record to the index when the updated values for the data record are written to the blockchain pursuant to successful validation of the updated values.

According to another embodiment, method 700 further includes: receiving a second transaction requesting retrieval, from the blockchain, of the updated data record previously written to the blockchain; retrieving the updated data record from the index without interacting with the blockchain; and returning the updated data record retrieved from the index responsive to the second transaction requesting the retrieval.

For example, in addition to indexing location information, contents of the records may also be retrieved, wholly negating the need to transact with the blockchain for a read-only retrieval request which has been previously indexed. Where the contents of such stored records are indexed in this way retrieval speed will be increased dramatically over conventional blockchain retrieval transactions, especially when the index is persisted and maintained at the host organization, thus eliminating any interaction with the blockchain whatsoever for a read-only retrieval.

According to another embodiment of method 700, nodes and leafs of the index are retrievable via full or partial addresses as defined by an addressing structure for the index; in which the method further includes maintaining the addressing structure for the index, in which the addressing structure includes at least: a first portion of the addressing structure defining an application namespace; a second portion of the addressing structure defining an entity type identifier; and a third portion of the addressing structure defining a name for an entity or a data record stored by the blockchain and indexed by the index.

For example, any node or leaf or sub-tree below a node may be directly referenced and retrieved from the index without having to walk, traverse, or search the index when the address is known, thus further increasing retrieval speeds.

According to another embodiment of method 700, referencing the index with a fully qualified address will return contents of leaf from the index, the contents of the leaf; and in which referencing the index with a partial address will return a sub-tree beneath a node of the index matching the partial address, in which the sub-tree includes multiple leafs of the index structured below the node of the index matching the partial address.

For example, contents of any leaf may be returned by a call to the index with the full addresses, specifying the application namespace, the entity type identifier and the name of the entity or record, however, use of a partial address may be extremely beneficial as it permits the return of all matching records within a sub-tree beneath a node. For example, if desired, an application which stores student records may return all metadata for the application by specifying a partial address with the application namespace and the entity type identifier, but lacking specification of any specific entity name. Similarly, all student records may be returned using a partial address specifying the application namespace code and specifying the entity type identifier for the student data records, but lacking specification of any specific entity name.

According to another embodiment, method 700 further includes: receiving multiple subsequent transactions specifying additional updated values for one or more of a plurality of data elements of the data record persistently stored to the blockchain; buffering the multiple subsequent transactions specifying the additional updated values to the index by updating the index with each of the multiple subsequent transactions upon receipt without writing corresponding updates to the blockchain; and incrementally updating the data record persistently stored to the blockchain by periodically adding a single incremental update transaction to the blockchain representing all of the additional updated values received via the multiple subsequent transactions.

For example, certain applications, such as a data stream from a group of IoT devices (Information of Things) results in updates with too high of frequency of changes and updates due to the endless stream of data to be practical for storage within a blockchain. However, buffering such information via the index and then periodically flushing such data to the blockchain via a single incremental update transaction overcomes this problem, thus permitting such high-frequency data record updates to nevertheless be transacted to and stored on the blockchain.

According to a particular embodiment, there is non-transitory computer readable storage media having instructions stored thereon that, when executed by a system of a host organization having at least a processor and a memory therein, the instructions cause the system to perform the following operations: operating a blockchain interface to a blockchain on behalf of a plurality of tenants of the host organization, in which each one of the plurality of tenants operate as a participating node with access to the blockchain; receiving a transaction for the blockchain requesting the host organization to update a data record persistently stored on the blockchain, the transaction specifying updated values for one or more of a plurality of data elements of the data record; executing a smart contract to validate the updated values specified by the transaction before permitting the transaction to be added to the blockchain to update the data record on the blockchain with the updated values; and writing the updated values for the data record to the blockchain by adding the transaction to a new block on the blockchain pursuant to successful validation of the updated data values by the smart contract.

Figure 8:
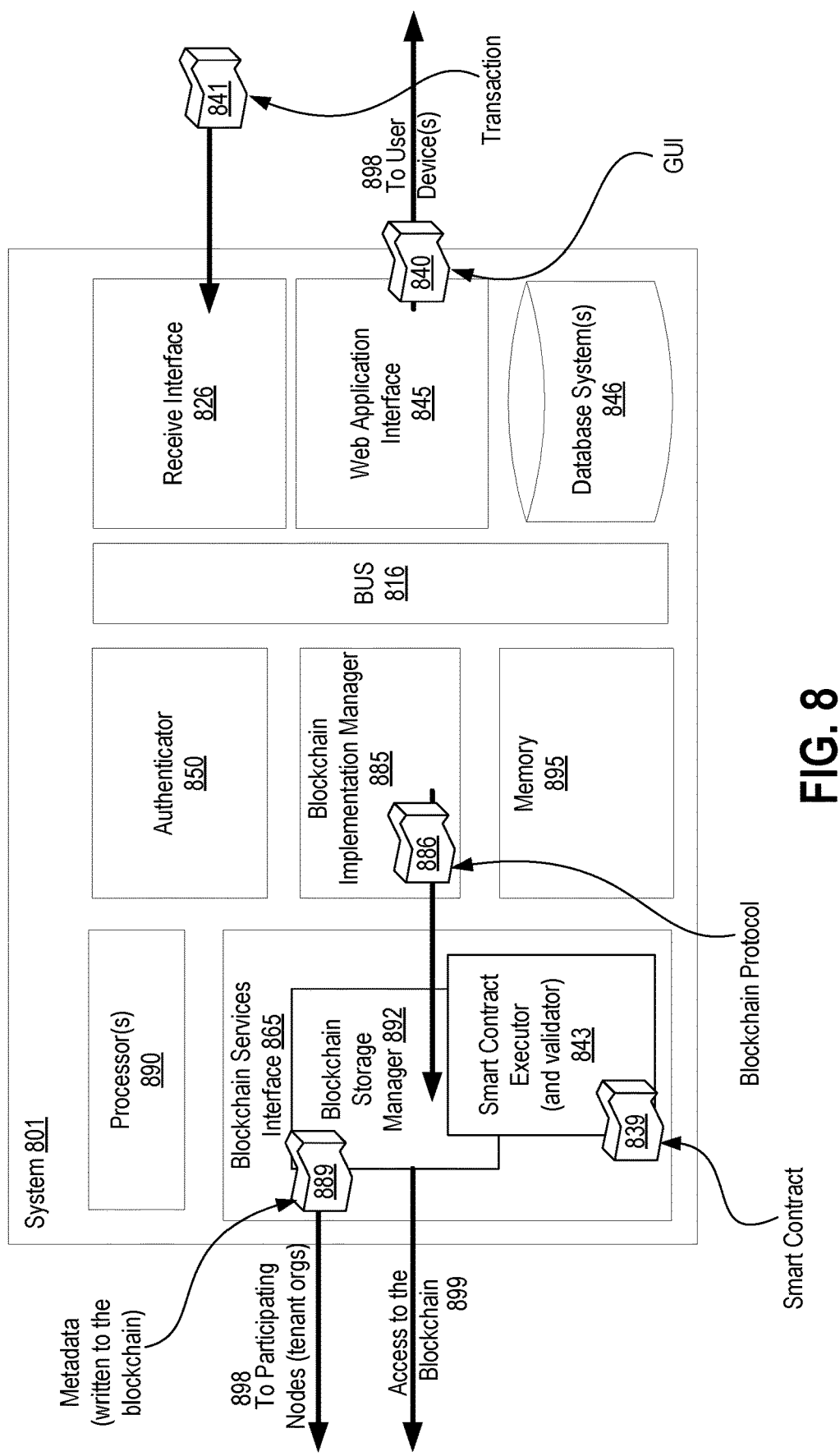
FIG. 8 shows a diagrammatic representation of a system within which embodiments may operate, be installed, integrated, or configured.

FIG. 8 shows a diagrammatic representation of a system 801 within which embodiments may operate, be installed, integrated, or configured. In accordance with one embodiment, there is a system 801 having at least a processor 890 and a memory 895 therein to execute implementing application code for the methodologies as described herein. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 801, which may operate within a host organization, includes the processor 890 and the memory 895 to execute instructions at the system 801. According to such an embodiment, the processor 890 is to execute a blockchain services interface 865 on behalf of on behalf of a plurality of tenants 898 of the host organization, in which each one of the plurality of tenants 898 operate as a participating node with access to the blockchain 899. A receive interface 826 of the system 801 is to receive a transaction 841 for the blockchain requesting the host organization to update a data record persistently stored on the blockchain, in which the transaction specifies updated values for one or more of a plurality of data elements of the data record. Such a system further includes a smart contract 839 executable via the processor 890 and the smart contract executor and validator 843 via which to validate the updated values specified by the transaction 841 before permitting the transaction to be added to the blockchain to update the data record on the blockchain with the updated values. A blockchain services interface 865 is further provided via which to the system 801 is to write the updated values for the data record to the blockchain by adding the transaction 841 to a new block on the blockchain pursuant to successful validation of the updated data values by the smart contract 839.

A blockchain protocol 886 for the blockchain defines a group of functions for the blockchain (e.g., as provided by the blockchain implementation manager 885), in which the group of base functions are accessible to any participating node 898 of the blockchain. The system 801 may further persist metadata 889 onto the blockchain; in which the receive interface 826 is to further receive a transaction 841 requesting such metadata 889 to be stored to the blockchain, sometimes for use with validating updated values of a received transaction 841. According to such a system 801, the blockchain services interface 865 is further to add the transaction 841 to a new block on the blockchain pursuant to successful validation by the smart contract 839.

According to such an embodiment of the system 801, the receive interface 826 may pass the transaction data contents of the transaction 841 to be stored within in index persisted by the database system(s) 846.

According to such an embodiment of the system 801, a GUI 840 may be pushed to the user devices 898 via which the user devices or admin computing devices may interact with the blockchain storage manager.

According to another embodiment of the system 801, the blockchain services interface 865 is to interact with and provide access to the blockchain 899.

According to another embodiment of the system 801, the receive interface 826 communicates with a user client device 898 remote from the system and communicatively links the user device with the system via a public Internet. According to such an embodiment, the system operates at a host organization as a cloud based service provider to the user device 899; in which the cloud based service provider hosts a receive interface 826 exposed to the user client device via the public Internet, and further in which the receive interface receives inputs from the user device as a request for services from the cloud based service provider.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet.

Figure 9A:
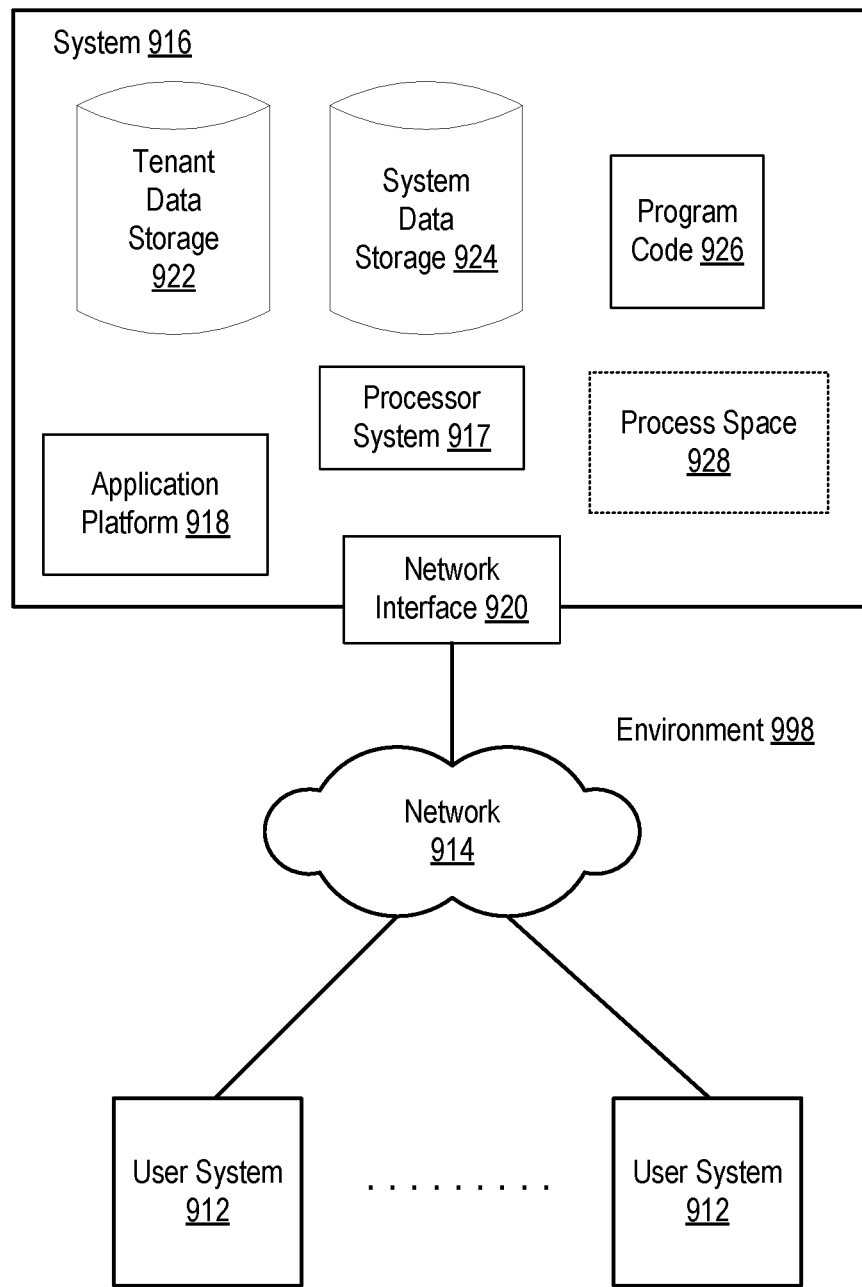
FIG. 9A illustrates a block diagram of an environment in which an on-demand database service may operate in accordance with the described embodiments.

FIG. 9A illustrates a block diagram of an environment 998 in which an on-demand database service may operate in accordance with the described embodiments. Environment 998 may include user systems 912, network 914, system 916, processor system 917, application platform 918, network interface 920, tenant data storage 922, system data storage 924, program code 926, and process space 928. In other embodiments, environment 998 may not have all of the components listed and/or may have other elements instead of, or in addition to, those listed above.

Environment 998 is an environment in which an on-demand database service exists. User system 912 may be any machine or system that is used by a user to access a database user system. For example, any of user systems 912 may be a handheld computing device, a mobile phone, a laptop computer, a work station, and/or a network of computing devices. As illustrated in FIG. 9A (and in more detail in FIG. 9B) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" is used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9A, implements a web-based Customer Relationship Management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9A, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9A include conventional, well-known elements that are explained only briefly here. For example, each user system 912 may include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device may be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it is understood that other networks may be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein may be implemented as single databases, a distributed database, a collection of distributed databases, a database with redundant online or offline backups or other redundancies, etc., and might include a distributed database or storage network and associated processing intelligence.

Figure 9B:
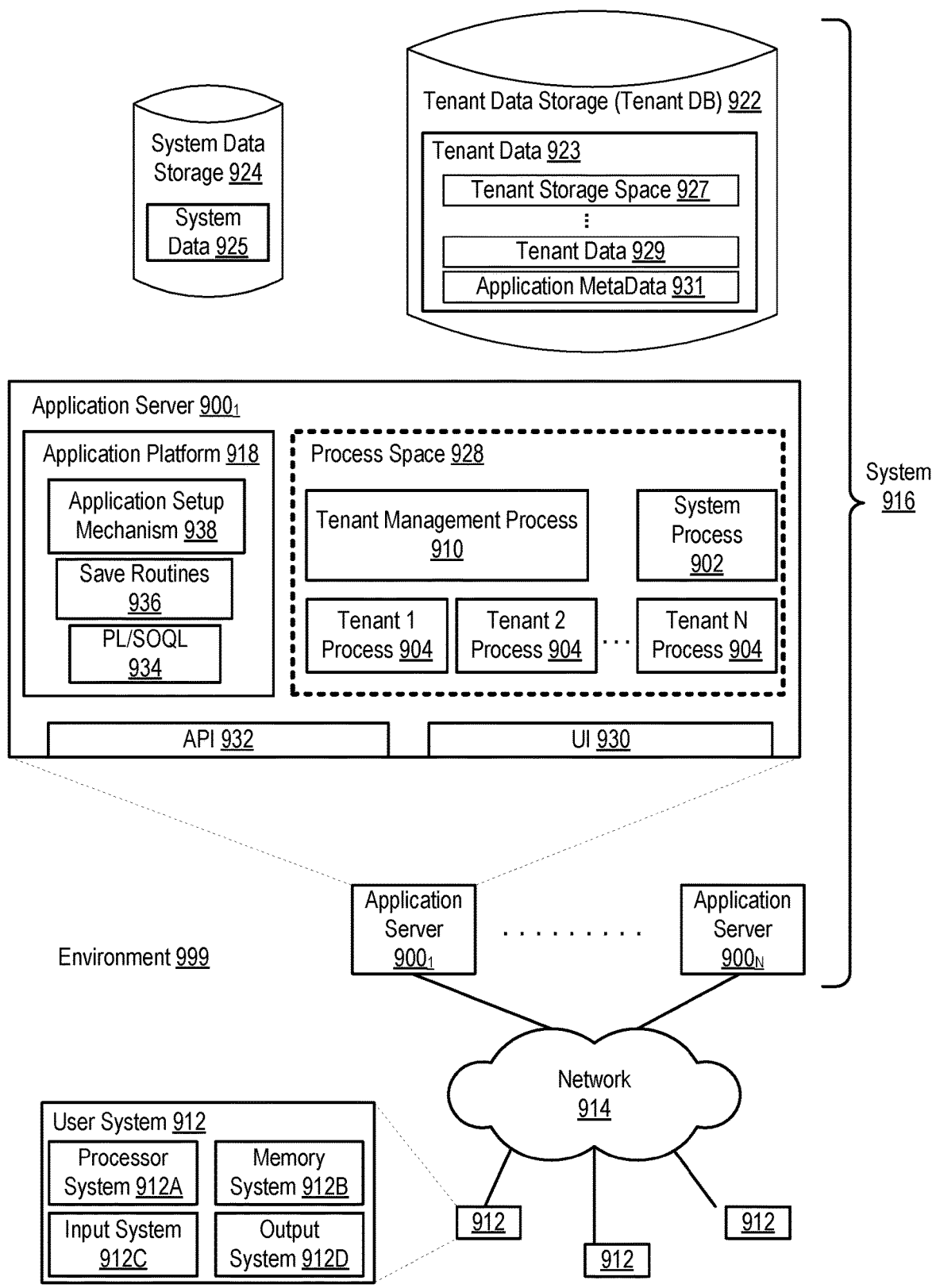
FIG. 9B illustrates another block diagram of an embodiment of elements of FIG. 9A and various possible interconnections between such elements in accordance with the described embodiments.

FIG. 9B illustrates another block diagram of an embodiment of elements of FIG. 9A and various possible interconnections between such elements in accordance with the described embodiments. FIG. 9B also illustrates environment 999. However, in FIG. 9B, the elements of system 916 and various interconnections in an embodiment are illustrated in further detail. More particularly, FIG. 9B shows that user system 912 may include a processor system 912A, memory system 912B, input system 912C, and output system 912D. FIG. 9B shows network 914 and system 916. FIG. 9B also shows that system 916 may include tenant data storage 922, having therein tenant data 923, which includes, for example, tenant storage space 927, tenant data 929, and application metadata 931. System data storage 924 is depicted as having therein system data 925. Further depicted within the expanded detail of application servers $900_{1-N}$ are User Interface (UI) 930, Application Program Interface (API) 932, application platform 918 includes PL/SOQL 934, save routines 936, application setup mechanism 938, process space 928 includes system process space 902, tenant 1-N process spaces 904, and tenant management process space 910. In other embodiments, environment 999 may not have the same elements as those listed above and/or may have other elements instead of, or in addition to, those listed above.

User system 912, network 914, system 916, tenant data storage 922, and system data storage 924 were discussed above in FIG. 9A. As shown by FIG. 9B, system 916 may include a network interface 920 (of FIG. 9A) implemented as a set of HTTP application servers 900, an application platform 918, tenant data storage 922, and system data storage 924. Also shown is system process space 902, including individual tenant process spaces 904 and a tenant management process space 910. Each application server 900 may be configured to tenant data storage 922 and the tenant data 923 therein, and system data storage 924 and the system data 925 therein to serve requests of user systems 912. The tenant data 923 might be divided into individual tenant storage areas (e.g., tenant storage space 927), which may be either a physical arrangement and/or a logical arrangement of data. Within each tenant storage space 927, tenant data 929, and application metadata 931 might be similarly allocated for each user. For example, a copy of a user's most recently used (MRU) items might be stored to tenant data 929. Similarly, a copy of MRU items for an entire organization that is a tenant might be stored to tenant storage space 927. A UI 730 provides a user interface and an API 932 provides an application programmer interface into system 916 resident processes to users and/or developers at user systems 912. The tenant data and the system data may be stored in various databases, such as one or more Oracle™ databases.

Application platform 918 includes an application setup mechanism 938 that supports application developers' creation and management of applications, which may be saved as metadata into tenant data storage 922 by save routines 936 for execution by subscribers as one or more tenant process spaces 904 managed by tenant management process space 910 for example. Invocations to such applications may be coded using PL/SOQL 934 that provides a programming language style interface extension to API 932. Invocations to applications may be detected by one or more system processes, which manages retrieving application metadata 931 for the subscriber making the invocation and executing the metadata as an application in a virtual machine.

Each application server 900 may be communicably coupled to database systems, e.g., having access to system data 925 and tenant data 923, via a different network connection. For example, one application server 900i might be coupled via the network 914 (e.g., the Internet), another application server 900N-1 might be coupled via a direct network link, and another application server 900N might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 912 to distribute requests to the application servers 900. In one embodiment, the load balancer uses a least connections algorithm to route user requests to the application servers 900. Other examples of load balancing algorithms, such as round robin and observed response time, also may be used. For example, in certain embodiments, three consecutive requests from the same user may hit three different application servers 900, and three requests from different users may hit the same application server 900. In this manner, system 916 is multi-tenant, in which system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., may be maintained and accessed by a user system having nothing more than network access, the user may manage his or her sales efforts and cycles from any of many different user systems. For example, if a salesperson is visiting a customer and the customer has Internet access in their lobby, the salesperson may obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client systems) communicate with application servers 900 to request and update system-level and tenant-level data from system 916 that may require sending one or more queries to tenant data storage 922 and/or system data storage 924. System 916 (e.g., an application server 900 in system 916) automatically generates one or more SQL statements (e.g., one or more SQL queries) that are designed to access the desired information. System data storage 924 may generate query plans to access the requested data from the database.

Each database may generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 10 illustrates a diagrammatic representation of a machine 1000 in the exemplary form of a computer system, in accordance with one embodiment, within which a set of instructions, for causing the machine/computer system 1000 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processor 1002, a main memory 1004 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 1018 (e.g., a persistent storage device including hard disk drives and a persistent database and/or a multi-tenant database implementation), which communicate with each other via a bus 1030. Main memory 1004 includes a blockchain storage manager 1024 and a smart contract executor (e.g., smart contract validator) 1023 and a blockchain interface 1025. Main memory 1004 and its sub-elements are operable in conjunction with processing logic 1026 and processor 1002 to perform the methodologies discussed herein.

Processor 1002 represents one or more general-purpose processing devices such as a microprocessor, central processing unit, or the like. More particularly, the processor 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 1002 may also be one or more special-purpose processing devices such as an application specific integrated circuit (ASIC), a field programmable gate array (FPGA), a digital signal processor (DSP), network processor, or the like. Processor 1002 is configured to execute the processing logic 1026 for performing the operations and functionality which is discussed herein.

The computer system 1000 may further include a network interface card 1008. The computer system 1000 also may include a user interface 1010 (such as a video display unit, a liquid crystal display, etc.), an alphanumeric input device 1012 (e.g., a keyboard), a cursor control device 1014 (e.g., a mouse), and a signal generation device 1016 (e.g., an integrated speaker). The computer system 1000 may further include peripheral device 1036 (e.g., wireless or wired communication devices, memory devices, storage devices, audio processing devices, video processing devices, etc.).

The secondary memory 1018 may include a non-transitory machine-readable storage medium or a non-transitory computer readable storage medium or a non-transitory machine-accessible storage medium 1031 on which is stored one or more sets of instructions (e.g., software 1022)

embodying any one or more of the methodologies or functions described herein. The software 1022 may also reside, completely or at least partially, within the main memory 1004 and/or within the processor 1002 during execution thereof by the computer system 1000, the main memory 1004 and the processor 1002 also constituting machine-readable storage media. The software 1022 may further be transmitted or received over a network 1020 via the network interface card 1008.

None of the claims in the are intended to invoke paragraph six of 35 U.S.C. § 112 unless the exact words "means for" are followed by a participle. While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method, performed by a system of a host organization, the system having at least a processor and a memory therein, wherein the method comprises:
   operating a blockchain interface to a blockchain on behalf of a plurality of tenants of the host organization of a multi-tenant database system, wherein the host organization operates as a participating node on the blockchain to enable interactions between the host organization and the blockchain and further wherein each one of the plurality of tenants operates as a participating node with access to the blockchain such that a hierarchy of entities within the host organization operates as participating nodes on the blockchain;
   receiving a transaction for the blockchain, at the host organization, wherein the transaction requests the host organization to update at least a portion of information previously stored to the blockchain, and further wherein the transaction specifies updated values for the information previously stored to the blockchain;
   executing a smart contract to validate the updated values specified by the transaction before permitting the transaction to be added to the blockchain to update the information previously stored to the blockchain with the updated values;
   creating, at the host organization, a merged transaction for execution by the blockchain specifying both (i) at least a portion of the information previously stored to the blockchain and additionally (ii) the updated values as specified by the transaction received at the host organization which are to be written to the blockchain together within a single new block of the blockchain, wherein the merged transaction is a merged data object generated using a database system of the host organization prior to writing the updated values to the blockchain; and
   writing the updated values to the blockchain, via the participating node of the host organization, by the host organization executing the merge transaction to add the updated values together with the at least a portion of the information previously stored to the blockchain to the single new block on the blockchain pursuant to successful validation of the updated values by the smart contract.

2. The method of claim 1, further comprising:
   performing a data merge operation for a data record persistently stored on the blockchain, wherein the data merge operation comprises:
   retrieving the data record in its entirety from the blockchain to retrieve all of a plurality of data elements of the data record;
   merging the validated updated values as specified by the transaction for the blockchain into the plurality of data elements of the data record to form a complete data record having the validated updated values embodied therein;
   wherein writing the updated values to the blockchain comprises adding the transaction to the single new block on the blockchain by writing the complete data record having the validated updated values embodied therein to the new single block of the blockchain;
   wherein the complete data record deprecates all prior versions of the data record stored on the blockchain and does not reference any prior version of the data record stored on the blockchain.

3. The method of claim 1:
   wherein writing the updated values to the blockchain comprises:
   writing the updated values into the new block on the blockchain with a reference to a prior block on the blockchain;
   wherein retrieval of a complete and current version of the data record requires any data elements of the stored data record which are not modified by the updated values to be retrieved from the prior block on the blockchain based on the reference and retrieval of the updated values from the new block on the blockchain.

4. The method of claim 1, further comprising:
   performing a data merge operation and a data serialization operation for the data record persistently stored on the blockchain;
   wherein the data merge operation comprises (i) retrieving the data record in its entirety from the blockchain and (ii) merging the updated values into the retrieved data record to form a complete data record having the updated values embodied therein;
   wherein the data serialization operation comprises converting the complete data record formed by the data merge operation and having the updated values embodied therein into a serialized byte stream; and
   wherein writing the updated values to the blockchain comprises writing the serialized byte stream to the new block on the blockchain.

5. The method of claim 4, further comprising:
   executing a protobuf generator to convert the complete data record formed by the data merge operation and having the updated values embodied therein into the serialized byte stream.

6. The method of claim 4, wherein the serialized byte stream forms at least one of:
   a binary format serialized byte stream;
   a JavaScript Object Notation (JSON) compatible format serialized byte stream;
   a plain text or American Standard Code for Information Interchange (ASCII) compatible format serialized byte stream;

an encrypted serialized byte stream;
a protobuffed serialized byte stream; and
a hexadecimal format serialized byte stream.

7. The method of claim 1, further comprising:
receiving a first transaction for the blockchain requesting the host organization to store the data record on the blockchain as a new stored data record, wherein the new stored data record includes a plurality of data elements embedded therein as specified by the first transaction; and
wherein the receiving the transaction for the blockchain comprises receiving a second transaction for the blockchain, wherein the second transaction specifies the updated values for the new stored data record previously transacted onto the blockchain.

8. The method of claim 1, further comprising:
receiving a first transaction for the blockchain requesting the host organization to store metadata on the blockchain, the metadata defining a valid format for the data record and a plurality of data elements stored by the data record;
wherein receiving the transaction for the blockchain comprises receiving a second transaction for the blockchain, wherein the second transaction specifies the updated values for the stored data record as previously transacted onto the blockchain; and
wherein executing the smart contract to validate the updated values specified by the transaction comprises retrieving the metadata from the blockchain stored pursuant to the first transaction and validating the updated values using the retrieved metadata.

9. The method of claim 1, further comprising:
rejecting the transaction and prohibiting the updated values from being written to a data record persistently stored to the blockchain upon a failed validation of the updated values specified by the transaction.

10. The method of claim 1, further comprising:
determining a transaction type based on the transaction received;
identifying the smart contract to be executed based on the determined transaction type; and
wherein executing the smart contract to validate the updated values comprises executing the smart contract identified based on the transaction type.

11. The method of claim 10, wherein executing the smart contract to validate the updated values specified by the transaction comprises:
retrieving metadata defining a valid format for a data record persistently stored on the blockchain;
validating the updated values specified by the transaction using the metadata retrieved; and
issuing a successful validation result or a failed validation result based on the validation, wherein the transaction is prohibited from being added to the blockchain pursuant to the failed validation result and wherein the transaction is permitted to be added to the blockchain pursuant to the successful validation result.

12. The method of claim 1:
wherein the data record is stored on the blockchain within an asset's payload portion via a CREATE asset command term for the blockchain; and
wherein the data record is associated with a transaction type for stored data records which are to be stored in their entirety with any update within a new block of the blockchain deprecating any prior version of the data record.

13. The method of claim 1:
wherein the data record is stored on the blockchain within an asset's payload portion via a CREATE asset command term for the blockchain; and
wherein the data record is associated with a transaction type for stored data records which are to be stored incrementally;
wherein any update to the stored data record writes the updated values specified by the transaction to a new block on the blockchain with a reference to a prior block on the blockchain within which the stored data record was previously stored; and
wherein retrieval of the stored data record from the blockchain requires retrieval of the updated values from the new block on the blockchain and retrieval of any remaining values not modified by the updated values from the prior block on the blockchain.

14. The method of claim 1, further comprising:
receiving a second transaction for the blockchain requesting the host organization to store a related entity, the related entity to be persistently stored to the blockchain via a second asset separate and distinct from a first asset within which a stored data record is persistently stored on the blockchain;
transacting with the blockchain via a CREATE asset transaction to add the second asset to the blockchain and storing the related entity within a payload portion of the second asset; and
relating the related entity stored within the second asset to the stored data record within the first asset via a universally unique identifier (UUID) assigned to the related entity.

15. The method of claim 14, further comprising:
retrieving the stored data record from the blockchain;
updating the stored data record to include the UUID assigned to the related entity; and
writing the updated stored data record having the UUID included therein to the blockchain.

16. The method of claim 14:
wherein the stored data record comprises a student record having embedded therein via a plurality of data elements at least a student first name, a student last name, and a student ID;
wherein the related entity comprises a student transcript;
relating the related entity stored within the second asset to the stored data record within the first asset via a universally unique identifier (UUID) assigned to the related entity comprises linking the student transcript with the student record via the UUID assigned to the student transcript;
wherein updating the stored data record to include the UUID comprises updating the student record to include the UUID linking the student record with the student transcript; and
wherein writing the updated stored data record having the UUID included therein to the blockchain comprises writing the student record to the blockchain having embedded therein the student first name, the student last name, the student ID and the UUID assigned to the student transcript stored on the blockchain via a separate and distinct second asset.

17. The method of claim 1:
wherein metadata defining a valid format for the data record is stored on the blockchain within an asset's payload portion via a CREATE asset command term for the blockchain; and
wherein the metadata is associated with a transaction type for stored metadata.

18. The method of claim 1:
wherein the adding of the transaction is subjected to a consensus protocol by the participating nodes of the blockchain prior to the transaction being accepted as part of a primary chain of the blockchain by the participating nodes of the blockchain.

19. The method of claim 1:
wherein metadata is accessible only to one of the plurality of tenants of the host organization having defined and transacted the metadata onto the blockchain; or
wherein alternatively the metadata is accessible to all of the plurality of tenants operating as one of the participating nodes with access to the blockchain regardless of which one of the plurality of tenants defined and transacted the metadata onto the blockchain.

20. The method of claim 19:
wherein modification of the metadata transacted onto the blockchain is under the exclusive control of the one of the plurality of tenants having transacted the metadata onto the blockchain for persistent storage via the blockchain;
wherein a new consensus is required to write changes to the metadata onto the blockchain when the metadata is accessible to any of the plurality of tenants operating as one of the participating nodes with access to the blockchain; and
wherein no consensus is required to write changes to the metadata onto the blockchain when the metadata is accessible for exclusive use by only the one of the plurality of tenants having originally transacted the metadata onto the blockchain.

21. The method of claim 1:
wherein a blockchain protocol for the blockchain is defined by the host organization and further wherein the host organization permits access to the blockchain for the plurality of tenants of the host organization operating as participating nodes on the blockchain; or alternatively
wherein the blockchain protocol for the blockchain is defined by a third party blockchain provider other than the host organization and further wherein the host organization also operates as a participating node on the blockchain via which the host organization has access to the blockchain.

22. The method of claim 1, further comprising:
maintaining an index for a plurality of data records persistently stored to the blockchain;
wherein the index defines at least a location for each of the plurality of data records persistently stored to the blockchain, the location defining one addressable block of the blockchain from which to retrieve a respective data record persistently stored to the blockchain.

23. The method of claim 22:
wherein the index comprises a Merkle Tree compatible index; and
wherein the index is persistently stored at the host organization or persistently stored to the blockchain or persistently stored at both the host organization and the blockchain.

24. The method of claim 22:
wherein the index defines for each of the plurality of data records persistently stored to the blockchain, both (i) the location for each of the plurality of records persistently stored to the blockchain and (ii) a copy of any contents of the plurality of records persistently stored to the blockchain; and
wherein maintaining the index includes writing the updated values for the data record to the index when the updated values for the data record are written to the blockchain pursuant to successful validation of the updated values.

25. The method of claim 24, further comprising:
receiving a second transaction requesting retrieval, from the blockchain, of an updated data record previously written to the blockchain;
retrieving the updated data record from the index without interacting with the blockchain; and
returning the updated data record retrieved from the index responsive to the second transaction requesting the retrieval.

26. The method of claim 22:
wherein nodes and leafs of the index are retrievable via full or partial addresses as defined by an addressing structure for the index;
wherein the method further comprises maintaining the addressing structure for the index, wherein the addressing structure includes at least:
a first portion of the addressing structure defining an application namespace;
a second portion of the addressing structure defining an entity type identifier; and
a third portion of the addressing structure defining a name for an entity or a data record stored by the blockchain and indexed by the index.

27. The method of claim 26:
wherein referencing the index with a fully qualified address will return contents of leaf from the index; and
wherein referencing the index with a partial address will return a sub-tree beneath a node of the index matching the partial address, in which the sub-tree includes multiple leafs of the index structured below the node of the index matching the partial address.

28. The method of claim 22, further comprising:
receiving multiple subsequent transactions specifying additional updated values for one or more of a plurality of data elements of the data record persistently stored to the blockchain;
buffering the multiple subsequent transactions specifying the additional updated values to the index by updating the index with each of the multiple subsequent transactions upon receipt without writing corresponding updates to the blockchain; and
incrementally updating the data record persistently stored to the blockchain by periodically adding a single incremental update transaction to the blockchain representing all of the additional updated values received via the multiple subsequent transactions.

29. Non-transitory computer readable storage media having instructions stored thereon that, when executed by a system of a host organization having at least a processor and a memory therein, the instructions cause the system to perform the following operations:
operating a blockchain interface to a blockchain on behalf of a plurality of tenants of the host organization of a multi-tenant database system, wherein the host organization operates as a participating node on the blockchain to enable interactions between the host organization and the blockchain and further wherein each one of the plurality of tenants as a participating node with access to the blockchain such that a hierarchy of entities within the host organization operates as participating nodes on the blockchain;

receiving a transaction for the blockchain, at the host organization, wherein the transaction requests the host organization to update at least a portion of information previously stored to the blockchain, and further wherein the transaction specifies updated values for the information previously stored to the blockchain;

executing a smart contract to validate the updated values specified by the transaction before permitting the transaction to be added to the blockchain to update the information previously stored to the blockchain with the updated values;

creating, at the host organization, a merged transaction for execution by the blockchain specifying both (i) at least a portion of the information previously stored to the blockchain and additionally (ii) the updated values as specified by the transaction received at the host organization which are to be written to the blockchain together within a single new block of the blockchain, wherein the merged transaction is a merged data object generated using a database system of the host organization prior to writing the updated values to the blockchain; and writing the updated values to the blockchain, via the participating node of the host organization, by the host organization executing the merge transaction to add the updated values together with the at least a portion of the information previously stored to the blockchain to the single new block on the blockchain pursuant to successful validation of the updated data values by the smart contract.

30. A system to execute at a host organization, wherein the system comprises:

a memory to store instructions;

a set of one or more processors;

a non-transitory machine-readable storage medium that provides instructions that, when executed by the set of one or more processors, the instructions stored in the memory are configurable to cause the system to perform operations comprising:

executing instructions via the set of one or more processors configurable to cause the system to operate a blockchain interface to a blockchain on behalf of a plurality of tenants of the host organization of a multi-tenant database system, wherein the host organization operates as a participating node on the blockchain to enable interactions between the host organization and the blockchain and further wherein each one of the plurality of tenants operates as a participating node with access to the blockchain such that a hierarchy of entities within the host organization operates as participating nodes on the blockchain;

receiving a transaction for the blockchain, at the host organization, wherein the transaction requests the host organization to update at least a portion of information previously stored to the blockchain, and further wherein the transaction specifies updated values for the information previously stored to the blockchain;

executing a smart contract to validate the updated values specified by the transaction before permitting the transaction to be added to the blockchain to update the information previously stored to the blockchain with the updated values;

creating, at the host organization, a merged transaction for execution by the blockchain specifying both (i) at least a portion of the information previously stored to the blockchain and additionally (ii) the updated values as specified by the transaction received at the host organization which are to be written to the blockchain together within a single new block of the blockchain, wherein the merged transaction is a merged data object generated using a database system of the host organization prior to writing the updated values to the blockchain; and writing the updated values to the blockchain, via the participating node of the host organization, by the host organization executing the merge transaction to add the updated values together with the at least a portion of the information previously stored to the blockchain to the single new block on the blockchain pursuant to successful validation of the updated values by the smart contract.

* * * * *